US006340932B1

(12) United States Patent
Rodgers et al.

(10) Patent No.: US 6,340,932 B1
(45) Date of Patent: Jan. 22, 2002

(54) CARRIER WITH ANTENNA FOR RADIO FREQUENCY IDENTIFICATION

(75) Inventors: James L. Rodgers, Mesa; John J. Coulthard, Scottsdale; Billy C. Fowler, Phoenix; Howard K. Jaecks, Mesa; Roc A. Lastinger, Mesa; Paul A. Picard, Mesa; Mohammad A. Rehman, Chandler, all of AZ (US)

(73) Assignee: RF Code, Inc., Mesa, AZ (US)

( * ) Notice: Subject to any disclaimer, the term of this patent is extended or adjusted under 35 U.S.C. 154(b) by 0 days.

(21) Appl. No.: 09/604,180

(22) Filed: Jun. 27, 2000

Related U.S. Application Data

(60) Division of application No. 09/372,274, filed on Aug. 11, 1999, which is a continuation-in-part of application No. 09/233,755, filed on Jan. 20, 1999, which is a continuation-in-part of application No. 09/088,924, filed on Jun. 2, 1998, now abandoned.

(51) Int. Cl.$^7$ ............................................. G08B 13/14
(52) U.S. Cl. ............................. 340/572.7; 340/572.8; 343/700; 343/872; 342/42
(58) Field of Search .................... 340/572.7, 10.1, 340/572.8, 539, 10.4, 572.1; 343/719, 872, 700; 342/42

(56) References Cited

U.S. PATENT DOCUMENTS

| | | | | |
|---|---|---|---|---|
| 3,818,472 A | | 6/1974 | Mauk et al. ............. 340/572.4 |
| 4,737,789 A | * | 4/1988 | Nysen ......................... 342/51 |
| 4,827,395 A | * | 5/1989 | Anders et al. ................. 700/9 |
| 5,084,699 A | * | 1/1992 | DeMichele .............. 340/10.34 |
| 5,565,858 A | * | 10/1996 | Guthrie .................... 340/10.33 |
| 5,604,485 A | | 2/1997 | Lauro et al. ............. 340/572.5 |
| 5,659,300 A | * | 8/1997 | Dresselhuys et al. .. 340/870.02 |
| 5,682,143 A | | 10/1997 | Brady et al. ............. 340/572.7 |
| 5,822,714 A | | 10/1998 | Cato .......................... 702/108 |
| 6,172,608 B1 | * | 1/2001 | Cole ....................... 340/572.1 |

FOREIGN PATENT DOCUMENTS

| | | |
|---|---|---|
| WO | WO 97/49076 | 12/1997 |
| WO | WO97/49076 | 12/1997 |
| WO | WO 98/05088 | 2/1998 |

* cited by examiner

*Primary Examiner*—Benjamin C. Lee
(74) *Attorney, Agent, or Firm*—William R Bachand; Stuart A Whittington; Squire Sanders & Dempsey L.L.P.

(57) ABSTRACT

A carrier, as used for example to transport several radio frequency identification devices, includes a circuit having an antenna and a series capacitor for tuning the antenna. Enhanced transceiver communication results when transceivers are placed in the carrier. Alternately, a carrier may include first and second antenna circuits, each having a capacitor for tuning the respective antenna. The two circuits may cooperate so that energy received in a first pattern is re-radiated in a second pattern for further enhanced transceiver communication, such as detection of the presence of the RFID device within the carrier.

10 Claims, 33 Drawing Sheets

| COMMANDS |||||
|---|---|---|---|
| PURPOSE | REF. | ACTION BY TRANSCEIVER(S) | SCOPE |
| AFFECT ACCESS STATE | 902 | RESET AN ACCESS STATE BIT | ONE/GROUP |
| | 904 | SET AN ACCESS STATE BIT | ONE/GROUP |
| | 906 | CLEAR SLOT COUNTER | ALL |
| SEND DATA TO XCVR | 908 | ACCEPT DATA FOR STORAGE IN MEMORY | ONE/GROUP |
| | 910 | ACCEPT CONFIGURATION FOR SENSOR | ONE/GROUP |
| OBTAIN REPLY FROM XCVR | 912 | REPLY WITH ACK IN TIME SLOT CORRESPONDING TO EACH XCVR'S RESPECTIVE MEMBERSHIP | GROUP |
| | 914 | REPLY WITH DATA FROM MEMORY | ONE |
| | 916 | REPLY WITH SENSOR DATA | ONE |
| | 918 | REPLY IN TIME SLOT(S) CORRESPONDING TO DATA FROM MEMORY | ONE/GROUP |
| | 920 | REPLY IN TIME SLOT(S) CORRESPONDING TO SENSOR DATA | ONE/GROUP |

FIG. 9

| COMMAND | ARGUMENT | PREREQ. STATE BITS | TIME SLOT INDICATES | STATE BITS SET |
|---|---|---|---|---|
| 1000 | GID | NONE | SGID | NONE |
| 1001 | GID | NONE | $S^2$GID | NONE |
| 1002 | GID | NONE | $S^3$GID | NONE |
| 1003 | GID | NONE | MEMBER ID | NONE |
| 1004 | GID | NONE | SGID | B0 |
| 1005 | SGID | B0 | $S^2$GID | B1 |
| 1006 | $S^2$GID | B0, B1 | $S^3$GID | B2 |
| 1007 | $S^3$GID | B0, B1, B2 | MEMBER ID | B3 |
| 1008 | ADDR. OF SENSOR OR MEMORY AND/OR DATA TO STORE | B0, B1, B2, B3 | WRITE ACK. OR DATA FROM SENSOR OR MEMORY | NONE |

FIG. 10

| PLANAR ANTENNAS | | | |
|---|---|---|---|
| REF. | POINTS DEFINING PLANE | SQUELCH AT | ORIENTATION |
| 3401 | ABCD | V | PARALLEL TO XZ PLANE |
| 3402 | FGH | U | PARALLEL TO XZ PLANE |
| 3403 | JKL | T | PARALLEL TO XZ PLANE AT MIDDLE OF PASSAGE |
| 3404 | BCP | T | $\alpha = 45°$ |
| 3405 | ANOD | T | $\alpha = 135°$ |
| 3406 | AJOL | S | $\alpha = 135°$ AND $\delta = 135°$ |
| 3407 | LCJ | U | $\alpha = 45°$ AND $\delta = 45°$ |
| 3408 | ABN | J | PARALLEL TO XY PLANE |
| 3409 | BCON | K | PARALLEL TO YZ PLANE |
| 3410 | ADP | L | PARALLEL TO YZ PLANE |

FIG. 34

CARRIER WITH ANTENNA FOR RADIO FREQUENCY IDENTIFICATION

CROSS-REFERENCE TO RELATED APPLICATIONS

This application is a divisional application of, and claims priority from, U.S. patent application Ser. No. 09/372,274 by Rodgers, et al., filed Aug. 11, 1999, which is a Continuation-In-Part application of, and claims priority from, U.S. patent application Ser. No. 09/233,755 by Rodgers, et al., filed on Jan. 20, 1999, which is a Continuation-In-Part application of U.S. patent application Ser. No. 09/088,924, by Rodgers, et. al, filed on Jun. 2, 1998 now abandoned. These related applications are incorporated herein by reference.

FIELD OF THE INVENTION

Embodiments of the present invention relate to communication systems of the type having multiple transmitting and receiving devices that share a common communication medium; and, to methods for establishing communication in the presence of large numbers of such devices.

BACKGROUND OF THE INVENTION

Conventional data communication systems have been applied to accomplish object identification using the medium of radio broadcast. Such radio frequency identification (RFID) systems find application in the fields of materials handling, inventory control, and generally in the field of tracking personnel, objects, and animals. In an exemplary arrangement, such a system may include an interrogator and several thousand transceivers, each transceiver being packaged as a disposable label or tag and placed on an object, animal or person to be tracked. Each transceiver is manufactured using integrated circuit technology, programmed with a unique identifier, and assembled with a printed circuit antenna to form a flat assembly for incorporation into the label or tag. Typically, the interrogator has a fixed location, while transceivers are moved from time to time in and out of the communication field of the interrogator. It is highly desirable to accurately and quickly identify transceivers from a population of transceivers which may number in the billions. At the same time, it is highly desirable to reduce the cost of each transceiver to an absolute minimum.

Accurate and reliable detection of transceivers is made difficult by a number of factors including, for example, (a) transceivers have a limited amount of power available to operate when required to respond with a radio transmission; (b) the orientation of the transceiver antenna may be unsuitable for absorbing sufficient power from the signal transmitted by the interrogator; (c) the orientation of the antenna of the transceiver may be unsuitable for providing a transmitted signal sufficient for accurate reception by the interrogator, (d) cooperation of a transceiver with the interrogator may require sophisticated logic in the transceiver to accurately perform the transceiver's portion of a communication protocol used to obtain an open communication channel between the interrogator and a single transceiver, and (e) transceivers transmitting simultaneously may cause a so-called collision.

There remains a need for a communication system suited for coordinating the use of a common medium among potentially billions of transceivers for interrogation or control activities to be accomplished in a limited time. In addition, there remains a need in some applications to minimize the circuitry, firmware, and software complexity required at each transceiver, to extend the operating range of communication, and to support larger numbers of individual identification numbers perhaps at the expense of complexity at the interrogator. Without these improvements, the size and cost per transceiver cannot be reduced to permit new and improved communication systems that employ inexpensive disposable transceivers such as identification tags, baggage tags, inventory labels, and the like.

SUMMARY OF THE INVENTION

A system in one implementation according to various aspects of the present invention includes a monitor and a plurality of transceivers that communicate over a common medium. The monitor includes a first transmitter, a first receiver, and a processor. Each transceiver includes a resonant circuit, a transmitter, a receiver, and an antenna coupled to the resonant circuit. The processor performs a method for performing transceiver communication that includes the steps of: (a) transmitting from the first transmitter a first frequency for a first duration; (b) after lapse of the first duration, receiving via the first receiver a response signal from at least one of the resonant circuits; (c) determining a second frequency from the received response signal; and (d) performing transceiver communication using the second frequency.

Transceivers of the type having a resonant circuit coupled to an antenna, when operating in close proximity to each other, may interfere with the response from a single transceiver by absorbing the energy intended to be received by the transceiver, absorbing the energy transmitted by the transceiver, or altering the resonant frequency of the resonant circuit. By determining the second frequency for transceiver communication, the monitor may establish communication with the single transceiver at a frequency better suited for transferring operative power to the transceiver, for conducting an interrogation protocol for identifying the transceiver, or for data transfer. Communication is maintained in spite of variation in the resonant frequency of the resonant circuit which may arise from coupling as discussed above or from variation in manufacturing and operating environment (e.g., temperature, humidity, relative movement, or component aging).

The monitor may further include a first antenna coupled to the first transmitter and a squelch circuit for dissipating energy on the antenna after lapse of the first duration and before receiving from the first receiver the response signal from the resonant circuit. By quickly dissipating energy, the response signal may be more quickly and accurately received by the second receiver and consequently the second frequency may be more quickly and accurately determined, increasing system sensitivity and reliability. Obtaining quicker receiving from the second receiver extends the operating range of the monitor or permits operation with weaker signals. Weaker signals may originate from transceivers located further from the monitor or in an orientation that is detrimental to reception by the first receiver. Such detrimental orientation of the antenna in the transceiver may be with respect to the first antenna of the monitor or with respect to other transceivers proximate to the transceiver antenna.

The monitor may further include the second receiver providing phase detection, or a signal analyzer provides phase detection. Phase detection providing phase information regarding the received response signal. The processor may further determine the second frequency in accordance with the phase information. Phase information varies over a wider range of values near a resonant frequency. By determining the second frequency in accordance with phase information, the second frequency may be more accurately determined. Communication with a more accurate second frequency improves the efficiency of transferring operative power to a transceiver, permits faster or more accurate identification of transceivers, extends the operating range of the monitor, overcomes problems of detrimental orientation discussed above, or permits faster or more accurate data transfer between the monitor and a single transceiver.

When each transceiver has a respective identification number comprising a common total number of portions, a method of determining an identification number of a transceiver of a plurality of such transceivers in one embodiment according to various aspects of the present invention includes the steps of: (a) transmitting a start signal; (b) receiving a reply at a time after the start signal; (c) determining a number in accordance with the time determined in step (b); (d) transmitting a start signal and the number determined in step (c); (d) repeating steps (b) through (d) until a count of performances of the step of transmitting is not less than the common total; and (f) determining the identification number in accordance with each reply.

By repeating the steps of transmitting a number of times not less than the common total, a step of detecting whether a collision occurred is not necessary. The reply may convey no more information than the fact that a reply has been made, thereby eliminating the need for a longer duration of reply. By dividing an identification number into portions and applying the protocol discussed above, a large number of unique identification numbers is practical (e.g., $2^{40}$ in 4 10-bit portions) without increased complexity or cost in each transceiver.

A short reply duration is associated with several advantages. More replies may be received in a given time period, increasing the likelihood of identifying transceivers that are only briefly in range of the monitor; redundant replies may be used to increase system reliability; and the amount of power needed in each transceiver to transmit a reply may be reduced.

Lower power consumption is associated with several advantages, including: transceivers with lighter weight, smaller size may be practical at lower cost; and the communication range may be extended by expanding the power budget used for receiving or transmitting or both.

Extending the communication range has additional advantages, including: increasing the time permitted for communication for transceivers that are only briefly in range; decreasing the adverse affects of detrimental orientation as discussed above; permitting closer proximity between transceivers; permitting larger numbers of transceivers in close proximity to each other; reducing the size of antennas; and decreasing the number of monitors or antennas that may otherwise be needed to provide communication in a large area.

The method of determining an identification number may include a step following step (b) for rejecting an invalid reply. Further, time domain or frequency domain techniques which may be employed in the process of determining a second frequency in the method for performing transceiver communication may be used in the process of determining an identification number in the step of rejecting an invalid reply.

A transceiver in one implementation according to various aspects of the present invention includes a resonant circuit (having a resonant frequency), a receiver, a memory, a comparator, a counter, and a transmitter. The resonant circuit includes an antenna used for receiving and transmitting. The receiver, coupled to the resonant circuit detects a start signal followed by indicia of a first code. The comparator provides a result of comparison responsive to the first code and a second code provided by the memory. The counter is loaded with a count provided by the memory and provides a completion signal after a duration in accordance with the count. The transmitter transmits a reply in response to the result of comparison and the completion signal.

When the second code maps to a transceiver identification number, such a transceiver identification number may be determined without the transceiver transmitting the second code. The duration of transmitting the reply is, therefore, brief with advantages as discussed above.

When such a transceiver is used with the system described above and the resonant circuit is used to establish the frequency for transmitting, the first receiver of the monitor may selectively receive in a reduced frequency band expected to include the reply. Improved receiver sensitivity with concomitant improved range of reception results.

A transceiver may further include a phase locked loop that locks to the frequency being received, maintains the locked frequency in the absence of received signal, and drives the transmitter to transmit at the maintained frequency instead of the resonant frequency. Improved range of transmitting by the transceiver may be obtained. Improved communication may be obtained as a consequence of being able to provide operative power, determine identification, and provide data transfer at a frequency different from the resonant frequency particularly when the resonant frequency is being affected by detrimental orientation as discussed above.

By transmitting a reply in response to the completion signal, a numeric value may be communicated from the transceiver to the monitor with a numeric resolution in accordance with the duration from the start signal. For example, multi-bit digital values may be communicated with a 1-bit reply.

A monitor in one implementation according to various aspects of the present invention includes a processor for communication with a plurality of transceivers, an event detector, a plurality of receivers, a plurality of transmitters, and an antenna network controller for coupling the monitor to a provided antenna network. The processor may include a first and a second processor coupled for data transfer by a computer network. The processor may determine the location of a transceiver in a zone monitored by an event detector in response to a signal provided by the event detector in cooperation with transceiver communication as discussed above. Multiple receivers provide simultaneous narrow band detection for receiving a signal in accordance with a predetermined phase. Multiple transmitters provide each of multiple simultaneous or sequential transmissions, each on a respective antenna (or group of antennas) and at a respective amplitude, frequency, and phase which may vary from other respective transmissions.

An antenna network in one implementation according to various aspects of the present invention includes a plurality of antenna nodes coupled to an antenna bus. Each antenna node includes a plurality of transceiver channels and a coupler for coupling each transceiver channel to a provided plurality of antennas. Each transceiver channel includes a squelch circuit. When the squelch circuit is located proximate to a point in each of several antennas, out of band energy related to squelching is reduced. In another implementation, the squelch circuit includes a plurality of current sources for each of leg of an antenna to be squelched.

An antenna network node in another implementation according to various aspects of the present invention includes a cross-channel coupler and a transceiver channel that includes a difference amplifier for signal processing proximate to provided antennas.

An antenna network in another implementation according to various aspects of the present invention includes an antenna bus, and a plurality of network nodes each comprising a processor, a tuner, and a coupler for coupling provided antennas to the tuner. The bus conveys a signal having indicia of a command with settings. The processor directs operation of the tuner in accordance with the settings. In another implementation, a conductor of the bus conveys at a first time indicia of the command and at a second time indicia of a signal to be transmitted.

A passage in one implementation according to various aspects of the present invention includes planar antennas each arranged at a respective angle to provide in combination a minimum received signal greater than a predetermined amount for all possible orientations of a transceiver in the passage. In an alternate implementation, each antenna includes a Q modifying circuit that facilitates wider-band reception than transmission.

A carrier in one implementation according to various aspects of the present invention includes an antenna and a series capacitor for tuning the antenna Enhanced transceiver communication results when transceivers are placed in the carrier. In an alternate implementation, a carrier includes a first and a second antenna each with a respective tuning capacitor. The first and the second antenna are coupled to cooperate. Energy received in a first pattern is re-radiated in second pattern for further enhanced transceiver communication.

BRIEF DESCRIPTION OF THE DRAWING

Embodiments of the present invention will now be further described with reference to the drawing, wherein like designations denote like elements, and:

FIG. 9 is a chart describing the purpose and scope of various commands given by a monitor and performed by a transceiver in the system of FIG. 1;

FIG. 10 is a chart describing the structure and effect of a set of commands in an implementation of the system of FIG. 1;

FIG. 34 is a chart describing various planar antennas with reference to the geometry of the passage of FIG. 35;

Figure 1:
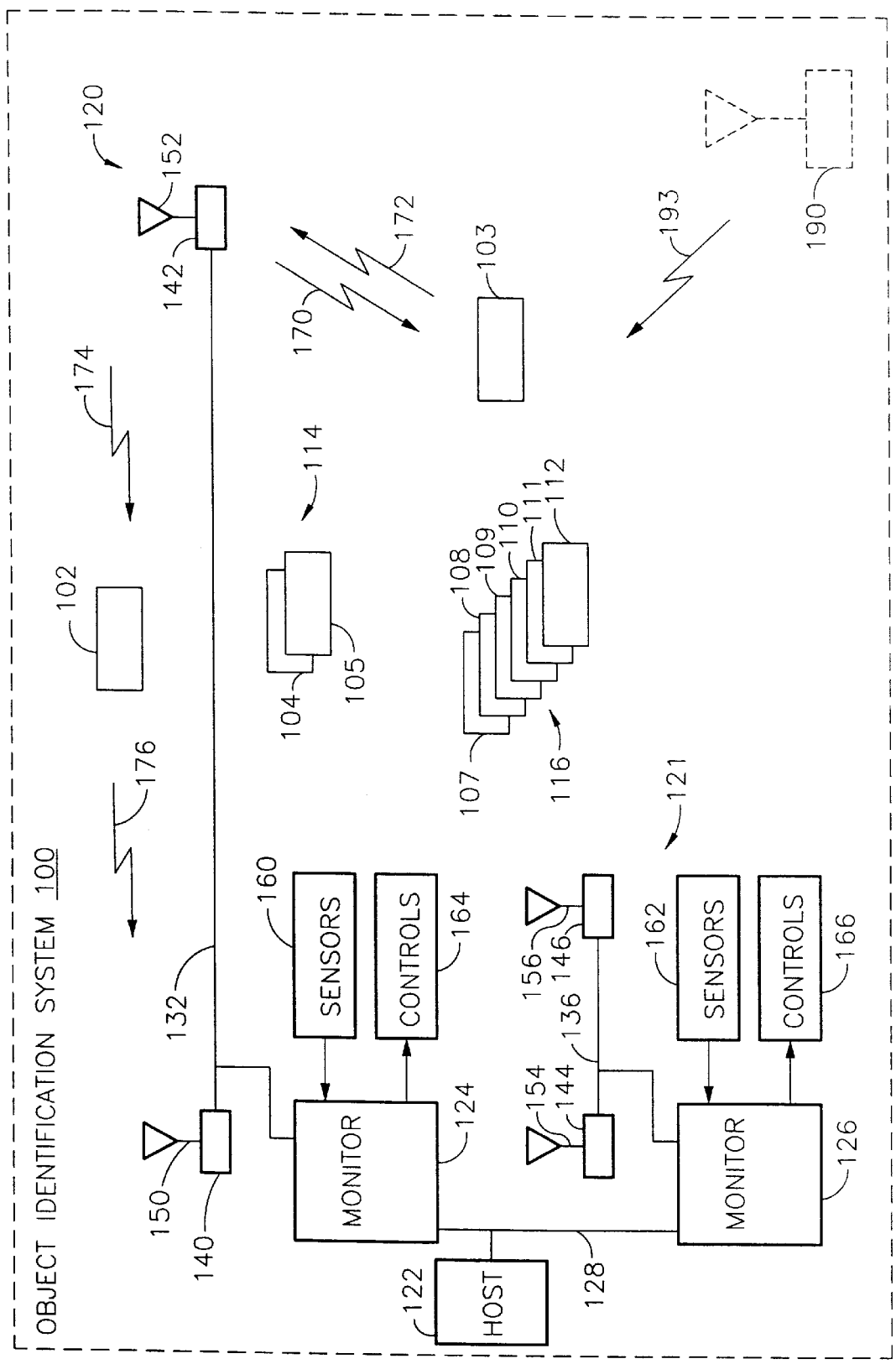
FIG. 1 is a functional block diagram of an object identification system in an exemplary embodiment according to various aspects of the present invention.

In each functional block diagram, a broad arrow symbolically represents a group of signals that together signify a binary code. For example, the output of a binary counter is represented by a broad arrow because a binary count is signified by the signals on several conductors taken together at an instant in time. A group of signals having no binary coded relationship may be shown as a single line with an arrow. A single line between functional blocks conveys one or more signals. Signals that appear on several figures and have the same mnemonic are coupled together by direct connection or by additional devices.

DETAILED DESCRIPTION OF PREFERRED EMBODIMENTS

An object identification system, according to various aspects of the present invention, provides communication between a monitor and an object, while the monitor and object are within communicating range. Each object includes a resonant circuit coupled to an antenna used for communication. Communication, as used herein, may be used to accomplish one or more purposes including: (a) to detect presence of a resonant circuit (e.g., to locate an object as in a zone), (b) to provide operative power to a transceiver, (c) to determine the resonant frequency of such a resonant circuit, (d) to determine a transceiver identification, (e) to receive data from a transceiver, or (f) to send data to one or more transceivers. Transmitted power levels may vary according to the range suitable for the communication. For example, objects may be detected at a higher transmitted power level and a warning issued that some objects may be out of range for interrogation. Communication may be accomplished using the same or different media or frequencies for different purposes (e.g., magnetic induction, radio, infrared light, or acoustics). Different media or frequencies may be used simultaneously or at different times for the same purpose. When such objects are proximate to each other, the antennas couple the resonant circuits to provide a corporate resonant frequency, typically lower than the resonant frequency of each resonant circuit in isolation. According to various aspects of the present invention, communication is established, overcoming the problems described above including variation in the orientation of each object antenna and coupling effects (e.g., proximity of object antennas to each other, and surfaces that interfere with communication by reflection, absorption, or refraction). For example, object identification system 100 includes host computer 122, network 128, monitors 124 and 126, antenna systems 120 and 122, sensors 160 and 162, and controls 164 and 166. System 100 is capable of establishing reliable communication in spite of interference from transmitting sources not part of system 100. For example, interference source 190 (representative of any number of sources and locations) broadcasts signal 193 (representing one or more frequency components, or noise) within the reception range of antenna systems 120 and 121.

Host computer 122 may include any computer system having computing capacity and interfaces for supporting data communication on network 128 among one or more monitors 124, 126. A conventional office computer system may be used Host computer 122 may operate to receive notice of objects detected or identified by monitors 124, 126 and to conduct any otherwise conventional business process in response to such notice. As a representative example, host computer may provide inventory accounting, point of sale services, materials handling, automatic data collection, electronic article surveillance, or electronic access control in response to object detection or identification where objects may include personnel badges, identification tags, transportation tags, inventory labels, electronic keys, authorization devices, or price tags.

Network 128 may include any network for data transfer (e.g., an internet, a wide area network, a local area network using cable, telephony, or wireless technology) between a monitor and a host computer. In addition, network 128 may support data transfer between one or more monitors 124, 126.

Host computer 122 may perform a significant proportion of the data analysis, communication (e.g., formation and analysis of messages to and from objects according to one or more protocols for determining identification), and control functions discussed herein with respect to a monitor, when, for example, a monitor 124, 126 is of limited processing capability. In such an implementation, monitor 124 receives commands from host computer 122 and provides reports to host computer 122 via network 128. Commands may include requests by host computer 122 for the current state of controls 164, the current readings from sensors 160, the status of any antenna node 140, 142, and the status of the configuration of monitor 124 or antenna system 120. Host computer 122 may command monitor 124 to transmit on one or more desired frequencies, may direct monitor 124 to receive on one or more bands (wide or narrow) and/or perform analog and digital analysis of signals received from antenna system 120, and may direct reconfiguration of monitor 124, sensors 160, controls 164, and/or antenna system 120. Further, host computer 122 may, by suitable commands, request notice of objects detected or a list of object identifications currently within communication range of monitor 124, and/or request raw data from which host computer 122 may detect objects or determine such a list. Finally, host computer 122, using suitable commands to monitors 124 and 126, may direct cooperation of monitors 124 and 126 for performing any of the functions discussed above.

A monitor includes any system that communicates with one or more objects and provides results of such communication. Results may be provided to an operator at the monitor (e.g., when host computer 122 is omitted) or to a host computer for processing as discussed above. System 100 may include one or more monitors, several monitors being used for redundancy or when the capacity of a single monitor is exceeded by physical distribution of objects or the desired extent of communication with an expected population of objects in perhaps a limited time. For example, monitors 124 and 126 may be functionally equivalent and arranged in two geographic zones or territories. When redundant communication with objects by each monitor is not desired, the location of an object as within a particular zone may be ascertained by communication with one of the two monitors 124 or 126. Movement of an object from one zone to another may be determined by host computer 122 from suitable reports by monitors 124 and 126.

An antenna system includes any system for coupling one or more antennas to a monitor for communication between a monitor and one or more objects. When communication from one or more of several monitors is limited to providing operative power, receiving antenna functions of those monitors and antenna systems may be omitted. For example, for communication as discussed above, antenna system 120 includes antenna bus 132 coupling antenna node 140 and antenna node 142 to monitor 124. Antenna node 140 supports antennas 150. Antenna node 142 supports antennas 152. In like manner, antenna system 121 includes antenna bus 136 for coupling antenna node 144 and antenna node 146 to monitor 126. Antenna node 144 supports antennas 154. Antenna node 146 supports antennas 156. As used herein, an antenna represents any transducer of energy used in communication including, for example, a lens for infrared light energy or a horn or structure for acoustic energy. An alternate antenna system includes one or more replaceable modules for reconfiguring operation from any communication medium or frequency band to another medium or frequency band.

An antenna bus includes any network for conveying signals for coupling one or more transmitters to one or more antennas, for conveying signals for coupling one or more antennas to one or more receivers, and for coupling one or more processors for data communication. For example, antenna bus 132 couples antennas 150, 152 to transmitters and receivers of monitor 124. In addition, antenna bus 132 couples processors in antenna nodes 140 and 142 with a processor of monitor 124. Monitor 124 may direct antenna node functions and receive status information by issuing commands to one or more antenna nodes via antenna bus 132. In an alternate implementation, more than one monitor may use the same antenna bus. For example, monitors 124 and 126 may be coupled for communication via antenna bus 132 in place of (or in addition to) communication between monitors via bus 128.

Communication between a monitor and an object may involve one or more antennas. For example, communication between monitor 124 and object 103 is illustrated with signals 170 from antennas 152 to object 103; and, signal 172 from object 103 to antennas 152. It is not necessary for the same antenna node to operate for sending and receiving communication to a particular object. For example, antennas 152 provide signal 174 to object 102; and, object 102 provides signal 176 for reception by antennas 150.

The orientation of an object antenna, as discussed above, includes the orientation of the object antenna with respect to an antenna used by a monitor for communication with objects and includes the orientation of the object antenna with respect to other object antennas. When essentially planar antennas are used in the monitor and objects, coupling of antennas for power transfer from a monitor to an object may be primarily by magnetic fields. Such coupling may decrease as the object antenna orientation differs from coplanar (or parallel planes) with respect to the monitor antenna. When planar object antennas are coplanar (or in parallel planes) with respect to each other, an object may receive power from other objects and the coupling of multiple resonant circuits may effect the behavior of one or more of such resonant circuits. For example, when each object has a resonant circuit with a resonant frequency when operated in isolation, a group of objects may have a peak of energy absorption at a different (e.g., lower) frequency, herein called a stack resonant frequency. Some objects in a stack may not be coupled to the same extent as other (e.g., a majority) objects and so may absorb energy more efficiently at a frequency between the resonant frequency in isolation and the stack resonant frequency of the majority. In other words, a nonuniform stack of objects may exhibit several stack resonant frequencies.

The cooperation of resonant circuits in such a system of coupled object antennas may have a detrimental effect on communication. Detrimental effects may include insufficient operative power being received by a particular transceiver in an object so that other purposes of communication cannot be met; insufficient or discontinuous power to support digital and analog functions (e.g., counting, sensing, converting) so that data communication may be inaccurate; limited range of a signal transmitted by an individual object; and a different than expected power spectral density of a signal transmitted by an individual object.

Sensors 160, 162 measure various aspects of the environment near the respective monitor, while controls 164, 166 effect changes in that environment. Sensors 160, 162 may include any conventional electronic transducers including, for example, temperature sensors, pressure sensors, proximity sensors, electromagnetic sensors, optical sensors, and mechanical sensors such as used conventionally for detecting environmental physical conditions, movement of objects in a surveillance area, opening and closing of doors, and passage of vehicles, animals, personnel, and/or items not equipped with transceivers, in an implementation of system 100 for automatic data collection related to a point of sale terminal, sensors 160, 162 may include a bar code reader, a video camera, and other conventional product tracking sensors. Controls 164, 166 may include any conventional facility controls when monitors 124, 126 are stationary; or, may include vehicular controls, as appropriate, for monitors 124, 126 in a mobile configuration. Controls 164, 166 may include controls for changing the orientation of one or more antennas of antenna systems 120, 121. Each monitor 124, 126 integrates and reports information related to events as detected by sensors 160, 162 and related to communication with one or more objects 102 through 112. Such reports may be provided by alarms, speech enunciators, printouts, or displays (not shown). Each monitor 124, 126 may respond to one or more detected events by changing the state of controls 164, 166 and/or reporting one or more events across network 128 to host computer 122 and/or another monitor.

Sensors and controls as discussed above may be supported in an alternate implementation of system 100 from one or more antenna nodes in addition or in place of sensors 160 and 164 supported from monitor 124 directly. When supported by an antenna node, sensors and controls may be placed in locations distant from monitor 124 or more suitable for signal routing, system installation, test, or maintenance. A node of such an implementation may support any combination of antennas, sensors, and controls, including configurations of exclusively antennas (as shown), sensors, or controls.

System 100 may be constructed and assembled using conventional electrical and electronic components and techniques including firmware and software developed using conventional software development techniques. Objects for use with system 100 may be constructed and assembled using conventional electrical, electronic, and mechanical techniques including packaging as integrated circuits, hybrids, smart cards, labels, tags, badges, packing materials, packaging, receptacles, or signage as desired for any of the applications discussed above. Although the physical proximity of objects is illustrated in FIG. 1 for clarity, the functional block diagram of FIG. 1 is not intended to convey other physical aspects of system 100. Any of various physical packages and distributions of the functions of system 100 may be employed using conventional packaging and data communication technology for desired system operation. For example, the functions of host computer, monitor, and antenna system may be integrated in one package or partitioned into numerous cooperating or redundant packages. System 100 may be expanded to include any number of host computers (one shown for simplicity), any number of monitors (two shown for simplicity), and any number of antenna nodes per antenna system (two shown for simplicity). Antenna system 120 may be integral to a single location, distributed within one or more zones, or mobile. Similarly, objects 102–112 may have relatively fixed locations (e.g., embedded in roadways, moving belts, etc.) when monitors are mobile or portable.

Figure 2:
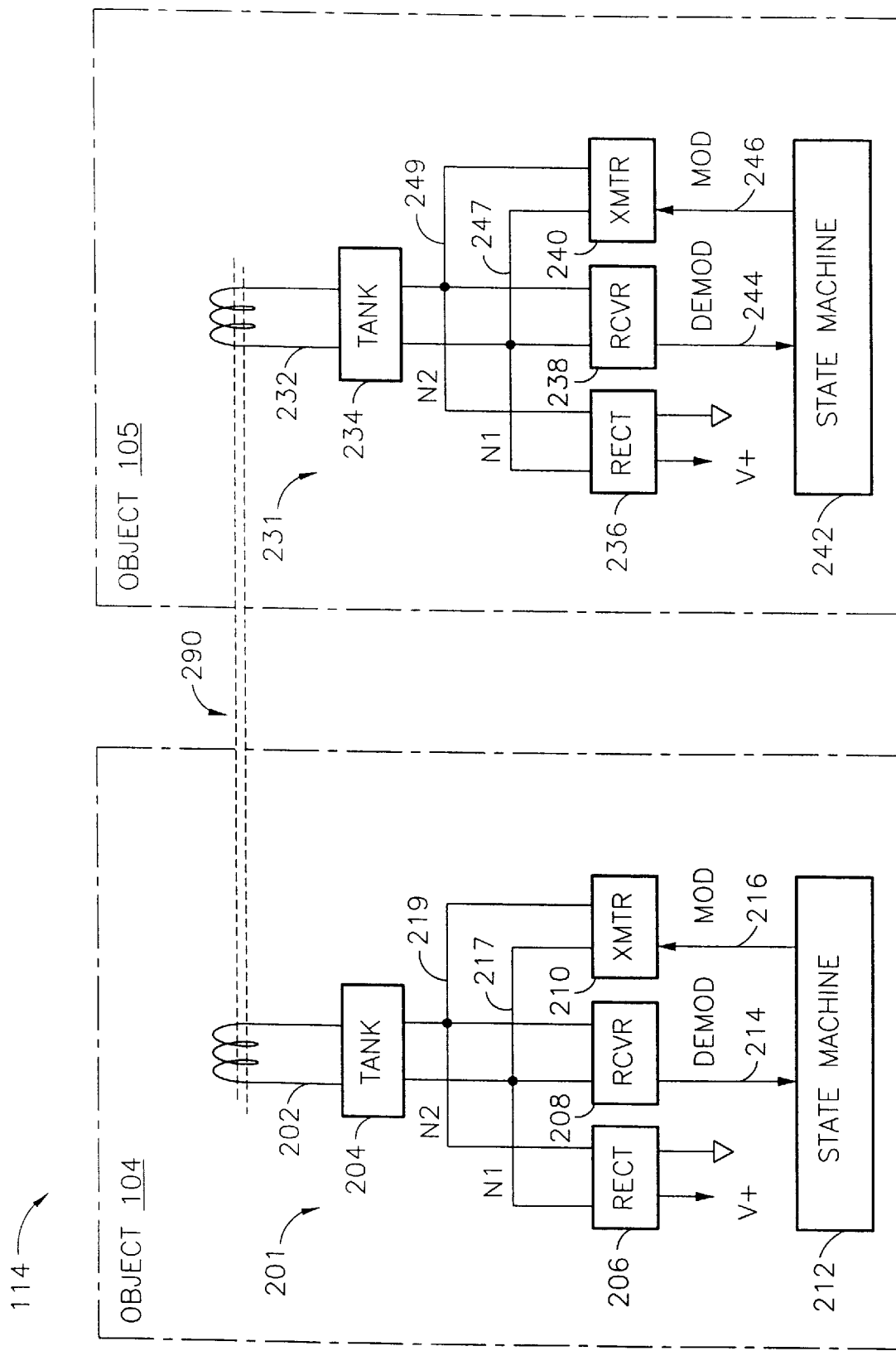
FIG. 2 is a functional block diagram of an exemplary implementation of the transceiver portions of objects 104 and 105 in the system of FIG. 1.

Objects 104 and 105 form stack 114, wherein respective object antennas are coupled to some extent (e.g., more or less aligned in parallel planes or coplanar and/or positioned in more or less close proximity to each other). Likewise, objects 107 through 112 form stack 116. For objects having planar antennas operating at from 1 to 15 MHz, coupling sufficient to observe a stack resonant frequency different from the resonant frequency of an isolated object may occur at distances between parallel aligned object antennas less than 8 inches (e.g., about 1 inch). Stack 114 of objects 104 and 105 cooperate as described below with reference to FIG. 2. Each object 104, 105 includes an identical transceiver 201, 231. Transceiver 201 includes antenna 202, tank circuit 204, rectifier 206, receiver 208, transmitter 210, and state machine 212.

Tank circuit 204 is a conventional resonant circuit (e.g., a series, parallel, or series/parallel resonant circuit). The inductance of antenna 202 may cooperate with tank circuit 204 as an additional inductance or as the primary inductance of tank circuit 204. Antenna 202, when located proximate to antenna 232, may be joined by lines of flux indicated generally as 290. Lines of flux 290 represent magnetic coupling between antennas 202, and 232. The effects of magnetic coupling on tank circuit 204 include (a) change to the resonant frequency of tank circuit 204, (b) change to the Q of tank circuit 204, (c) loading of transmitter 210 when transmitting, and (d) attenuation of any signal (e.g., power or message) received by receiver 208. When tank circuit 204 receives energy for the purpose of providing power to transceiver 201, magnetic coupling may decrease the energy received for conversion to power by rectifier 206. Tank circuits 204 and 234 cooperate when coupled (e.g., ring currents in phase, one resonant frequency herein called the stack resonant frequency, and energy sharing). Particular advantages are obtained in system 100 as a consequence of enhancing some of these effects and accounting for these effects in the functions performed by monitor 124 and/or host computer 122. For a transceiver operative at 8 to 10 MHz (preferably at about 5.5 MHz) tank 204 may have a Q in the range 90–130 in isolation, 40–70 when coupled to transceiver circuitry, and as low as 20 when proximate to other transceivers. For example, a stack of from 3 to 100 transceivers in coplanar orientation may have a Q of about 35.

Figure 5:
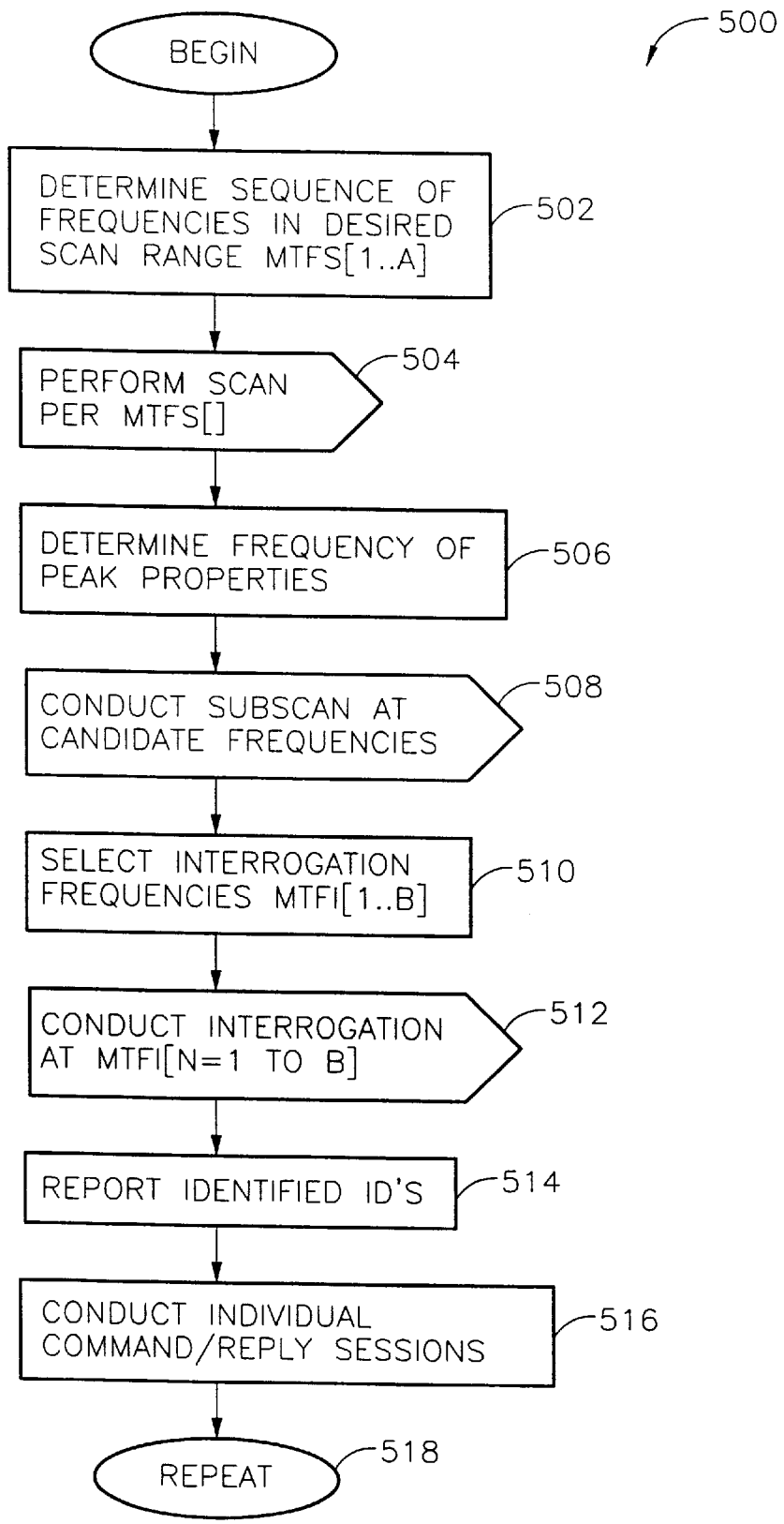
FIG. 5 is a flow diagram of a method for data communication between a monitor and one or more transceivers of the system of FIG. 1.

Each monitor 124, 126 may at any suitable time perform a method for selecting one or more frequencies (or bands of frequencies) for communication between the monitor and one or more objects. Upon selecting a frequency (or band) for communication, monitor 124 may proceed further to detect, empower, interrogate or transfer data with one or more transceivers by transmitting and/or receiving messages using the selected frequency (or band). For example, method 500 of FIG. 5 may be performed by monitor 124, or by the cooperation of host computer 122 and monitor 124 as discussed above. A monitor may provide power to transceivers at any time with respect to other communication (e.g., prior to interrogation, interleaved during interrogation, simultaneously on another frequency, or not at all for battery powered transceivers).

At step 502, a sequence of frequencies in a desired scan range is determined and stored in an array of monitor transmit frequencies for scanning, MTFS [1 . . . A]. Such a sequence of frequencies may include any integer number of frequencies (e.g., as indicated by the variable A) and may be selected from (or stored in) array MTFS in any suitable order. Preferably, a sequence of frequencies is selected so as to avoid transmitting more than a predetermined average power in any particular band of frequencies. A frequency range may be divided into any number of bands. Such bands may be of any bandwidth, may overlap, and may omit one or more portions of the range. The sequence of frequencies may provide for one or more transmissions in a first band followed by one or more transmissions in any other band. For example, transmission on a frequency in a first band (e.g., F308 in band F304 to F312) may be followed by transmission of any frequency in a second band (e.g., F324 in band F320 to F328) to limit average power transmitted in the first band. A frequency offset from the beginning of a band may be used as an offset in another band; although, differing respective offsets in each band may be used. For example, any order of frequency transmission described in related patent application Ser. No. 09/088,924, cited above may be used.

Scanning may be defined for a range about a center frequency divided into an integer number of contiguous bands of identical bandwidth. For the purpose of limiting average power transmitted in each band, scanning may be accomplished in a number of subscans. Each subscan may include one transmission in each band at an offset from the lower boundary of the band. The subscan may proceed from band to band in sequential order of increasing frequency. The offset used in a first subscan may be increased by an incremental amount for use in a subsequent subscan. The number of subscans performed may depend on whether a frequency of interest or candidate frequency is detected (as discussed below); or the number of subscans may be equal to the number of transmissions to be made in each band Given all of the above constraints, the frequency used in each transmission may be expressed by the formulae:

$$f(s, t) = [n(s, t) \times (2R/N)] + (F - R)$$

$$n(s, t) = (s + (N/T)(t)) \quad \substack{(N/T)-1 \\ s=0} \quad \substack{(T-1) \\ t=0}$$

F is the midpoint frequency (e.g., in MHz);

F±R is the range of frequency to be scanned;

2R/N is the increment in frequency (e.g., in MHz),

N is the total number of transmissions in the range to be scanned;

T is the total number of transmission in a subscan;

n is the frequency number for each transmission;

s is the subscan number within each scan; and t is the transmission number within each subscan.

In the scanning technique described by the above formulae, N, T, n, s, and t may all be integers to facilitate computation (e.g., loop counters and limits). Values for s and t may be consecutively selected as integers from the series of integers indicated by the bounds in the above formulae.

In alternate scanning techniques, any series may be used in place of the series of integers, for example, a series of real numbers may be used. Any function may be used to determine a next value of the series, including, for example, a pseudo random number generator. When bands are not treated consecutively, are not of equal bandwidth, or are not contiguous, any algorithm (e.g., a look up table, or set of rules) may be used to determine suitable values for a next frequency to be used for transmission. Similarly, a suitable offset to be used in each subscan for each band may be determined by any suitable algorithm. For example, a pseudo random number generator may be used to determine a next band and a next offset for a next transmission in that band. The amplitude and/or duration of each transmission may vary, for example, as a function of frequency, when average power is to be limited into a reactive or resonant load (e.g., a load that is not purely resistive). A next frequency that is determined according to a series or algorithm as discussed above, may be omitted from a subscan as a consequence of forecasting the average power that would be transmitted in the band and determining whether a maximum average power would be exceeded if the transmission were not omitted. Such a determination may include an accounting for prior transmissions over a suitable time period.

When different operating frequencies are used for different communication purposes as discussed above (e.g., an object may have a resonant circuit for receiving power and a second resonant circuit for interrogation), frequencies for scanning may be chosen in any sequence for determining any combination of operating frequencies of one or more objects. For transceivers operative in isolation at about 5.5 MHz, scanning may include frequencies in a range from about 2.5 MHz (e.g., F304) to about 6.0 MHz (e.g., F328) to account for manufacturing tolerances and object orientation (e.g., stacks) as discussed above.

Array MTFS may include, for each frequency, values that specify the configuration to be used for transmitting and receiving. Such values may specify configuration parameters for each transmitter (e.g., power level, synchronization, duration, one or more antennas, tuning, and driving phases) and for each receiver (e.g., selection of detector, selection of clocking signals, filter parameters, synchronization, one or more antennas, tuning, squelch timing, and signal processing parameters as discussed below). For efficiency, default values or references to sets of predefined values may be used. Filter parameters and/or signal processing parameters may effect selective attenuation of interference (in time domain or frequency domain) as determined in any prior execution of a step of method 500. Because both transmit band and receive band may be specified for each entry in array MTFS, alternate scanning techniques may be used including: (a) transmit a narrow band signal and receive with a wide band detector; (b) transmit a wide band signal and receive with a narrow band detector; (c) transmit two or more narrow band signals (consecutively or simultaneously) and receive with a wide band detector; or (d) maintain transmitting of a wide band signal while receiving at consecutive times with different narrow band detector settings.

Figure 6:
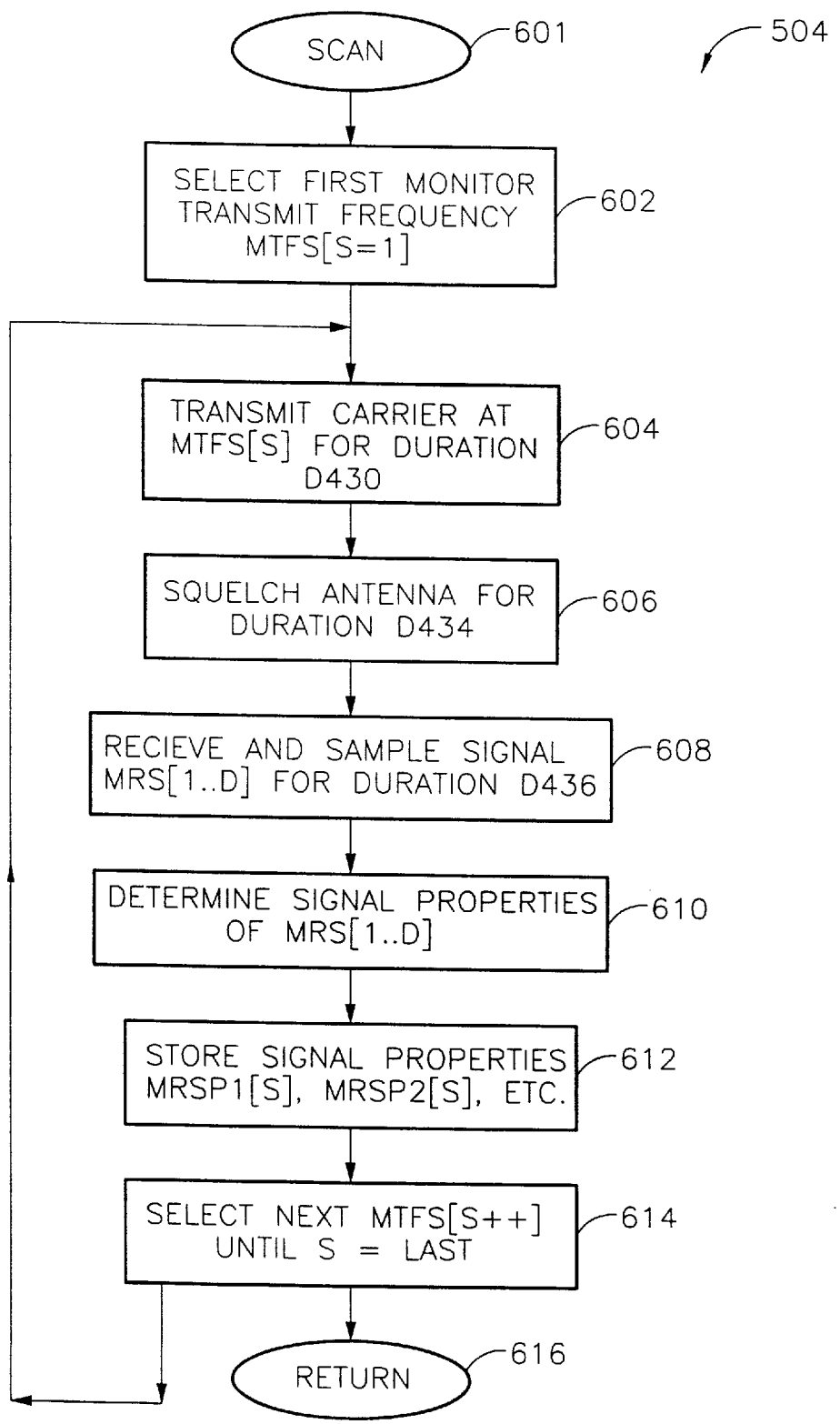
FIG. 6 is a flow diagram of a method for performing the scan step of the method of FIG. 5.

At step 504, a scan subroutine is performed in accordance with the contents of array MTFS. Any suitable method of scanning may be used for determining one or more signal properties of candidate frequencies to facilitate selecting one or more frequencies for interrogation. Particular advantages are obtained in system 100 by use of a scan method of FIG. 6. Control may be transferred from step 504 to step 601 of FIG. 6.

At step 602, the first monitor transmit frequency for scanning is selected from array MTFS using a loop variable S that is assigned the first index value 1.

Figure 4:
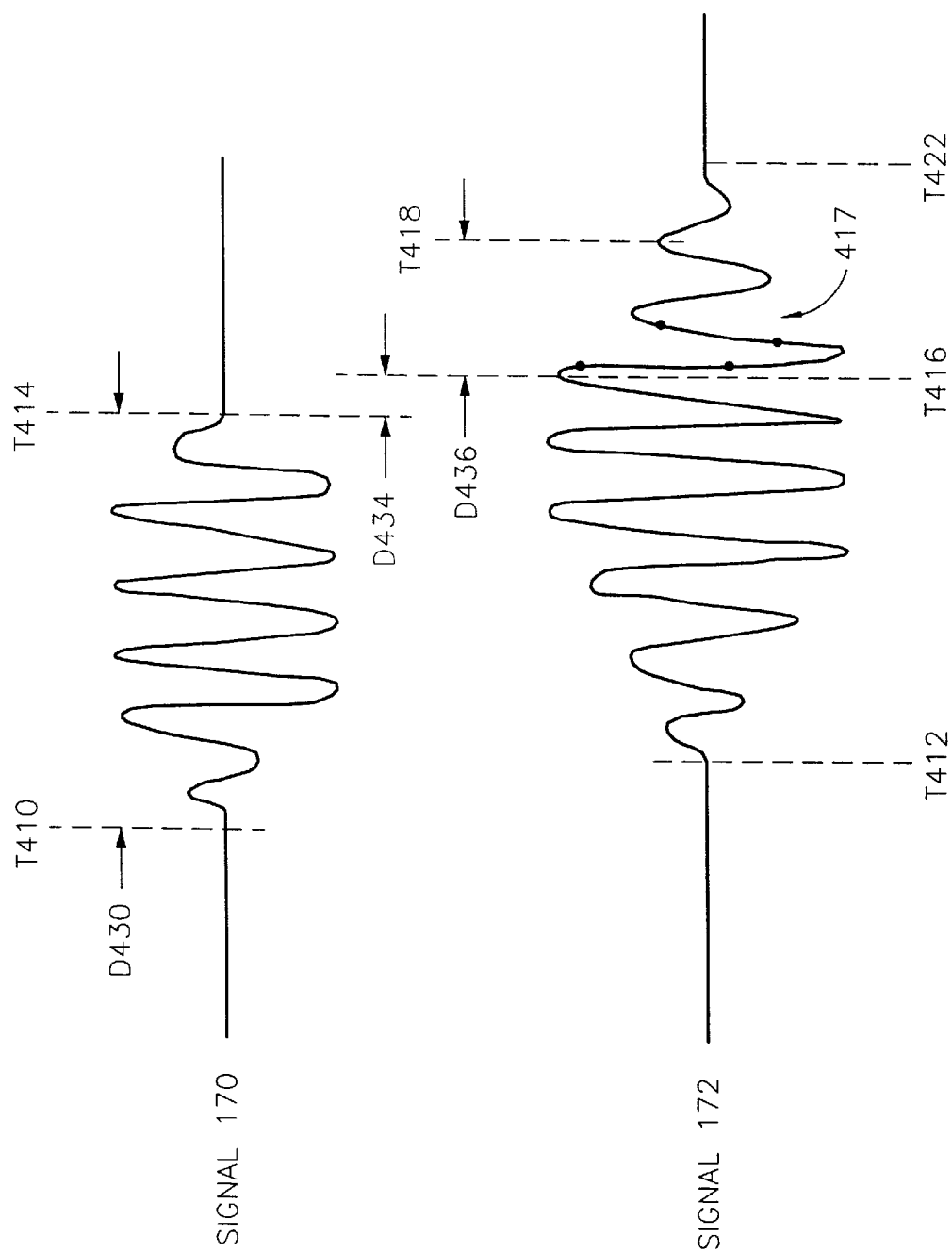
FIG. 4 is a timing diagram of signals 170 and 172 in a transmission and response scenario of the system of FIG. 1.

At step 604, unmodulated carrier at the frequency indicated by the value MTFS[S] is transmitted from antenna system 120 (e.g., one or more default antennas, or one or more antennas determined in step 502 discussed above) for duration D430 illustrated as signal 170 in FIG. 4. Carrier transmission begins at time T410 and continues until time T414. The rise and fall time of the unmodulated carrier may be substantial as shown in FIG. 4 or (preferably) may be negligible. The duration D430 is preferably short in comparison to a START signal discussed below. Full operation of transceivers 201, 231 is not required during scanning. In a preferred scanning method, carrier transmission is insufficient to provide operative power in any transceiver.

At step 606, one or more antennas (e.g., those used in antenna system 120 for the transmission of carrier in step 604) may be squelched for duration D434 to stop radiation which may interfere with receiving on the same or different antennas. The antenna squelch function is effective on or near a zero crossing of signal 170, as shown at time T414, to avoid transmitting out-of-band noise. The squelch operation is complete at time T416. The duration D434 is preferably less than one period of the frequency being transmitted at step 604 (e.g., from about three periods of the transmitted carrier to less than 1 microsecond, preferably from 1 to 3 $\mu$sec). Antennas not in use are squelched or left open to avoid detection of an antenna resonant frequency at step 608.

Energy transmitted by signal 170 (e.g., a magnetic field), when received by one or more transceivers 201, 231, will consequently develop an oscillating (i.e., ringing) current in tank circuits 204, 234 and antennas 202, 232. Each oscillating current will persist after time T414 as a consequence of the Q of the tank circuit. For example, as an oscillating current passes through antenna 202, a ring signal is transmitted from antenna 202 from time T416 to time T422. Signal 172 of FIG. 4 illustrates in an approximate fashion the extent of the ring signal. When lines of flux 290 couple one or more tank circuits, all coupled tank circuits cooperate. Consequently, signal 172 may include the superposition of signals from one or more separate objects and/or one or more stacks, as described above. Signal 172 is typically several orders or magnitude lower in amplitude than signal 170. Signal 172 may also differ in frequency and phase from carrier signal 170. These differences in frequency and phase, as well as changes in amplitude of signal 172 between times T416 and T422 convey information about tank circuit 204, about the orientation of transceiver antenna 202 with respect to antenna system 120 and other transceivers, the number of simultaneously ringing tank circuits, and possibly the location and relative movement (e.g. within a zone) of tank circuits with respect to antenna system 120.

At step 608, signal 172 is received by antenna system 120 (e.g., one or more default antennas, or one or more antennas determined in step 502 discussed above) and sampled for duration D436 between times T416 and T418. Although a shorter duration may be used, the duration T416 to T418 and the sensitivity of the receiver (at signal levels expected to be received in a particular application) are selected to provide about 8 periods of the ring signal for sampling. A number of samples 417 are recorded in monitor received scan array MRS[1 . . . D]. Each sample may indicate an amplitude of signal 172 (e.g., a measured analog voltage converted to a digital representation). In addition, samples may be taken at time T418 through time T422 for further analysis.

At step 610, various signal properties are determined in accordance with the contents of array MRS and similar arrays corresponding to prior performances of step 610. Any conventional signal property may be determined. A particular signal property may be determined at a first time (A) and again at a second time (B) (during the expected decay time of a ring signal) and the relationship between signal property magnitudes at A and B may be used to determine a third signal property. The analysis of signal properties may proceed in the time domain (e.g., amplitude, phase) or in the frequency domain. Analysis in the frequency domain may proceed from the result of a conventional fast Fourier transform (FFT) of a series of samples (e.g. a sampling window of 5 to 50 μsec) taken beginning at time A (e.g., time T416 for 5 μsec) and/or beginning at time B (e.g., time T418 for 5 μsec). Examples of suitable signal properties are described in Table 1. In an alternate implementation samples are taken at another time C after time B. Values of samples at times A and C are then normalized by dividing (e.g., A'=A/B and C'=C/B) or by subtracting (e.g., A'=A−B and C'=B−C). Times A, B, and C may be arranged at even time intervals within the expected duration of a response signal or reply signal.

At step 612, each signal property determined in step 610 is stored in an array at an index position corresponding to the transmitted frequency at step 604. For example, several arrays for monitor reply signal properties may be indexed using the loop variable S, as MRSP1[S], MRSP2[S], etc.

At step 614, the loop variable S is incremented and a subsequent monitor transmit frequency is selected until all monitor transmit frequencies have been transmitted. When a next monitor transmit frequency has been selected successfully, control passes to step 604; otherwise, control passes to step 616 for a return to the calling routine, for example, following step 504.

At step 506, arrays MRSP1, MRSP2, etc. are analyzed individually and/or by comparison and/or correlation to

TABLE 1

Figure 3:
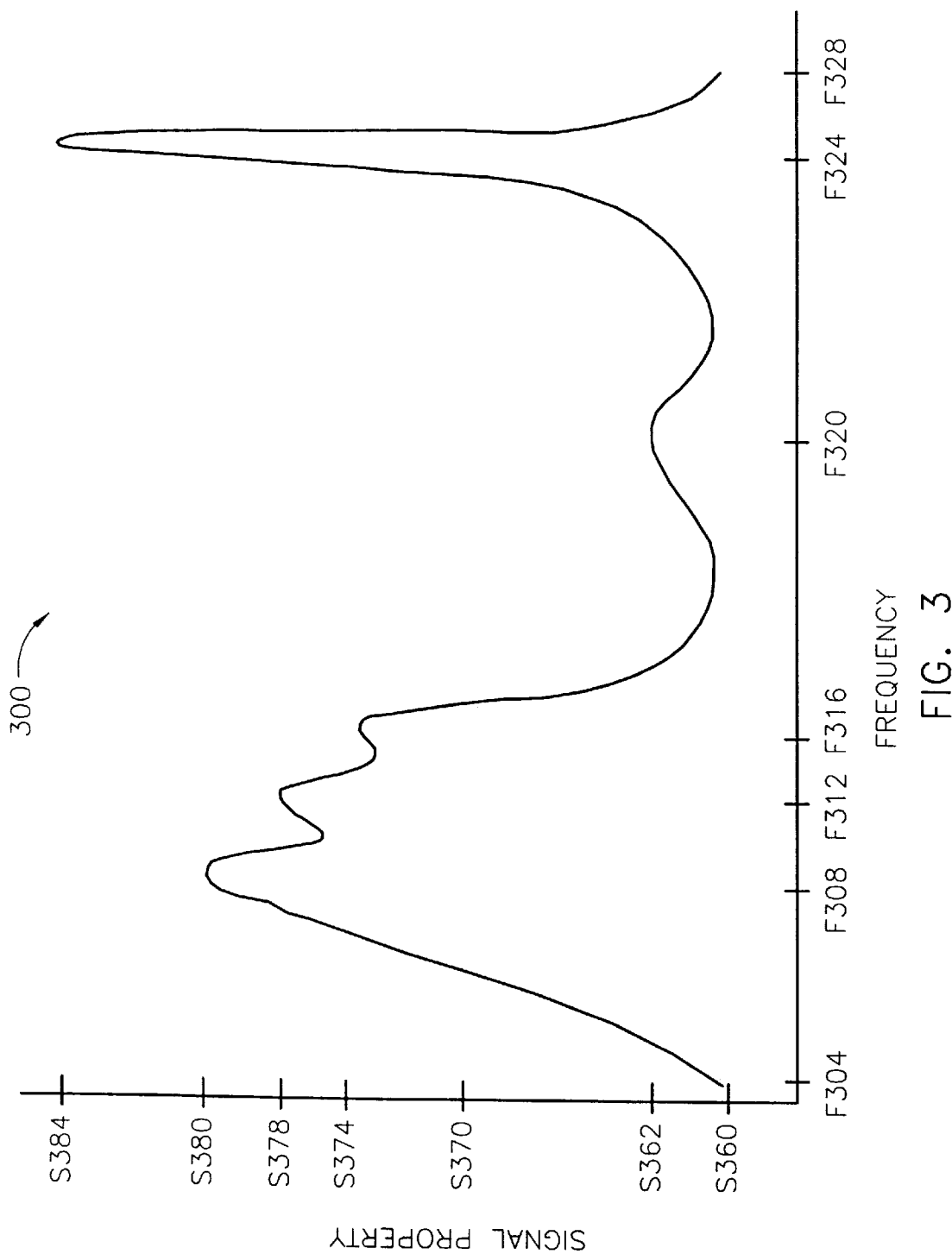
FIG. 3 is a graph of signal property magnitude verses frequency, for the population of objects 102 through 112 in the system of FIG. 1.

| Signal Property | Description |
| --- | --- |
| A-B | A signal amplitude at time A is expected to be greater than a signal amplitude taken at time B. If not, the signal being analyzed may be interference, for example signal 193. The amount of the difference in amplitude should fall within an acceptable range. The range is based on the Q of tank circuit 204 and/or other coupled tank circuits, and the effect of simultaneous ring signals from several coupled or uncoupled transceivers. |
| A/B | The ratio of an amplitude taken at time A to an amplitude taken at time B provides an alternate indication of the Q of the ringing tank or tanks, as discussed above. The ratio is expected to fall within a range of Q values for tank circuits and stacks to be encountered by system 100. The A/B technique may provide more reliable results than the A-B technique at low noise conditions. |
| A (at freq$^1$) vs. A (at freq$^2$) | The signal amplitude at each of two or more frequencies (when normalized) provides information that is expected to be consistent with the Q of the ringing tank, or tanks, as discussed above. The difference between the normalized amplitude at any frequency when compared to an expected amplitude (based on a range of Q), if not within or acceptable range may indicate that one or more signal amplitudes correspond to noise or interference. |
| Phase at time B | The phase of the signal at time B is expected to correspond to the phase of a decaying sinusoid of phase known at time A. The phase may be determined in any manner including, for example, comparing signals from multiple receivers each having a phase sensitive detector, locking a phase-locked loop at time A for use at time B, or using digital signal analysis. When the phase at time B differs from the predicted phase by more than a predetermined amount, the signal may be interference. |
| FFT(A) vs. FFT(B) | Frequency components of the result of an FFT analysis may indicate one or more significant component frequencies. The magnitude of frequency components of an FFT taken at time A should not differ more than a predetermined amount from the magnitude of corresponding frequency components of an FFT taken at time B. |
| FFT(A at freq$^1$) vs. FFT(A at freq$^2$) | An FFT resulting from transmission at a first frequency is expected to have frequency components that correspond to frequency components of an FFT resulting from transmission at a second different frequency. When the respective amplitudes of corresponding components do not differ more than a predetermined amount, the non-different component may be a component of an interference signal, for example, signal 193. |
| Phase(A at freq$^1$) vs. Phase(A at freq$^2$) | A tuned circuit ring signal is expected to exhibit a strong phase to frequency variation at frequencies near the resonant frequency. If the phase does not vary by more than a predetermined amount as measured at a first and a second frequency, the signal may be interference. |
| $A_{a1-a2}$ = A(using antenna 1) − A(using antenna 2) | An amplitude signal (e.g., at time A or B above) may be modified by subtracting the signal as received from more than one antenna. Common mode rejection results. The modified signal technique may be used in place of any non-modified signals in any of the properties discussed above (e.g., $A_{a1-a2} - B_{a1-a2}$; $A_{a1-a2}/B_{a1-a2}$; FFT($A_{a1-a2}$); etc.) |
| $A_{d1-d2}$ = A(using wide-band detector 1) vs. A(using narrow-band detector 2) | Because a ring signal is a narrow band signal, a wide band detector and a narrow band detector are expected to provide signals of similar amplitude in a low-noise environment. If the environment is known to be low-noise and the wide band detector produces a signal amplitude that exceeds by more than a predetermined amount the signal amplitude produced by a narrow band detector, the signal being received by both detectors may be interference. | determine which frequency or frequencies correspond to maximum values of a figure of merit based on one or more signal properties. Correlation may be time coherent or spectral coherent. For example, if a figure of merit is based solely on a single signal property as illustrated in FIG. 3, a conventional array analysis may be used to determine that frequency F324 corresponds to a maximum signal property S384. Here, the graph of values shown in FIG. 3 may be represented in memory as a list (or array) of frequency-property pairs including, for example, (F304,S360), (F308, S380), and numerous pairs in between. Peak values of the signal property may be noted in the analysis, including frequencies F308, F312, F316, and F320. Further analysis may determine one or more candidate frequencies in accordance with conventional profile recognition logic and profiles of expected signal properties based on theoretical models, measurements, and analysis. For example, if frequency F324 corresponds to the tank frequency expected for a transceiver operating individually, then frequency F324 would be a candidate. By profile recognition, frequency F320 may be determined to correspond to stack 114 and frequencies F308, F312, and F316 may correspond to stack 116. Using the signal property value S384 for normalization, it may be determined that signal property value S380 corresponding to frequency F308 is also a candidate because its relative amplitude meets or exceeds a threshold value. However, signal amplitude S378 and S374 corresponding respectively to frequency F312 and F316 may be of little interest based on the possibility that these minor peaks in signal property value may correspond to object 107 and 112 (or similarly situated objects) having weaker coupling to all other objects 108 through 111 of stack 116 due to being positioned at the respective ends of stack 116. In other words, frequencies F308, F312, and F316 may correspond to a single stack 116 which may be interrogated at a single frequency, for example frequency F308. Communication may be conducted at frequencies F312 and F316 intentionally for one or more purposes (e.g., transmitting operative power), for example, when it is expected that each frequency respectively corresponds to a different one or more transceivers (e.g., a transceiver detuned for any reason including proximity to another transceiver or to a surface that interfaces with communication as discussed above).

In addition to the analysis of maximum values of the signal property shown in FIG. 3, further analysis may account for the Q (e.g., quality factor or standard deviation) of the signal property at each peak frequency. For example, signal property at frequency F324 exhibits a high Q; signal property at frequency F308 exhibits a somewhat lower Q; and, signal property at frequency F320 exhibits a relatively low Q. Some frequencies initially considered candidates may be eliminated when the value of the signal property (or figure of merit) does not correspond to a Q greater than a minimum expected Q, or the relative magnitude of the signal property value does not exceed a minimum expected magnitude. In the case of stack 116 which may exhibit a signal property having multiple peak values as illustrated at frequency F308, F312, and F316, further analysis may be employed to determine which of the three possible candidate frequencies is most suitable for interrogation.

In a controlled environment, signal properties may indicate the number of objects present, improper orientation of one or more objects, or improper spacing between objects.

Figure 7:
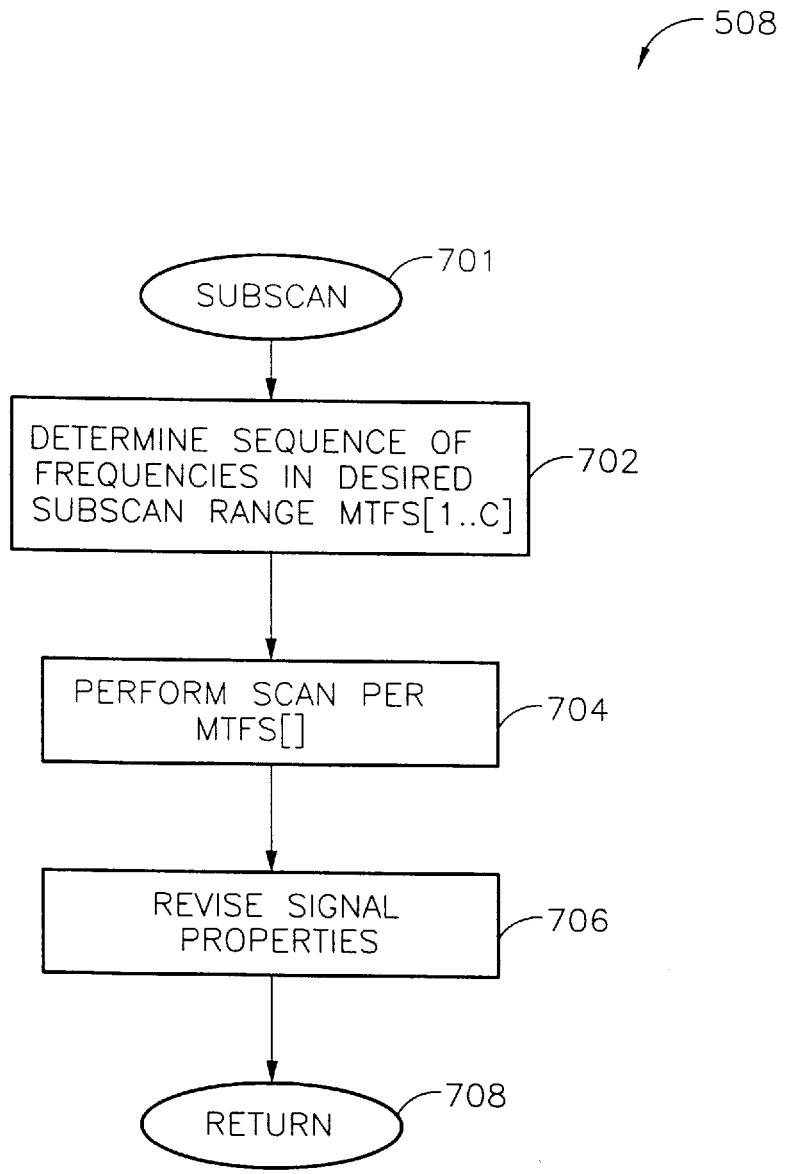
FIG. 7 is a flow diagram of a method for performing the subscan step of the method of FIG. 5.

At step 508, one or more candidate frequencies may be subject to further analysis in conjunction with a subscan procedure. For each candidate frequency a suitable range of frequencies proximate to the candidate frequency is specified for a subscan. Any subscan procedure may be used. Particular advantages are obtained in system 100 by performing the subscan procedure in a manner similar to the scan procedure discussed above with reference to step 504. For example, control may transfer from step 508 to step 701 of FIG. 7. Frequency values specified for a subscan in array MTFS may be accompanied by any of the configuration values (e.g., revised for this subscan) discussed above with reference to Step 502.

At step 702, a sequence of frequencies within each desired subscan range is determined. Values in an array of monitor transmit frequencies for scanning are determined, for example MTFS[1 . . . C]. A typical subscan may span a frequency range of ±200 KHz around a frequency of interest.

At step 704, a scan procedure is performed in accordance with the contents of array MTFS. Control may transfer to step 601 and returns from step 616 as described above.

At step 706, revised signal property arrays MRSP1, MRSP2, etc. are used to revise one or more figures of merit as discussed above with reference to step 506. Control returns at step 708 to the calling routine, for example, step 510 of FIG. 5.

At step 510, each frequency associated with a figure of merit having an appropriate magnitude is identified in an array of monitor transmit frequencies for interrogation, for example, MTFI[1 . . . B].

At step 512, each interrogation frequency is used in the conduct of an interrogation scenario. Any interrogation protocol and modulation method may be used. Suitable interrogation protocols are described in TABLE 2. An interrogation protocol for use in system 100 includes any conventional protocol for the transfer of an individual identification from a transceiver to a monitor, as well as any protocol from which a monitor may determine an individual identification. Subsequent communication employing the individual identification may then proceed without collision, interference, or ambiguity in system operation. Any message format and modulation method may be used, preferably a narrow-band modulation, for example, any pulse width modulation (PWM) technique.

Transceiver identification may include the frequency (or frequency band) in which communication can be reliably established, a code or sequence of codes recognized by the transceiver for enabling one or more replies, a code indicated in (or by) a reply, or a combination of these features.

TABLE 2

| Protocol | Description |
|---|---|
| 1 | Time for beginning transmission of reply message may be determined by the object's transceiver according to a random number to decrease probability of collision. Long reply messages may be used. Object or monitor (or both) may include a mechanism for collision detection to initiate retry. Content of reply message may convey identification. |

TABLE 2-continued

| Protocol | Description |
|---|---|
| 2 | All objects may have an assigned reply slot number. Object identification may be communicated in N parts in the corresponding reply slot in reply to N requests. Content of reply slot may convey identification. |
| 3 | Objects may reply redundantly in more than one reply slot in reply to a single request. Collision detection may be used by the monitor to determine whether data in a particular reply slot is valid. Content of one clear reply slot may convey identification. |
| 4 | A particular address or a group address may be sent with the interrogation message. Objects may reply when addressed in particular or as members of the requested group. Failure to be addressed may impose an initial state (e.g., reset), preventing further replies. Context of a particular address may be implied from immediately preceding group address(es). When addressed, a reply in a particular reply slot may indicate a next address in a predetermined sequence. Being addressed may silence replies after a predetermined minimum number of replies (e.g., one). Content of reply slot may serve for reliable detection or for additional identification. |
| 5 | A relatively long identification number may be broken up into several shorter access codes, each access code associated with a level. Objects may be addressed in any sequence of access codes. When sufficient access codes have been received, a reply in a particular reply slot may indicate an access code for another level in a predetermined sequence, a final portion of the identification number, or data provided to the monitor. Groups of objects may be programmed with identical access codes at predetermined levels for obtaining replies in a particular reply slot indicating an access code at a predetermined level. Content of reply slot may be for reliable detection, additional identification, or providing data to the monitor. |
| 6 | Presence of individual and coupled groups of object transceivers may be determined. Identification may be determined in part by a frequency of a response signal. A group of transceivers may be enabled (turned on) in accordance with one frequency of response. Each reply time slot may be assigned or directed to be self-assigned (e.g., randomly). Reception of replies may be restricted to a narrow band (e.g., notch) to ignore objects not in the desired group. Time slots may be read in one or more messages addressed to subgroups. Identification may be determined from slot number of reply and/or content of reply. A subgroup may be turned off or automatically disabled. Interrogation may continue for another subgroup or frequency until all portions of identification have been determined. |
| 7 | Any combination of techniques illustrated by the above protocols may be used in full or in part. |

Figure 12:
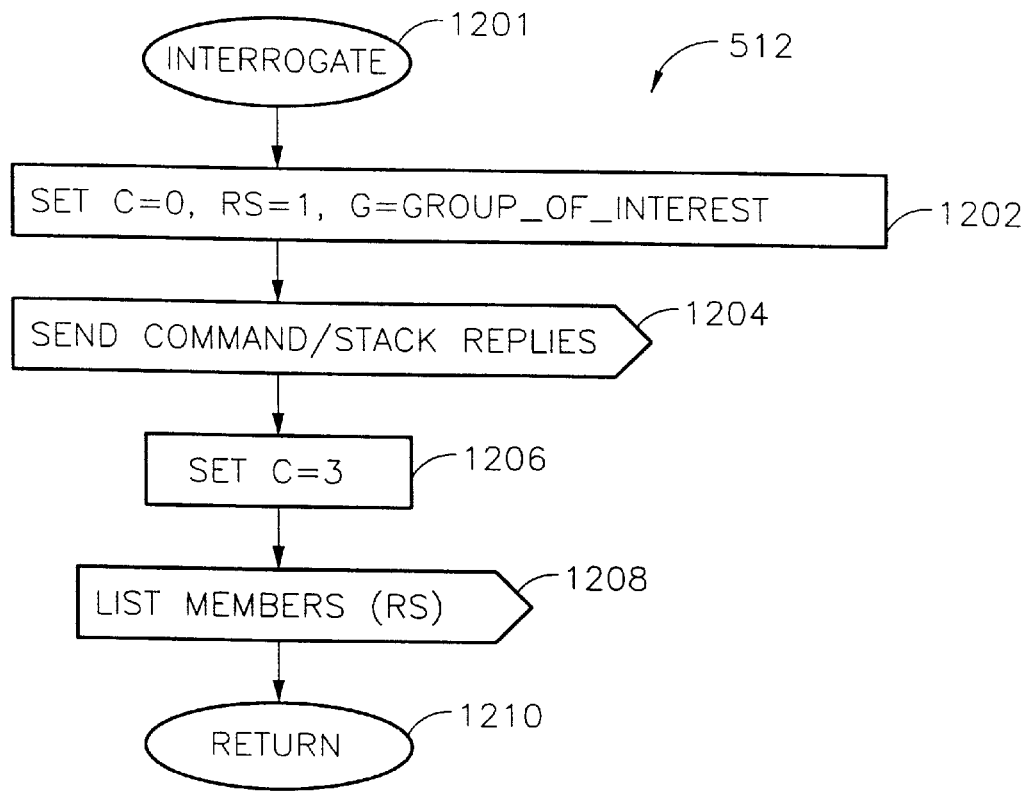
FIG. 12 is a flow diagram of a method for performing the step of interrogation in the method of FIG. 5.
Figure 13:
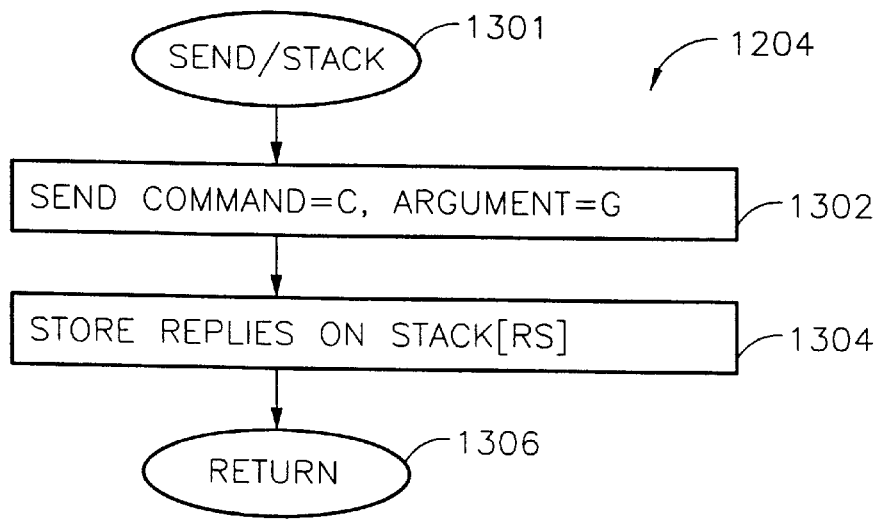
FIG. 13 is a flow diagram of a method for performing the "send command and stack replies" step of the method of FIG. 12.
Figure 14:
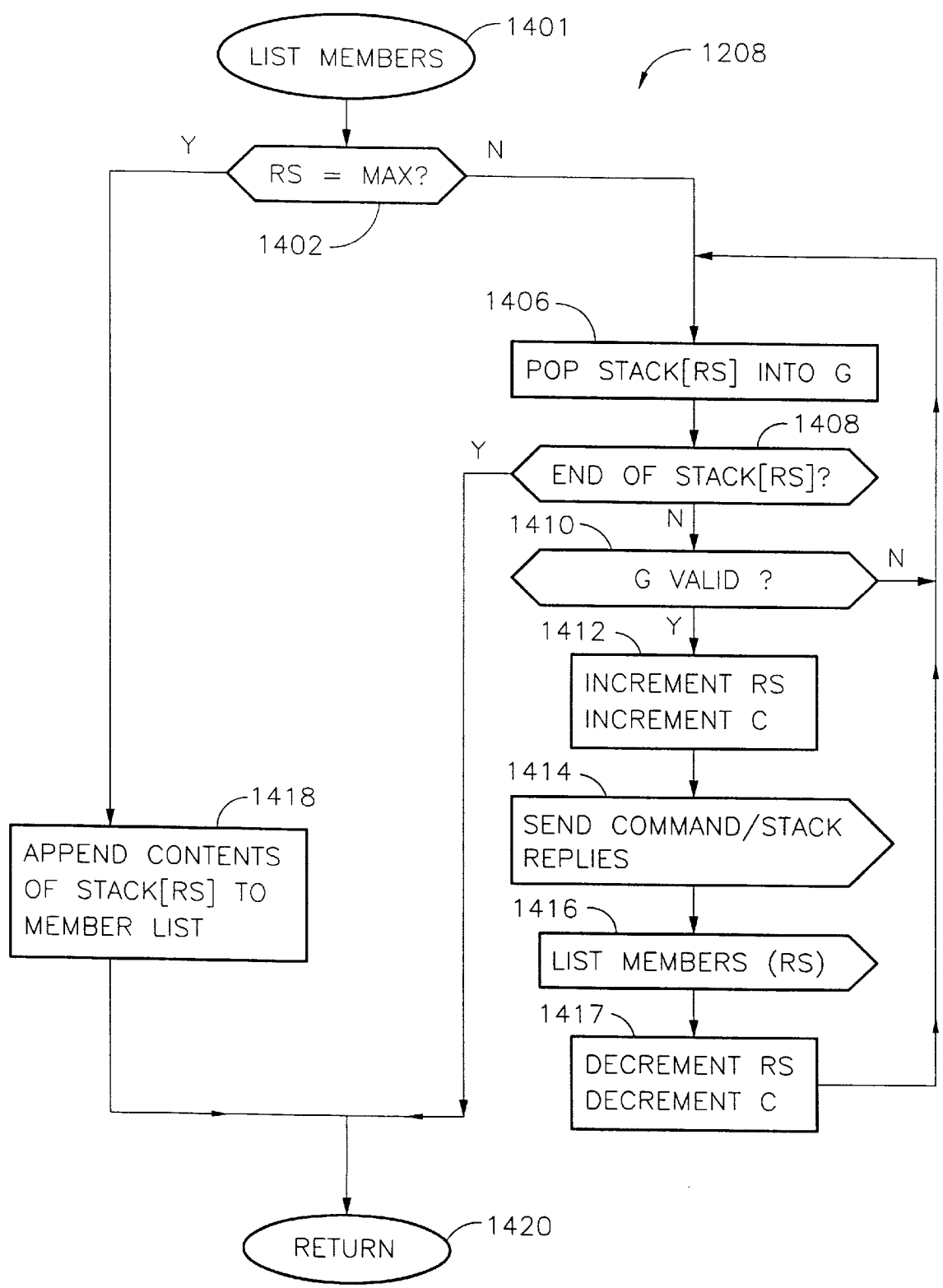
FIG. 14 is a flow diagram of a method for performing the "list members" step of the method of FIG. 12.

Particular advantages are obtained in system 100 using the interrogation procedure 512 described in FIGS. 12, 13, and 14. Control may transfer from step 512 to step 1201 with reference to FIG. 12.

The selected frequencies at step 510 may be used for interrogation, or, alternatively, these frequencies may be used for transferring power from monitor 124 to one or more objects 102 through 112. In this latter case, interrogation may proceed in any conventional manner on any suitable frequency. For example, an object of the present invention having a tank circuit that cooperates with the tank circuit of proximate transceivers may receive energy from a broadcast at a frequency that is near the resonant frequency of the tank circuit. Further, such a transceiver may respond and participate in an interrogation scenario at another frequency (e.g., 250 MHz to 350 MHz) using conventional RFID. The interrogation protocol and transmission modulation techniques used in conventional RFID include, for example, frequencies selected for suitable propagation characteristics, infrared and other optical frequencies, and ultrasonic and other audio frequencies. Magnetic coupling between proximate transceivers as described above with reference to FIG. 2 may be obtained at any frequency suitable for the dimensions of antennas and distances between antennas for the desired communication purpose. Magnetic coupling is preferred for providing a power signal so as to limit the range of the power signal to meet regulatory guidelines.

Modulation techniques include, for example, spread spectrum, amplitude modulation, frequency modulation, single side band modulation, and off/on keying (OOK) modulation. OOK is preferred for its narrow frequency spectrum, permitting communication in the presence and orientation of other objects that absorb portions of widerband modulation to an unpredictable extent.

According to various aspects of the present invention, the complexity of circuits and firmware for performing the functions of a transceiver may be reduced by employing one or more of the following techniques in combination: (a) receiving operative power for the transceiver via the antenna and tank as described above; (b) employing transceiver detection (e.g., detecting a ring signal) at the same frequency that is used to power the transceiver; (c) employing OOK modulation for interrogation; (d) conducting interrogation at the same frequency as used for powering the transceiver, (e) limiting the reply from a transceiver during interrogation (e.g., one or two bits); (f) employing multiple predetermined reply slots for multiple transceivers to reply to a single command; (g) using predetermined durations of unmodulated carrier for one or more transceiver reset operations; (h) employing a transceiver identification number of sufficient resolution to practically reduce the possibility of collision in an expected operating environment to a negligible amount (e.g., possibly to zero); (i) employing a protocol that identifies when a reply corresponds to exactly one transceiver without relying upon collision detection mechanisms; and (j) employing a transceiver identification number divided into N parts and employing a protocol for ascertaining a part of an identity in more than one different sequence of interrogation messages.

Figure 8:
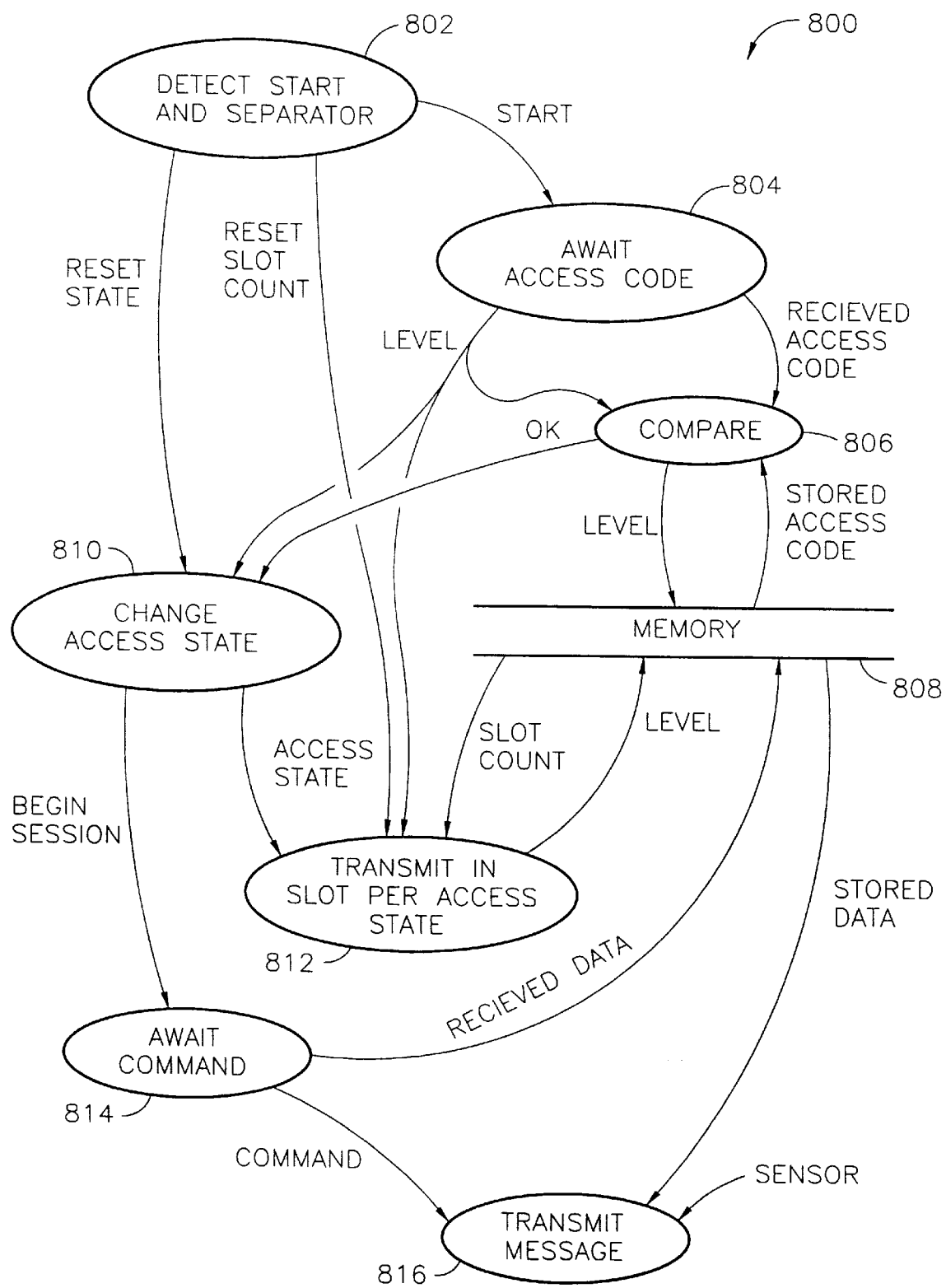
FIG. 8 is a data flow diagram of processes performed by each transceiver in an exemplary implementation of the system of FIG. 1.

The functions of monitor 124 and transceiver 201 will be described below in an implementation that includes all of the techniques listed above. Although any implementation of hardware, firmware (e.g., state machine microcode), or software (e.g., microprocessor instruction code) may be used to perform that portion of the protocol assigned to the transceiver, an exemplary implementation supports interrogation and further supports read/write data communication. For example, the process 800 of FIG. 8 may be performed by a transceiver 201, in order to support such a protocol. Process 800 includes processes for the detection of START and SEPARATOR signals 802; awaiting an access code 804; changing an access state 810; comparing an access code to an access code from memory 806; transmitting a reply in a reply slot in accordance with an access state 812; awaiting a command 814; and transmitting a message 816.

These processes may be supported in any combination of software, firmware, or logic circuits. Execution of these processes may proceed in an interrupt driven, polled, single threaded, or multitasking parallel execution manner. As discussed below, a process notifies another process in any conventional manner, for example using a common variable, giving a command, producing a signal, etc.

Process 802 continuously analyzes received carrier for indications of a START signal and a SEPARATOR signal. Uninterrupted, unmodulated carrier for more than a first predetermined duration may indicate a START signal. When a START signal is received, process 804 may be notified. When a START signal is detected, the state of the transceiver should be reset to a known initial condition. Process 802 provides such notice to process 810 to reset the access state. Uninterrupted, unmodulated carrier for a second predetermined duration (preferably less than the first predetermined duration), may be used to indicate a SEPARATOR signal. A SEPARATOR signal, as used herein, may indicate an interruption in a message and thereby indicate the onset of a subsequent message. Upon detection of a SEPARATOR signal, process 802 provides notice to process 812 to terminate any transmission which may be in progress or scheduled to be transmitted. Process 802 to process 812 provides notice to reset the slot count accordingly. Failure to receive a proper START signal may leave transceiver 201 in a power-off; reset, condition. Failure to receive a proper SEPARATOR signal may leave the transceiver expecting the completion of the current message format.

Process 804 examines incoming demodulated carrier beginning from a notice of a START signal until a predetermined time when an access code is expected according to the message format. A protocol supported by process 800 divides the individual transceiver identification into one or more access codes. Each access code is associated with a so-called level code to be discussed below. Process 804 passes the received level code and access code to process 806 on receipt.

Process 806 operates on a valid received level code and access code when provided by process 804. Process 806 uses the level code as an address or index into an array stored in memory 808 to retrieve a stored access code. Further, process 806 compares the stored access code with the received access code and provides results of that comparison to process 810 in various protocols supported by process 800. Note that it may not be necessary for access codes to be received in any particular sequence in as much as each access code is received with an associated level code facilitating an appropriate access code to be retrieved from memory in accordance with the level code. Alternatively, any suitable sequence may dictate a desired access state change, as discussed below.

Process 810 changes the access state of transceiver 201. In response to a reset state command (or signal) from process 802, process 810 resets all access state bits. When a suitable result of comparison is received from process 806, process 810 may set one or more access state bits. Preferably, process 810 sets an access state bit in accordance with the level provided by process 804 when a suitable result of comparison indicates that the received access code exactly matched the stored access code. Various alternate protocols may permit or require an access state bit to be set when a result of comparison indicates any conventional relationship between the received access code and the stored access code (e.g., >, >=, <, <=, within a range, etc.). Process 810 provides the current access state to process 812 and, upon obtaining a predetermined access state, may command process 814 to begin a command/reply session.

Process 812 is enabled to transmit when the access state provided by process 810 meets or exceeds a predetermined enabling access state (i.e., the transceiver has been addressed to any extent defined by the protocol). Process 812 retrieves a slot count from memory 808 in accordance with the level code provided by process 804. According to a preferred protocol supported by process 800, slots (designated with predetermined counts) follow the occurrence of a START signal by a predetermined delay. Transmit process 812, after lapse of the predetermined delay, counts predetermined slot time durations (or slot boundary signals) until the slot count is achieved. Process 812 then transmits a reply signal in the slot corresponding to the slot count retrieved from memory. By transmitting a reply signal in a predetermined reply slot, process 812 as executed in multiple identical transceivers, provides a reply that, on receipt by monitor 124, indicates that one or more transceivers have been enabled to transmit as a consequence of having received one or more suitable access codes.

Each access code may represent a group (or subgroup) identification number. When arranged hierarchically, the individual transceiver identification may consist of a (GID) number, a subgroup identification number (SGID), a sub-subgroup identification number ($S^2GID$), etc. to any number of levels. For example, when each access code represents a 10-bit binary number, and four levels are used, an individual transceiver identification number consists of a 40-bit binary number. This identification number is sufficient to identify uniquely more than one billion transceivers in each of more than 1,000 independent operating environments. Each operating environment is identified by a 10-bit group identification number (e.g., a top level access code) with 30 bits remaining for identification of individual transceivers.

Process 814, upon notice of a begin session command, from process 810, performs any suitable command/reply protocol which may differ in structure and function from the interrogation protocol described above with reference to processes 802 through 812. The command/reply protocol may include commands to send data to a transceiver and to obtain reply data from a transceiver beyond the 1 bit transmit capability discussed above with reference to process 812. Process 814 may store received data in memory 808 and provide a command to process 816. Process 814 may continue for multiple command/reply exchanges until: (a) operative power is no longer provided (or commanded to be removed) by monitor 124; (b) a command addresses and changes one or more enabling access state bits in one or more transceivers; or (c) the completion of a command by a transceiver is accompanied by an automatic change of one or more enabling access state bits.

Process 816 receives a command from process 814 and may recall data stored in memory 808 and/or obtain measurement data from a conventional sensor (not shown). Data from memory and/or one or more sensors may be transmitted by process 816 in any suitable manner in accordance with the protocol discussed above with reference to interrogation, the protocol discussed above with respect to a command/reply session, or any conventional protocol.

In an implementation of system 100 wherein data transfer to and from a transceiver is not required beyond the capability to identify the transceiver, processes 814 and 816 may be omitted and suitable simplifications made to process 810. On the other hand, a protocol supported by process 800 may include a variety of commands as discussed below with reference to FIG. 9. For purposes of interrogation and identification of an individual transceiver identification, commands 904 and 912 may represent a minimum configuration.

Commands 902, 904, and 906 affect the access state of a transceiver. Command 902 resets an access state bit. Command 902 may be omitted in a simplified variation, where resetting all access state bits is accomplished by ceasing to supply operative power to a transceiver. Because power is supplied from monitor 124 by broadcasting carrier, the need remains in some implementations of system 100 to reset one or more particular access state bits in a group of transceivers or in one transceiver without affecting the access state of unaddressed transceivers. Command 902 in combination with one or more access codes will provide the facility for resetting one or more access state bits as defined in a conventional manner by suitable additional codes accompanying (or integral with) the command.

Command 904 is used to set an access state bit in one or a group of transceivers. As discussed above, command 904 may be used to accumulate a sufficient number of prerequisite set access state bits in order to enable process 812. In a variation of the interrogation protocol discussed above, command 904 may be used to set any arbitrary pattern of access state bits, perhaps in a predetermined sequence, to facilitate any purpose of communication as discussed herein.

Command 906 is used to clear the slot counter in all transceivers. By clearing the slot counter, this command assures that no further replies will be attempted by transceivers without the occurrence of a subsequent command, possibly including further access codes sufficient to obtain the access state required for operation of process 812. Command 906 may be omitted in a system implementation wherein no message is terminated before such message is allowed to proceed to completion. In a system using command 906, efficiencies may be obtained by clearing the slot counters when all expected (or significant) replies have been received.

Commands 908 and 910 accomplish sending data to transceivers from monitor 124. Command 908 may be used to transfer data from monitor 124 for storage in memory 808 in one or an addressed group of transceivers. Command 908 may require a prerequisite access state for group identification, security, or reliability purposes. Command 910 may be used to configure one or more sensor configuration registers so as to control any conventional aspect of sensor operation (e.g., the time a measurement is begun, the duration during which a measurement is taken, the resolution or accuracy of the measurement, designation of any measurement analysis, etc.).

Commands 912 through 920 may be used to obtain data from a transceiver. Command 912 may be used in the interrogation protocol as discussed above to indicate the existence of an addressed transceiver. In response to command 912, a transceiver may reply with a 1-bit acknowledgement in a reply slot corresponding to that transceiver's respective membership. For example, if a group of transceivers is addressed, each transceiver may reply with an acknowledgement in a respective reply slot corresponding to that transceiver's membership in a particular subgroup of that group. When fully addressed (i.e., no subgroup is defined below the lowest level of the current state of the interrogation scenario), the transceiver receiving command 912 may reply with an acknowledgement in a respective reply slot corresponding to its identification number (e.g., the least significant portion of the identification number, i.e., a member identification number). As discussed above, command 912 may be combined with command 904 to the effect that when a reply is made to command 912 an access state bit is also set. Particular advantages are obtained in system 100 by providing command 912 in a form with the setting of an access state bit (as in command 904) and in another form wherein no access state bit is affected.

Commands 914 and 916 may require that the command be directed to a transceiver that has been fully addressed so as to assure that only one transceiver will attempt to respond to the command. For example, assuming data from memory and sensor data exceeds one bit in length, one transceiver can reply with data from its memory in response to command 914 (or one transceiver can reply with sensor data in response to command 916) without collision, only when monitor 124 has identified one transceiver to send the data and has fully addressed only that transceiver. The length of data to be supplied in one or more replies to commands 914 and 916 may vary. Without departing from the general structure of a series of reply slots as discussed in the interrogation protocol discussed above, up to 1,000 bits of memory or sensor data could be provided from a transceiver in reply to a single command 914 or 916. Such data may be provided in redundant or differential redundant format to assure reliable reception by monitor 124.

Commands 918 and 920 demand a reply from one or a group of transceivers. The reply to command 918 may consist of one dibit, two redundant bits, or a short sequence of bits (e.g., preferably one bit) in each reply slot corresponding to data from memory. In a system having 1,000 reply slots, 1,000 transceivers may respond with one bit each until all bits of data from memory have been provided. In like manner, the reply to command 920 may provide data from up to 1,000 sensors with one bit per sensor in each reply slot. In an alternative protocol, commands 918 and 920 are directed to a fully addressed transceiver. Such a transceiver provides a reply from which a 10-bit memory value or sensor value may be determined. By replying in a reply slot corresponding to the appropriate value (e.g., 1 to 1,000), a 1-bit reply specifies a decimal number to one part in 1,000. When 1024 reply slots are used, a 1-bit reply conveys a 10-bit binary value. A command/reply session may be used to accomplish one or more of the functions described in Table 3.

TABLE 3

| Purpose | Command/Reply Session |
|---|---|
| Tracking | An identification of the monitor may be written into transceiver memory by a suitable command and may include monitor location (if not implicit), monitor operator identification (if any), and time-date or process codes (e.g., materials handling or manufacturing step). Replies may indicate time-date when last addressed, monitor identification when last addressed, or listed history of time-date and monitor identifications when addressed. Replies may be restricted in scope to one or more commands of interest (history of changes to sensor configuration, changes to identification, etc.). |

TABLE 3-continued

| Purpose | Command/Reply Session |
|---|---|
| Security | One or more access codes (at one or more levels) may be revised with a suitable command sequence including confirmation of the new code (e.g., repeat what was commanded or send partial or complete identification) prior to enabling use of the new code, and directing use of the new code. Alternately, a programmed set of alternate access codes may be enabled. These techniques may be used to implement code hopping. Any of the identification features discussed above may be confirmed, rewritten, or subject to selection among predetermined alternatives by one or more suitable commands to accomplish re-identification of one or more transceivers. For example, transceiver VCO center frequencies may be reassigned and/or tank properties may be modified (e.g. by introduction of switched elements, digital control, or other tuning techniques). |

One or more of the purposes described in connection with commands 902 through 920 above may be accomplished by particular message formats in a set of messages optimized for use in a particular instillation of system 100. For example, command formats 1004 through 1007 of FIG. 10 may be sufficient to provide interrogation and identification of up to 1 billion transceivers in 1,000 applications as discussed above. Particular advantages obtained in system 100 according to various aspects of the present invention by expanding the set of commands to include commands 1000 through 1003 of FIG 10. The expanded set of commands may be used during interrogation, assembly, or test to determine, for example, a 40-bit transceiver identification number without proceeding through a hierarchical interrogation sequence. For example, each command 1000 through 1003 provides an argument identifying a group identification number. No prerequisite access state bits must be set. No access state bits are set as a consequence of receiving the command. And, the reply from each transceiver is similar to the reply described with reference to command 912, except that transceivers will respond with a sub-group identification number to command 1000; will respond with a sub-subgroup identification number to command 1001; will respond with a sub-sub-sub-group identification number in reply to command 1002; and will respond with a sub-sub-sub-sub-group identification number in reply to command 1003. Commands 1000 through 1003 may be used to (a) determine or confirm the complete identification of a physically isolated transceiver; (b) determine or confirm all or part of an identification number of one transceiver when all other transceivers have been disabled; (c) quickly estimate the number of transceivers within communication range; (d) quickly detect the possibility that transceivers may have moved into or out of communication range; or (e) confirm that a particular subgroup of transceivers is not within communication range.

In contrast to commands 1000 through 1003 which do not set an access state bit, commands 1004 through 1007 each set an appropriate access state bit. In addition, commands 1005 through 1007 may reset the transceiver access state logic if the prerequisite state bit is not already set.

In an exemplary interrogation scenario, command 1004 is first provided with a level 1 group identification number in order to obtain information as to level 2 sub-group memberships of all addressed transceivers. The reply slots indicate the level 2 sub-group identification number of those transceivers addressed by the group identification number. In addition, state bit B0 of access state logic is set. The level 1 group identification number is preferably a 10-bit access code. The level 2 sub-group identification identified by a reply slot indicates a 10-bit access code. Second, command 1005 provides the level 2 sub-group identification number as its argument, and elicits the level 3 sub-sub-group identification number from addressed transceivers that are members of the group identification and sub-group identification as indicated by prerequisite state bit B0 and successful comparison of the provided sub-group identification number and the level 2 access code retrieved from memory. As a result of successfully completing command 1005, transceivers that are members of the group and sub-group will set state bit B1 corresponding to level 2. Third, command 1006 is provided with level 3 sub-sub-group identification number as an argument. Transceivers having successfully passed commands 1004 and 1005 will have set the prerequisite state bits B0 and B1. A reply to command 1006 provides the level 4 sub-sub-sub-group identification number indicated by the corresponding numbered reply slot. Further, access state bit B2 is set corresponding to level 3. Fourth, command 1007 provides the level 4 sub-sub-sub-group identification number as the argument and elicits in the respective reply slot the member identification number of those transceivers that have successfully passed comparison of the group identification number, sub-group identification number, and sub-sub-group identification number as indicated by prerequisite state bits B0, B1, and B2 being set, and, further, successful comparison of the sub-sub-sub-group identification number provided with command 1007 and the level 4 access code retrieved from memory. That transceiver that has successfully replied to command 1007 will also set access state bit B3. A system manager of a system 100 may arrange transceiver identification numbers so as to assure that the identification number provided by commands 1004 through 1007 will always address exactly one transceiver. In a variation of system 100 supporting commands 908, 910 and 914 through 920, command 1008 may be used with an appropriate argument to read or write data into memory or a configuration registration of a sensor or read data from a sensor or from memory as discussed above. A reply to command 1008 (e.g., in a particular reply slot) may provide a write acknowledgment or provide a 10-bit data value from a sensor or memory location as discussed above with reference to command 918 and 920. Further setting of access state bits may be unnecessary for command 1008. In a variation, further access state bits may be defined and set by various commands of the type described above with reference to command 1008 to accomplish more sophisticated transceiver functions.

Figure 11:
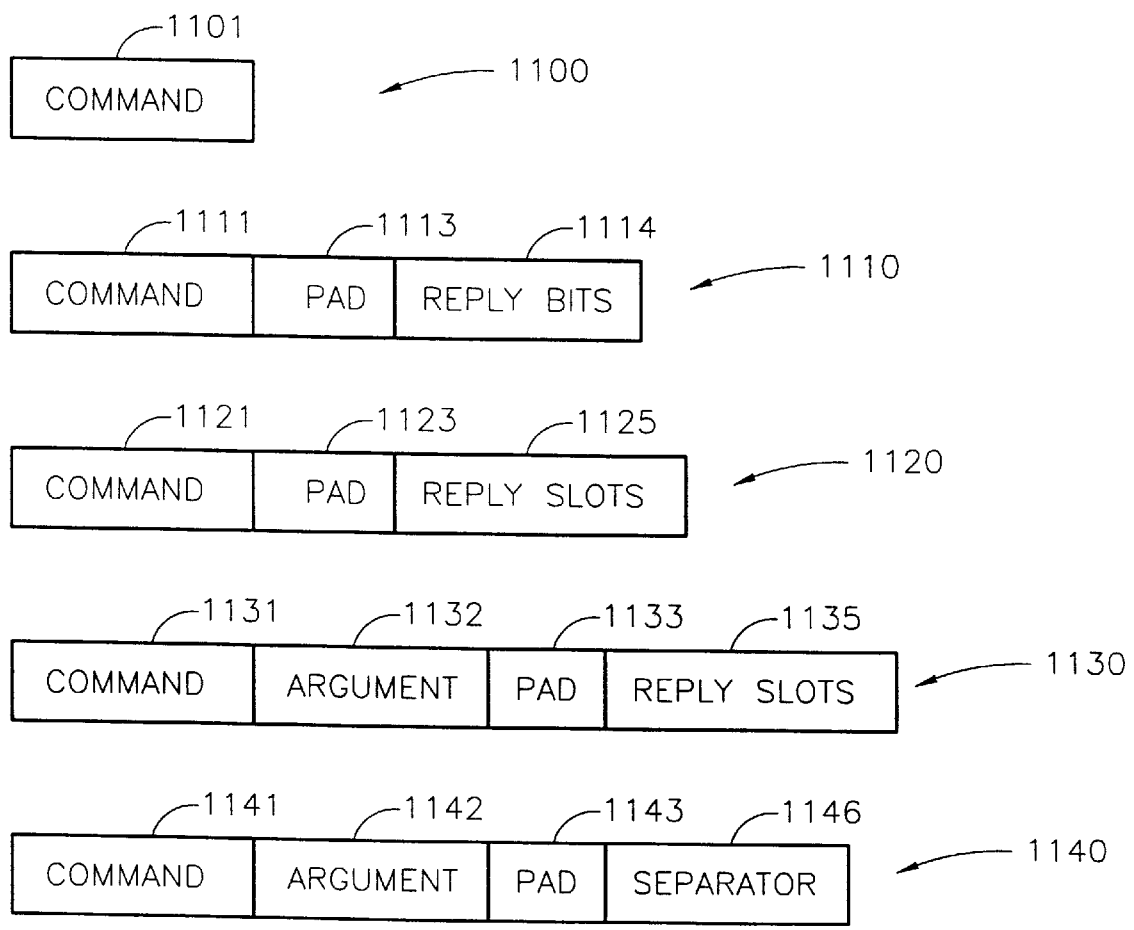
FIG. 11 is a message format diagram describing message formats used to establish and carry out data communication in an exemplary implementation of the system of FIG. 1.

The commands and arguments discussed with reference to FIG. 10 may be arranged in message formats in any conventional manner. Particular advantages are obtained in system 100 according to various aspects of the present invention, using the message formats of FIG. 11. For example, message format 1100 consisting of a binary code identifying a command 1101 may be used to accomplish commands 902 and 904. These commands require no argument when the command identifying code implicitly identifies one or more access state bits.

Message format 1110 may be used for commands 914 and 916. Message format 1110 includes command identifying code 1111, pad 1113, and reply bits 1114. Pad 1113, when used, conveniently separates command code 1111 from reply bits 1114 and assures reliable recognition in the transceiver of the first reply bit of reply bits 1114. Reply bits 1114 may include any number of bits in serial format.

Message format 1120 may be used for commands 912, 918, and 920 discussed above. Message format 1120 includes command code 1121, pad 1123, and reply slots 1125. Reply slots 1125 identify numbered periods of time. Each slot being used for a reply. A reply may consist of one or more bits, however, 1-bit reply slots are preferred. In an alternate reply slot configuration, a 1-bit reply may be presented as a dibit consisting of the reply bit in both true and compliment form.

Message format 1130 includes command code 1131, argument 1132, pad 1133, and reply slots 1135. Argument 1132 may be any binary code. For example, argument 1132 may convey a level code and an access code as discussed above.

Message format 1140 may include command code 1141, argument 1142, pad 1143, and separator 1146. Separator 1146 may include uninterrupted, unmodulated carrier as discussed above. In contrast, pad 1143 may include a period of time during which no carrier is transmitted.

In the message formats described above, command codes 1101, 1111, 1121, 1131, and 1141, are of identical structure. Likewise, pads 1113, 1123, 1133, and 1143, are of identical structure and may provide delay for processing a received command and argument. Reply slots 1125, and 1135 are of identical structure and function. Arguments 1132, and 1142 may be of identical structure or may vary as desired and indicated by corresponding command codes.

An example of a method to conduct an interrogation at monitor transmit frequencies of interrogation according to step 512 is presented below within the context of process 800 executing in each transceiver. Control may transfer from step 512 to step 1201 of FIG. 12 for performance of the interrogation method of FIGS. 12 through 14.

At step 1202, three variables are set to initial conditions. Variable C is set to 0 to indicate a command of the form 1000 of FIG. 10, is to be issued. Variable RS is set to 1 to indicate a first reply stack is to be used to store replies. Variable G is set to a group identification number of interest. Variable G may be a suitable structure for numerous values as discussed below. When a group identification number is used to distinguish one of 1000 installations of system 100, the group identification number may correspond to a customer number, a geographic area, a political territory, and/or any arbitrary indication that uniquely specifies this installation for the purpose of eliminating confusion with transceiver identification numbers that are properly members of a different system installation. Commands 1000 through 1007 are identified by values 0 through 7 of variable C, respectively.

At step 1204, a subroutine is called to send the command and store the replies on an appropriate stack. Control transfers to step 1301 of FIG. 13.

At step 1302, a message in format 1130 is broadcast from monitor 124 with command code 1131 set to the value of the variable C (initially 0) and argument 1132 set to the value of the variable G (initially the group of interest).

At step 1304, for each reply slot wherein a reply is detected, a value indicating a reply was detected may be stored on a stack identified from an array of stacks indexed by the variable RS. By providing an array of stacks, interrogation proceeds according to a tree search algorithm wherein at each node up to 1000 replies are cataloged. Each stack therefore corresponds to one of the nodes traversed in a modified depth-first tree search. In step 1304, information associated with each reply may also be stored on the appropriate stack. Such information may include: (a) the reply slot number; (b) signal amplitude samples 417; (c) frequency domain results of one or more fast Fourier transforms of samples 417; (d) one or more signal properties; and (e) a figure of merit as discussed above with reference to FIGS. 3 and 4. For efficiency, pointers to such information may be stacked instead.

At step 1306, control returns from the send/stack subroutine back to step 1206 of FIG. 12.

At step 1206, variable C is set to 3 as an initial condition for the subroutine called in step 1208.

At step 1208, a subroutine is called to list member identification numbers. This subroutine is a recursive subroutine which accomplishes the modified depth-first tree search as discussed above beginning from the current value of variable RS initially set to 1. Control transfers from step 1208 to step 1401 of FIG. 14.

At step 1402, it is determined whether variable RS is at a maximum value. Variable RS indicates a level code as described with reference to FIG. 8. Command 1004 having already been accomplished at step 1204, RS will proceed from the value 1 to a maximum value of 4 corresponding to commands 1004 through 1007 discussed with reference to FIG. 10. Having received control from step 1208, the test at step 1402 will fail and control will pass to step 1406.

At step 1406, variable G is assigned the value (or values) popped from the top of STACK [RS]. In an alternate implementation the access code to be used for the value G is obtained from a table look-up operation (e.g., code conversion mapping). For example, the number of a reply slot is used as an index into an array and the value from the array is assigned to G for use as an access code. In an implementation wherein subgroups are not addressed in strict order of depth, a level code may be used as part of the index and the array value may identify a suitable level code in addition to the access code.

At step 1408, it is determined whether process 1208 has proceeding to the end of STACK [RS]. If so control passes to step 1402 for a return from this particular call of the list members recursive subroutine. If not, control passes to step 1410.

At step 1410, the validity of the value (or values) of variable G is determined. This validity test may proceed in a manner similar to determining whether a particular reply represents a candidate frequency as described at step 506 and 510 above. This analysis may include analysis of time domain results, frequency domain results, signal properties, and figures of merit, provided that sufficient information has been stored on STACK [RS]. Time domain analysis may compare the signal received or properties (e.g., rise time, decay time, envelope shape, or relative time of peak amplitude) with expected values or properties in accordance with the Q of tank 204 and power limiting characteristics discussed below with reference to signal REPLY of FIG. 16. If it is determined that variable & does not represent a valid transceiver, control passes back to step 1406 for obtaining another value from STACK [RS]. Otherwise, control passes from step 1410 to step 1412.

At step 1412, variables C and RS are each incremented. By incrementing the value of variable RS, results will be stored on a new (empty) stack. By incrementing the value of variable C, preparations are made to transmit a command at the next level.

At step 1414, send command and stack replies subroutine 1204 is called from the context of the current level and current command set at step 1412. Upon return from step 1306, control transfers to step 1416. In the first call to subroutine 1204 from routine 512, message format 1120, or preferably 1130 may be used. In subsequent calls, from step 1414, message format 1130 alone or preferably prefixed by any suitable number of message formats 1140 may be used. Prefix message formats 1140, when used, assure proper access state bit prerequisites are met by contents of respective arguments 1142. Prerequisites may have been reset by loss of operative power or by reset as discussed below.

At step 1416, a recursive call is made to the list members subroutine within the context of the current value of variable RS. Control transfers to step 1401 and upon completion returns from step 1420.

At step 1417, variables C and RS are decremented to restore the context of the current execution of recursive subroutine list members 1208. Processing in the loop consisting of steps 1406 through 1417 continues until all replies have been considered from STACK [RS]. When all replies have been considered, control passes from step 1408 to step 1420 and a return to a prior call of list members subroutine 1208 is effected. During execution of list members subroutine 1208 at the deepest level (i.e., the highest value of variable RS), control is transferred from step 1402 to step 1418.

At step 1418, the respective reply slot numbers of the replies received in response to the command sent at step 1302 are appended to an array herein called the member list. As a result of the tree search algorithm, values from STACK [RS] are appended from time to time until the list members subroutine has reached the end of the stack at the initial level of the tree (i.e., level equals 1 and RS equals 1). When the tree has been fully searched, the return from step 1420 passes control to step 1210 of FIG. 12.

At step 1210, interrogate subroutine 512 of FIG. 12 returns control to method 500 at step 512. Processing continues at step 512 to select another monitor transmit frequency for interrogation from array MTFI as indexed by loop variable N until loop variable N exceeds the value B. For each frequency, interrogate subroutine 512 beginning at step 1201 is called for an appropriate tree search. At step 1418, redundant identification numbers may be appended to the member list. Consequently, step 1418 may include a test to forego appending a transceiver identification number to the member list unless it is not already on the member list. Upon completion of interrogation at each monitor transit frequency for interrogation, control transfers to step 514.

At step 514, the contents of the member list array may be reported to host computer 122. This reporting function may be accomplished (or accompanied) by a printout, display, alarm, etc., at monitor 124 as discussed above. Further, the function of reporting identified transceiver identification numbers may be accomplished by suitable file storage or conventional communication between programs operative on host computer 122 and/or monitors 124, 126.

At step 516, host computer 122 and/or monitor 124 may initiate any command sequence including, for example, command 1008 for commands 914 through 920 as discussed above. Following completion of all individual command/reply sessions (if any), control passes to step 518 where method 500 may repeat beginning at step 502 for continuous monitoring.

The determination of frequencies to be used for interrogation as discussed above provides a list of frequencies (e.g., array MTFI) prior to any interrogation. In an alternate method, interrogation may proceed immediately upon detection of a response believed to be transmitted by a transceiver. Further, a command/reply session may be performed immediately upon determining a transceiver. The internal iteration loops in each of steps 502 through 516 in such an alternate method are replaced with appropriate controls on the major iteration loop of step 518.

In subsequent iterations of method 500, steps 502 through 508 may be omitted when no additional transceivers are expected to have recently entered communication range. Selected interrogation frequencies of array MTFI may be omitted when use provided no identification not already known by use of other interrogation frequencies. Step 512 may then be performed with a minimum of redundancy to decrease time spent interrogating. Further, when subsequent interrogations reveal no new transceiver identifications, steps 510 through 514 may be omitted and step 516 executed repeatedly for a list of specific transceiver identifications. For a system that monitors continued presence of transceivers without command/reply sessions, step 512 may be repeated with specific (non-redundant) frequencies to receive acknowledgement from each transceiver by fully addressing the transceiver via its known complete identification. Monitoring presence of a known population generally is accomplished in less time than interrogation of an unknown population. Conversely, to the extent that an unknown population predictably includes transceivers having identifications in known groups (or subgroups to any level), the time spent performing an interrogation may be reduced by addressing and communicating with members of such known groups (or sub-groups to any level). Likewise if a group (or sub-group) is known not to be present (or communication is not desired with transceivers of such group or subgroup), interrogation may be fashioned to ignore replies or avoid facilitating replies from transceivers of such a group (or sub-group).

Step 512 may be omitted for object identification systems where mere presence of one or more objects is all that is desired to be monitored, for example, setting an alarm on detection of any object carried through a passage. Monitoring of objects in the presence of other objects may be accomplished in an alternative implementation. For example, an alarm may be set on detection of any object through a passage, except when accompanied by detection of another predetermined object (e.g., a transceiver in a badge of an authorized person).

Step 508 may be omitted when step 506 provides sufficient resolution of one or more frequencies.

A method for improving reception of a reply signal during interrogation or data communication includes the steps of: (a) transmitting a carrier signal at a first frequency; (b) sampling a reply signal, (c) identifying one or more frequency components not expected to be part of a proper reply signal; and (d) programming a filter to attenuate such frequency component(s). The transmitted carrier may be at a tank resonant frequency, a stack resonant frequency, or a frequency suitable for use with a tank circuit loosely coupled to a stack. Sampling and identifying frequency components may be accomplished in any manner including further time domain signal processing and/or frequency domain signal processing, as discussed above. The filter may include a digital filter, programmable element network, or a programmable active filter. The filter characteristic may include a low-pass, band-pass, notch, comb, or hi-pass transfer function. Transmitting and sampling may occur during a reply slot.

A method for improving the accuracy of an interrogation scenario includes the steps of: (a) determining a first series of amplitude samples of a reply signal; (b) comparing the first series to a second series of amplitude values expected for a resonant circuit response; and (c) proceeding in the protocol of the interrogation scenario in accordance with whether the extent of comparison exceeded a threshold value.

A transceiver, according to various aspects of the present invention, includes any circuit for performing the process discussed above with reference to FIG. 8. For example, a transceiver 201 capable of performing the command set of FIG. 10 using the message formats of FIG. 11 may receive and send data using a combination of off-on keying (OOK) and duty cycle modulation.

Figure 15:
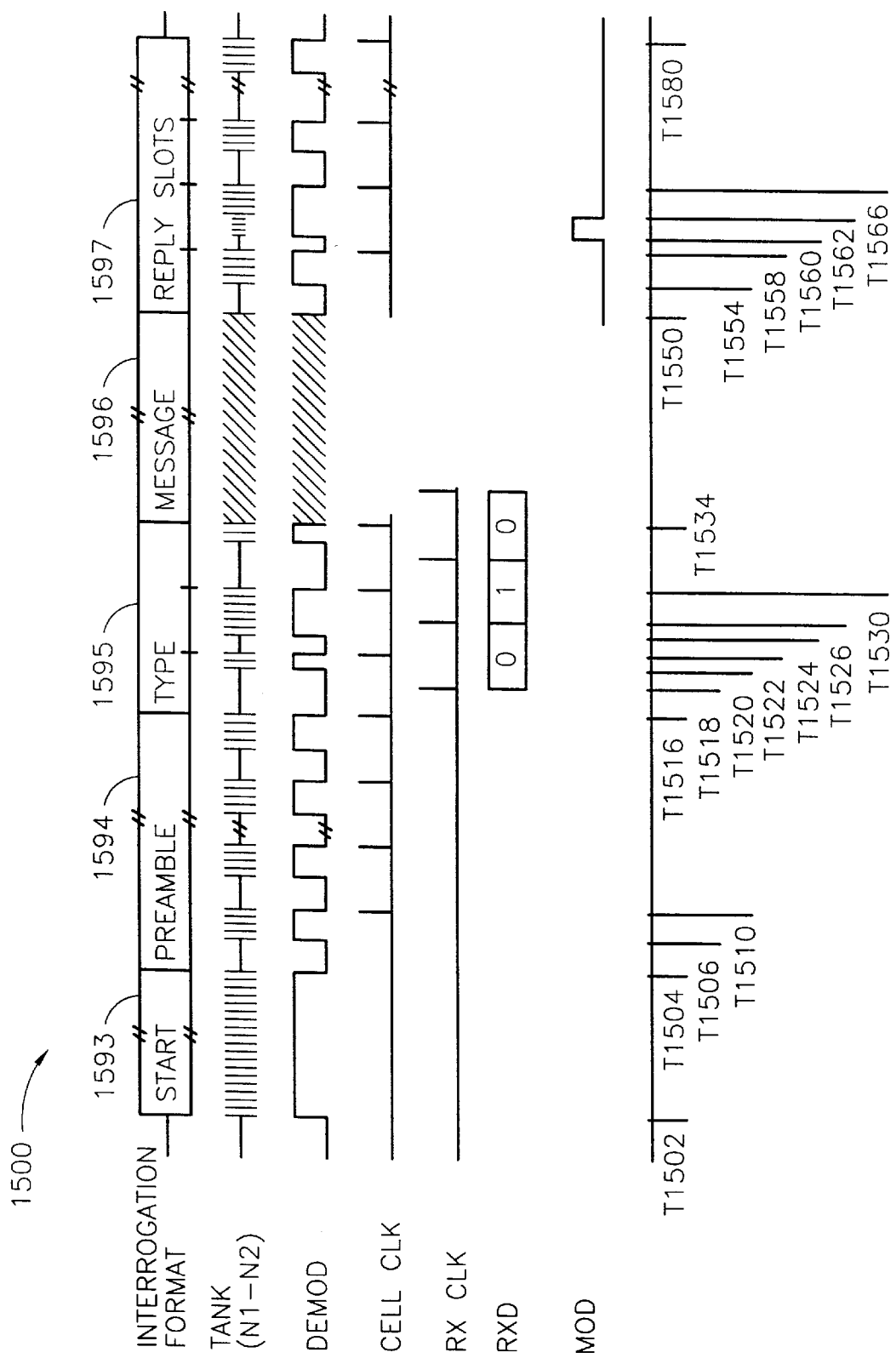
FIG. 15 is a timing diagram of signals related to interrogation in an exemplary implementation of data communication for the system of FIG. 1.

The functions of rectifier 206, receiver 208, transmitter 210, and state machine 212 may be better understood from a timing description of signals used in transceiver 201. During an interrogation scenario, several messages may be received by a transceiver. Each message to which a reply is expected from any transceiver constitutes a query. An interrogation scenario may include several queries. For example, FIG. 15 presents signal TANK as it would appear across lines 217 and 219 (i.e., the difference of signals N1 and N2). Portions of signal TANK correspond to portions of an interrogation format 1500 which includes start portion 1593, preamble portion 1594, message type portion 1595, message portion 1596, and reply slots portion 1597. Signal TANK is rectified by rectifier 206 to provide DC voltage V+ which is used to power all circuitry of transceiver 201. Signal TANK is demodulated by receiver 208 to provide signal DEMOD on line 214. And, signal TANK includes by superposition the output of transmitter 210 in response to modulation signal MOD on line 216. From time T1502 to time T1504, transceiver 201 receives unmodulated carrier on signal TANK. The period of time from time T1502 to time T1504 represents a START signal 1593 as discussed above with reference to process 802. The duration of the START signal should be sufficient to energize rectifier circuit 206 for the provision of continuous power to transceiver 201 for the duration of operation required by the interrogation protocol.

Following the START signal, signal TANK exhibits a series of periods of 50% duty cycle modulation sufficient for establishing proper timing signals for use within transceiver circuitry 201. For example, signal CELL CLK is derived from signal DEMOD on line 214 and signal RX CLK is derived to have active edges in the midpoint between the active edges of signal CELL CLK. Signal CELL CLK represents a cell clock which marks by its active edges the trailing edge of each cell used for communication of one data bit. From time T1504 to time T1506 no carrier is being received. From time T1506 to time T1510 carrier is being received. This pattern of off/on keying is repeated for the entire preamble portion 1594 until time T1516. The length of preamble portion 1594 should be sufficient for generating all timing signals for use in transceiver circuitry 201.

Received clock signal RX CLK has an active edge in the middle of each data communication cell for discriminating between cells conveying a logic "0" and cells containing a logic "1". Cell content clocked by signal RX CLK is illustrated as signal RXD conveying a "010" pattern for message type portion 1595.

The logic "0" of signal RXD is derived from a cell containing modulation in only the latter portion of the cell duration. For example, no carrier is received from time T1516 to time T1520; however, carrier is received from time T1520 to time T1522. The duration from time T1520 to time T1522 divided by the cell duration (from time T1516 to time T1522) represents a duty cycle of from 10% to 45%, preferably 40%. The active edge of signal RX CLK occurs while signal DEMOD is low at time T1518 from which signal RXD is determined as a logic "0". In contrast, the next cell beginning at time T1522 and extending to time T1530 includes a portion from time T1522 to time T1524 where no carrier is being received and a portion from time T1524 to time T1530 during which carrier is being received. The duration from time T1524 to time T1530 divided by the cell duration (from time T1522 to time T1530) represents a duty cycle (different from the duty cycle of the cell from T1516 to T1522) of from 55% to 90%, preferably 60%. The active edge of signal RX CLK occurs while signal DEMOND is high at time T1526 from which signal RXD is determined as a logic "1". The following cell extends to time T1534 and exhibits another logic "0".

Message type portion 1595 of interrogation format 1500 extends from time T1516 to time T1534. Following message type portion 1595, message portion 1596 extends from time T1534 to time T1550. During message portion 1596, signal TANK and signal DEMOD convey data using off/on keyed modulation, preferably with 40% and 60% duty cycle modulation. In a variation, each bit of message type portion 1595 is sent as two complementary bits in sequence (e.g., a dibit) to facilitate a form of redundancy for message validity testing. Similarly, command and/or argument portions of any message format 1100, 1110, 1120, 1130, or 1140 may be sent as dibits.

Signal CELL CLK and signal RX CLK continue through message portion 1596 (not shown for clarity). From time T1550 to time T1580 reply slots 1597 are distinguished by signal TANK. Reply slots 1597 include a reply slot for each reply. The duration of a reply slot is equivalent to one period of signal CELL CLK For example, from time T1550 to time T1554 no carrier is received; however, from time T1554 to time T1558 carrier is received. The signal received from time T1554 to time T1558 (and analogous times in other reply slots) serves several functions including: to maintain power supplied by rectifier circuit, to mark a boundary between adjacent reply slots, to define a duration (e.g., a cell clock period) for synchronizing other clock signals (e.g., a signal 8 times the cell clock frequency), to identify the beginning of an offset into the reply slot for signal detection (e.g., placement of the active edge of signal RCV CLK), and to identify the beginning of an offset into the reply slot for transmitting a reply signal. By marking the boundary of a reply slot with carrier for a predetermined portion of signal CELL CLK (e.g., 10% to 90% preferably 40% to 60%, most preferably about 50%), signal CELL CLK can remain synchronized to boundaries of all reply slots. In an alternate implementation where transfer of power during reply slots is not required, signal CELL CLK may be synchronized with preamble portion 1594 and monitor 124 may transmit nothing during reply slots 1597.

During the reply slot from time T1550 to time T1558 no reply is indicated. The reply slot from time T1558 to time T1566, however, includes a reply during the portion of the slot where signal MOD indicates transmitter 210 is providing modulation. Signal MOD enables transmitting from time T1560 to time T1562, that is, during a time when no carrier is being provided by monitor 124. As will be explained in greater detail with reference to FIG. 16, the duration of signal of MOD overlaps a portion of the carrier transmitted by monitor 124.

Any number of reply slots may be used. When 1,000 reply slots are defined, signals may have the durations as described in Table 4. The signals in Table 4 correspond to a message format 1140 followed immediately by a message format 1130. The reply slot used for replying to this series of message formats is the reply slot associated with the command and argument portions immediately preceding the reply slots portion, regardless of the number of preceding message formats. Of course, the same argument values may be used redundantly for assuring proper reception. In this example, argument 1142 may be the same as argument 1132.

TABLE 4

| Message Format Portion | Approximate Duration | Periods of Cell Clock | Reference |
|---|---|---|---|
| START | 3,200 μsec Continuous Carrier | 32 or more | T1502–T1504 |
| PREAMBLE | 800 μsec 50% OOK | 8 | T1504–T1516 |
| TYPE | 300 μsec 40%/60% OOK | 3 | T1516–T1534 |
| COMMAND | 300 μsec 40%/60% OOK | 3 | 1141 |
| ARGUMENT | 1,000 μsec 40%/60% OOK | 10 | 1142 |
| PAD | 200 μsec No Carrier | 2 | 1143 |
| SEPARATOR | 800 μsec 50% OOK | 8 | 1146 |
| PREAMBLE AND TYPE | 1,100 μsec | 11 | — |
| COMMAND, ARGUMENT, and PAD | 1,500 μsec 40%/60% OOK | 15 | 1131, 1132, 1133 |
| REPLY SLOTS | 100,000 μsec | 1,000 | 1135, |
| TOTAL: | 109.2 msec | 1,092 | T1550–T1580 |

Figure 16:
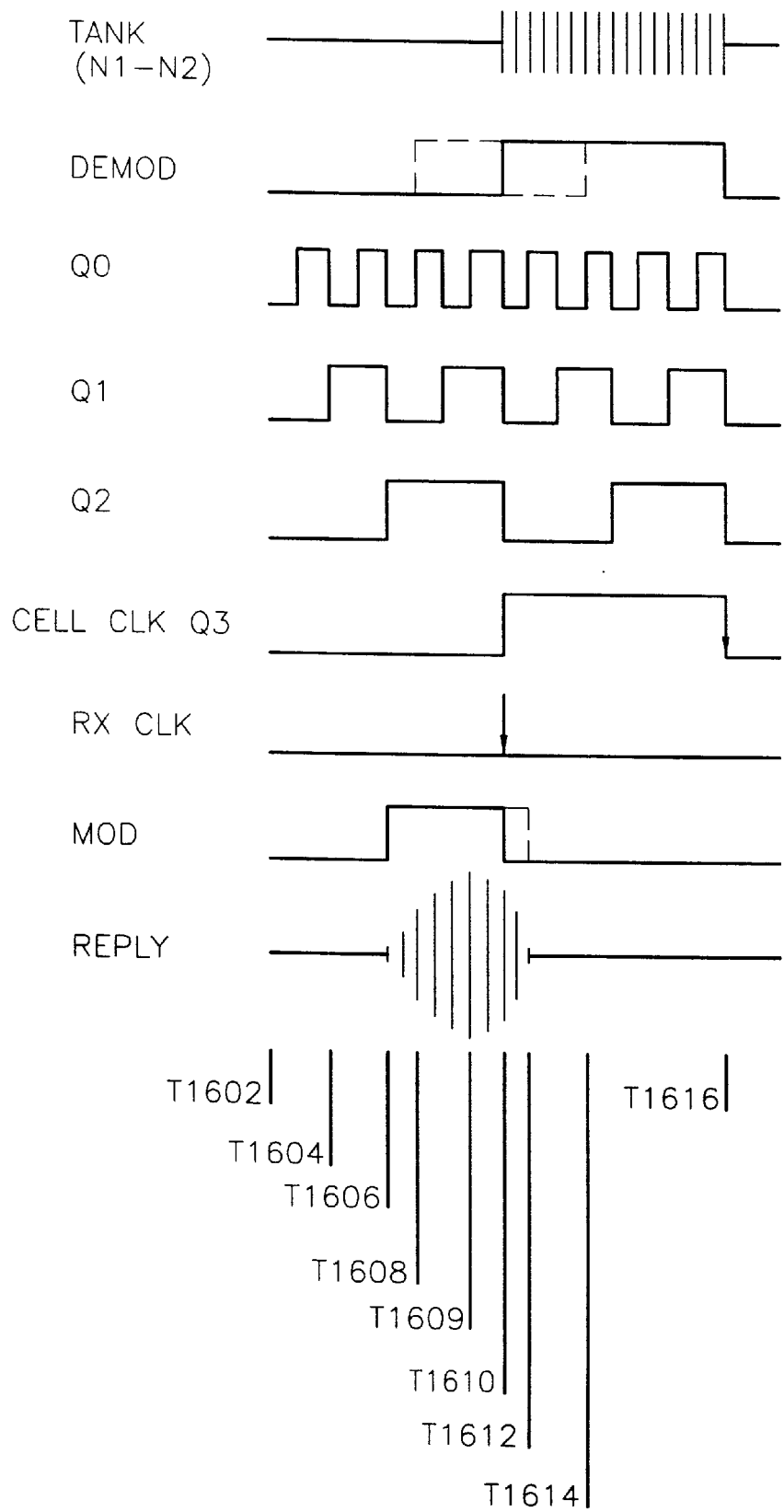
FIG. 16 is a timing diagram of signals for demodulating a received signal and for modulating a signal for transmitting in a transceiver in the system of FIG. 1.

The timing diagram of FIG. 16 illustrates the use of additional clock signals for deriving signal RX CLK and signal MOD. Signal TANK is shown in one cell consisting of a first portion from time T1602 to time T1610 where no carrier is being received and a second portion from time T1610 to time T1616 where continuous carrier is being received. Signal DEMOD is illustrated with a transition corresponding to 50% duty cycle modulation. Signal RX CLK provides an active edge (in the center of the cell) corresponding to the rising edge of signal DEMOD as illustrated. Signal DEMOD when conveying a logic "1" would have a rising edge at time T1608 providing sufficient set-up time prior to the active of signal RX CLK. When signal DEMOD is conveying a logic "0", the rising edge of signal DEMOD is delayed until time T1614 providing sufficient hold time following the active edge of signal RX CLK.

Signal MOD maybe formed by signal Q2 from time T1606 to time Tl610. It is preferred to extend the duration of signal MOD beyond time T1610 so that modulation provided by transmitter 210 overlaps transmission of carrier by monitor 124. By overlapping the transmission of signals by monitor 124 and transmitter 210, transmitter 240 in an adjacent transceiver in unlikely to confuse a lack of modulation between the falling edge of signal MOD for example, at time T1610, with the boundary of the cell which occurs at time T1616. In this way, each transceiver may accurately recognize a cell boundary by the falling edge of signal DEMOD and maintain synchronism of clock signals including signal CELL CLK.

Signal REPLY of FIG. 16 illustrates that portion of signal TANK that would be superimposed on signal TANK when transceiver 201 is transmitting a reply in response to signal MOD. From time T1606 to time T1612, the amplitude of signal REPLY depends on the Q of tank circuit 204 and available power for transmitting. From time T1606 to time T1609, amplitude depends largely on Q. From time T1609 to time T1612, amplitude decreases as power available for transmitting decreases (though sufficient power may remain for logic functions).

Transceiver 201 may be constructed on a substrate as an integrated circuit. The cost of integrated circuit fabrication for a circuit of limited complexity (e.g., transceiver 201) is adversely affected by the area of the substrate dedicated to pads for connection of the integrated circuit to external devices. A preferred set of pads for integrated circuit interface signals is described in Table 5. Using conventional voltage discrimination or alternate mode control circuitry, pads may be used for multiple signals and other pads omitted. For example, pad 2 may also be used for signal FUSE PROG; pad 6 may also be used for signal FUSE DATA; and pad 7 may also be used for signal FUSE CLK.

TABLE 5

| Pad | Signal Name | Function | Reference |
|---|---|---|---|
| 1 | VSS | Ground | 1721 |
| 2 | FRC | Used to connect on external energy storage capacitor to ground | 1718 |
| 3 | V+ | Used to connect a filter capacitor to ground | 1717 |
| 4 | N1 | Antenna coil connection | 217 |
| 5 | N2 | Antenna coil connection | 219 |
| 6 | VXC | Used to connect a filter capacitor to ground | 1817 |
| 7 | VJ | Used to connect a filter capacitor to ground | 2103 |
| 8 | FUSE DATA | Serial data for programming memory 2214 | 2310 |
| 9 | FUSE CLK | Serial clock for programming memory 2214 | 2312 |
| 10 | FUSE PROG | Enables serial data to blow fuses | 2315 |

Figure 17:
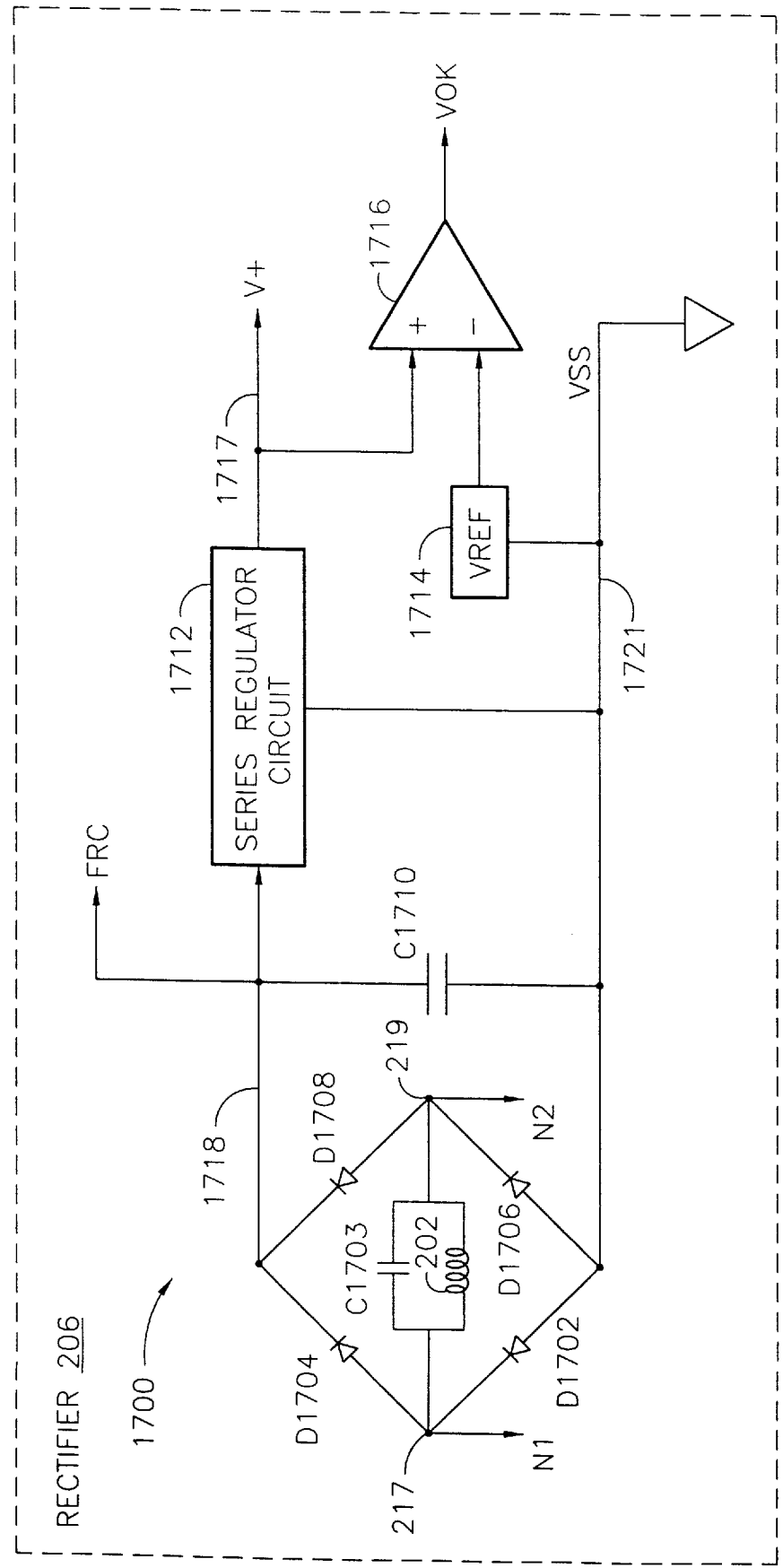
FIG. 17 is a functional block diagram of a rectifier of a transceiver as in FIG. 2.

Rectifier circuit 206 may include any conventional circuitry for developing a direct current voltage from a received carrier signal. For example, rectifier 206 of FIG. 17 includes bridge rectifier 1700 across lines 217 and 219, energy storage capacitor C1710, series regulator circuit 1712, and circuit 1716 for determining when the developed voltage is of sufficient magnitude for transceiver operation. Rectifier circuit 1700 includes diodes D1702, D1704, D1706, and D1708 in a conventional full wave bridge arrangement. Tank circuit 204 (including antenna 202 and capacitor 1703) is connected across the center of bridge 1700. Full-wave rectified capacitance signal FRC on line 1718 may be carried to an external connection for additional capacitance to ground. Regulator circuit 1712 receives signal FRC on line 1718 and presents in a conventional manner signal V+ having a suitable voltage magnitude on line 1717. Comparator 1716 compares signal V+ on line 1717 with the output of a conventional voltage reference circuit 1714 (e.g., a band gap reference circuit, zener diode, etc.). Comparator 1716 provides signal VOK when the voltage on line 1717 exceeds the output of voltage reference 1714. Signal VOK enables transceiver operation. Rectifier circuit 206 may receive sufficient power for transceiver operation when monitor 124 transmits at the resonant frequency of tank 206, the stack resonant frequency as discussed above, or any frequency and power level that accommodates the transfer function of tank 206 (including antenna 202).

Figure 18:
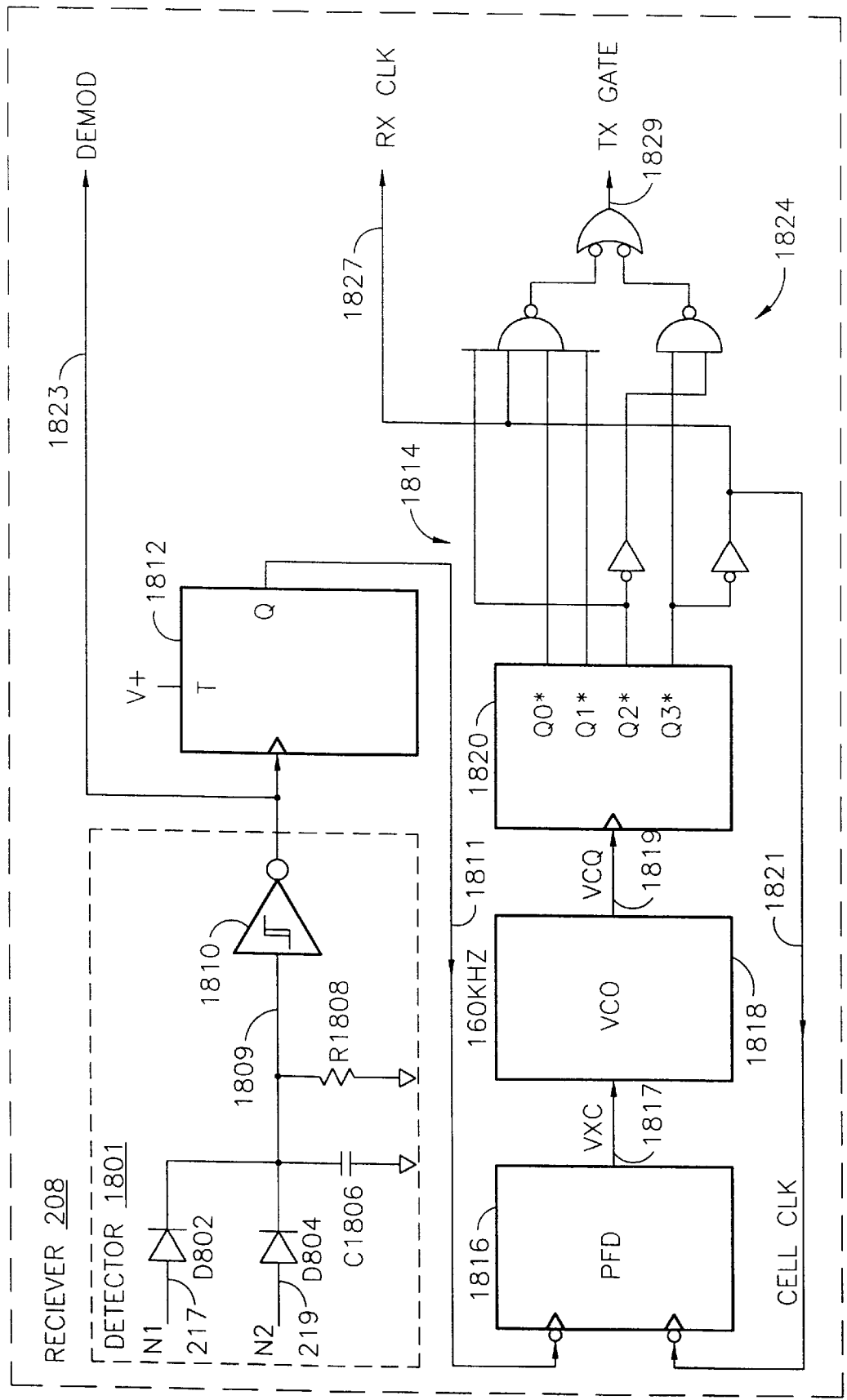
FIG. 18 is a functional block diagram of a receiver of a transceiver as in FIG. 2.

Receiver 208 may include any conventional receiver circuitry. Particular advantages are obtained in system 100 by receiver circuitry 208 of FIG. 18 which includes detector 1808, flip-flop 1812, phase locked loop 1814, and gate logic 1824. Receiver 208 may be operated at the resonant frequency of tank 206, the stack resonant frequency as discussed above, or any frequency and power level that accommodates the transfer function of tank 206 (including antenna 202).

Detector 1801 includes a full wave rectifier, a filter, and, a Schmidt trigger inverter. Signal N1 on line 217 passes through diode D1802 to line 1809 and is shunted to ground by filter capacitor C1806 and filter resistor R1808. Likewise, signal N2 on line 219 passes through diode D1804 and connects to line 1809. Line 1809 provides a signal across the shunt filter to Schmidt trigger inverter 1810. Inverter 1810 provides signal DEMOD on line 1823. Signal DEMOD clocks T flip-flop 1812 to provide a 50% duty cycle signal on line 1811.

Phase locked loop 1814 includes phase frequency detector 1816, voltage controlled oscillator (VCO) 1818, and counter 1820. VCO 1818 operates at 160 KHz to provide oscillating signal VCQ on line 1819. Signal VCQ is divided by counter 1820 to provide 80 KHz, 40 KHz, 20 KHz, and 10 KHz. The 50% duty cycle signal on line 1811 is compared with 10 KHz signal CELL CLK on line 1821 by phase frequency detector 1816 to provide voltage control signal VXC on line 1817.

Gate logic 1824 provides signals RX CLK on line 1827 and signal TX GATE on line 1829 in a conventional manner in accordance with the timing diagram of FIG. 16.

Figure 19:
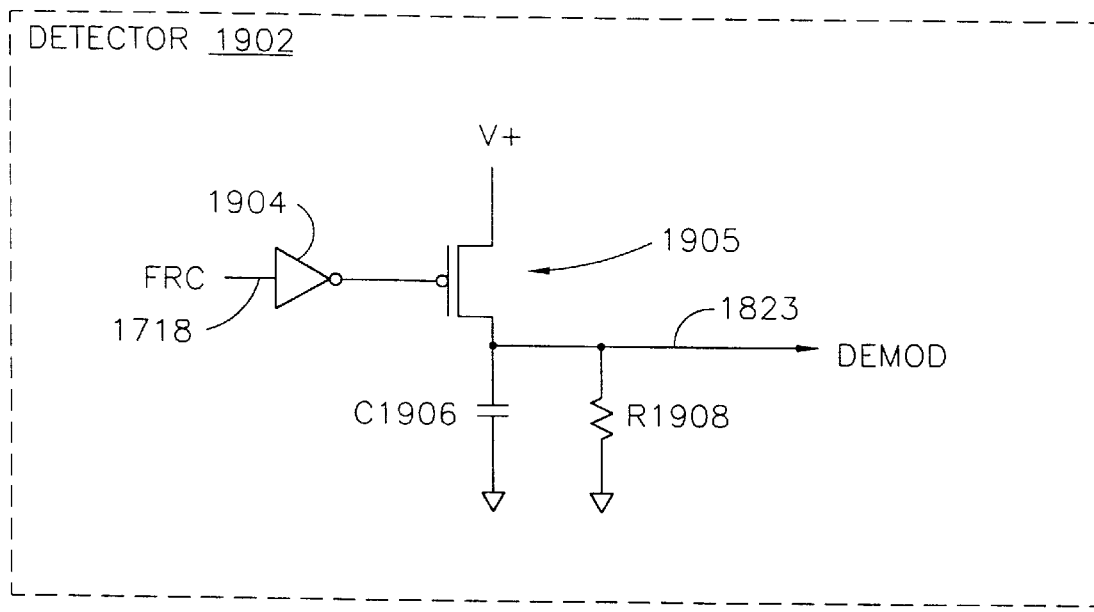
FIG. 19 is a functional block diagram of an alternate detector for the receiver of FIG. 18.

Receiver 208, in an alternate configuration, may include detector 1902 of FIG. 19 in place of detector 1801. Detector 1902 includes inverter 1904, switch transistor 1905, and a filter having capacitor C1906 and resistor R1908. Inverter 1904 receives signal FRC on line 1718 from rectifier 206. Switch transistor 1905 cooperates with capacitor C1906 in a manner similar to a charge pump (e.g., an integrator) to provide signal DEMOD on line 1823.

Figure 20:
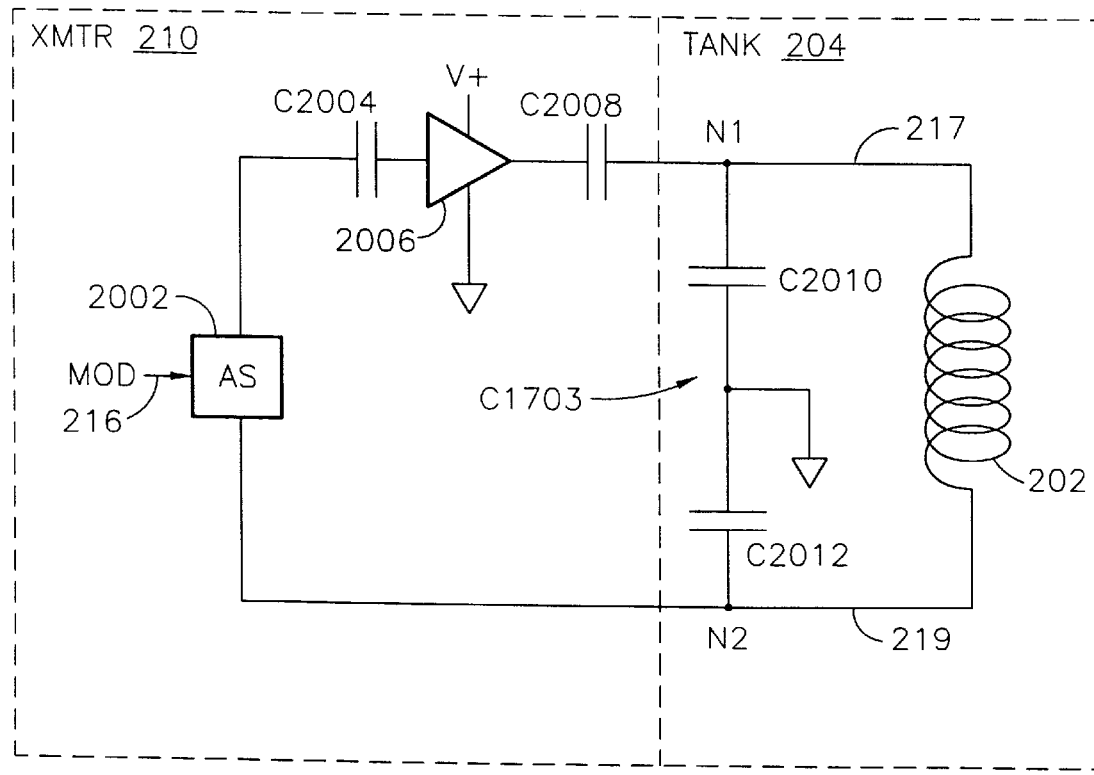
FIG. 20 is a functional block diagram of a transmitter of a transceiver as in FIG. 2.

Transmitter 210 may be any conventional transmitter circuit. Particular advantages are obtained in system 100 using a transmitter circuit of FIG. 20 which includes analog switch 2002, amplifier 2006, and tank circuit 204. Tank circuit 204 forms the only resonant circuit in transmitter 210. Tank circuit 204, therefore, governs the frequency of transmitter 210. Any magnetic coupling in antenna 202 may affect the resonant frequency of tank 204 and thereby affect the transmitted frequency provided by transmitter 210. Transmitter 210 may include either a Colpitts or Hartley oscillator design. For example, transmitter 210 of FIG. 20 includes capacitor C2004, amplifier 2006, capacitor C2008, and bridge capacitors C2010 and C2012. Bridge capacitors together correspond to capacitance C1703 described above. Capacitors C2004 and C2008 provide AC coupling and DC blocking in a conventional manner. Analog switch 2002 receives signal MOD on line 216. When signal MOD is asserted, a feedback signal on line 219 is coupled to amplifier 2006 to complete the closed loop oscillator.

In an alternate transmitter, the frequency to be transmitted is determined in part by the frequency previously received. For example, transmitter 210 of FIG. 21 includes phase locked loop 2100 and isolation circuit 2112. Phase locked loop 2110 includes phase frequency detector 2102, sample hold circuit 2106, and voltage controlled oscillator 2110. VCO 2110 operates at 5 MHz to provide signal OSC on line 2111 to phase frequency detector 2102. Signal N1 on line 217 is also coupled to phase frequency detector 2102. Phase frequency detector 2102 responds to a phase difference between signal N1 and signal OSC to provide signal VJ on line 2103. Sample hold circuit 2106 responds to signal DEMOD on line 1823 to hold the value of signal VJ when signal N1 is not being received. Sample hold circuit 2106 provides signal VK on line 2107 to control the oscillator frequency of VCO 2110.

Reply frequencies for transmitters discussed above with reference to FIGS. 20 and 21 are described in Table 6. The transmitter of FIG. 21 is preferred for implementations involving stacks.

TABLE 6

| Transmitter Type | Reply Frequency |
| --- | --- |
| Colpitts Oscillator | Tank resonant frequency when transceiver operates in isolation; any stack resonant frequency when within a stack; between tank resonant frequency and stack resonant frequency when loosely coupled to a stack (e.g., on an end or in non-coplanar orientation). |
| Phase Locked Loop | As driven by carrier from monitor 124 (e.g., at an isolated tank resonant frequency, a stack resonant frequency, or any other desirable frequency. The carrier frequency may be selected for any one or more of the following reasons: (a) to avoid the carrier being masked by interfering frequency components (e.g., of antenna system 121, or of signal 193); (b) to avoid the reply being masked by interfering frequency components (e.g., of antenna system 121 or of signal 193); (c) to assure adequate power transfer to enable one or more transceivers; and (d) to prevent adequate power transfer or adequate received signal quality from enabling one or more transceivers not currently of interest. For example, if a stack resonant frequency has been detected at 4.3 MHz, the monitor may transmit at a predetermined offset (e.g., less 500 KHz) from 4.3 MHz to interrogate a transceiver loosely coupled to the stack (e.g., at an end of a linear stack) whether or not a response (e. g., a ring signal) was detected at that offset. |

Figure 21:
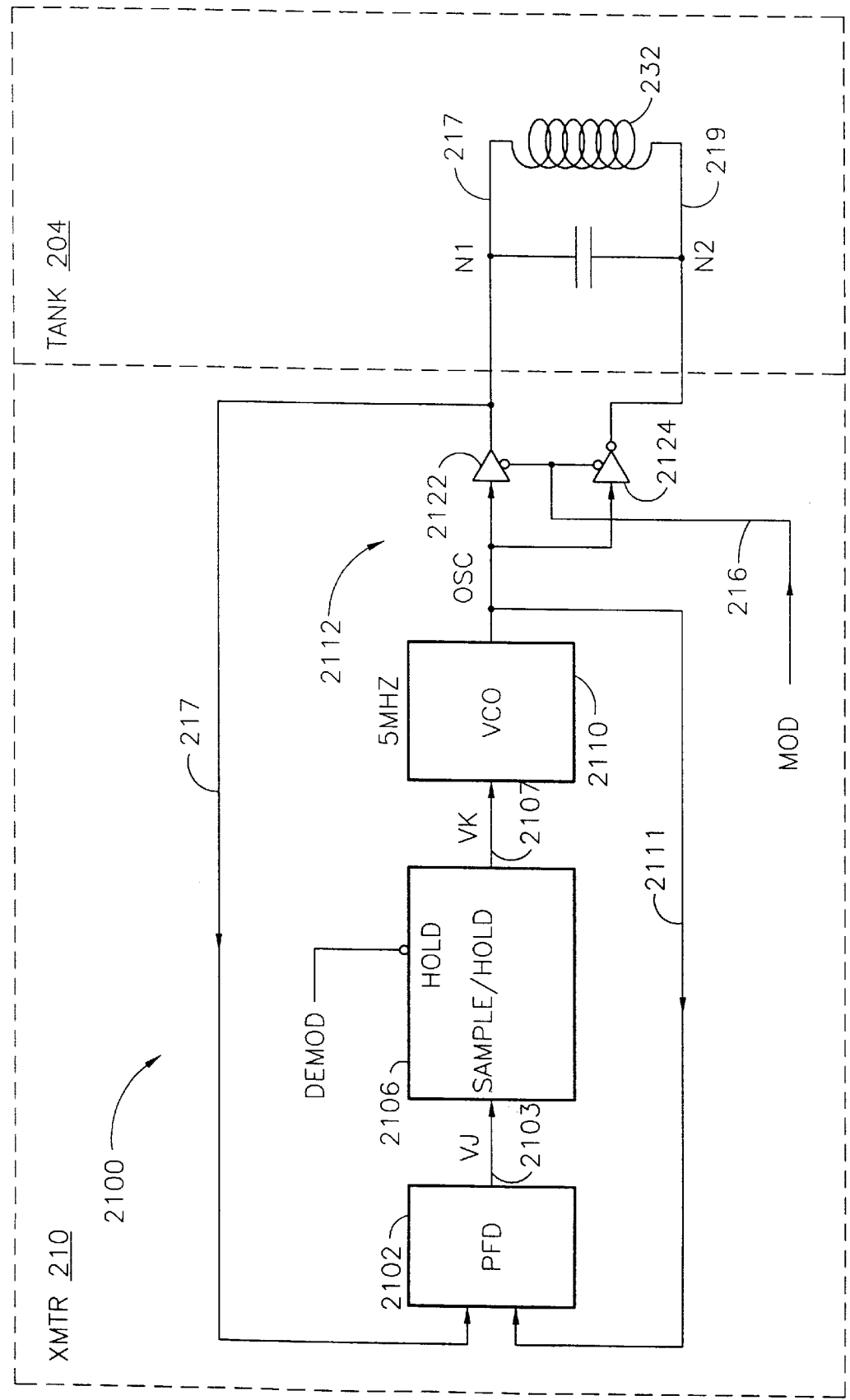
FIG. 21 is a functional block diagram of an alternate transmitter for a transceiver as in FIG. 2.

By sampling received signal N1 while carrier is being provided by monitor 124, and holding the frequency received to establish the frequency to be used for transmitting, transmitter 210 of FIG. 21 provides a transmitted signal at a frequency better suited to communication with monitor 124. Transmitter 210 may have a transmit frequency as specified by monitor 124 as opposed to a frequency as determined by tank 204. Operation of transmitter 210 as discussed above is particularly advantageous for objects 107 and 112 each located at an end of stack 116. Although the resonant frequency of coupled tanks of objects 108 thorough 111 may be detected by monitor 124 for the purpose of providing sufficient power and accurate data communication at a particular selected carrier frequency, the same carrier frequency may not couple sufficient power into objects 107 and 112 or provide reliable communication due to the weaker coupling between the tank circuits of objects 107 and 108, for example, in as much as the tank circuit of object 107 is not between two other similar objects.

Figure 22:
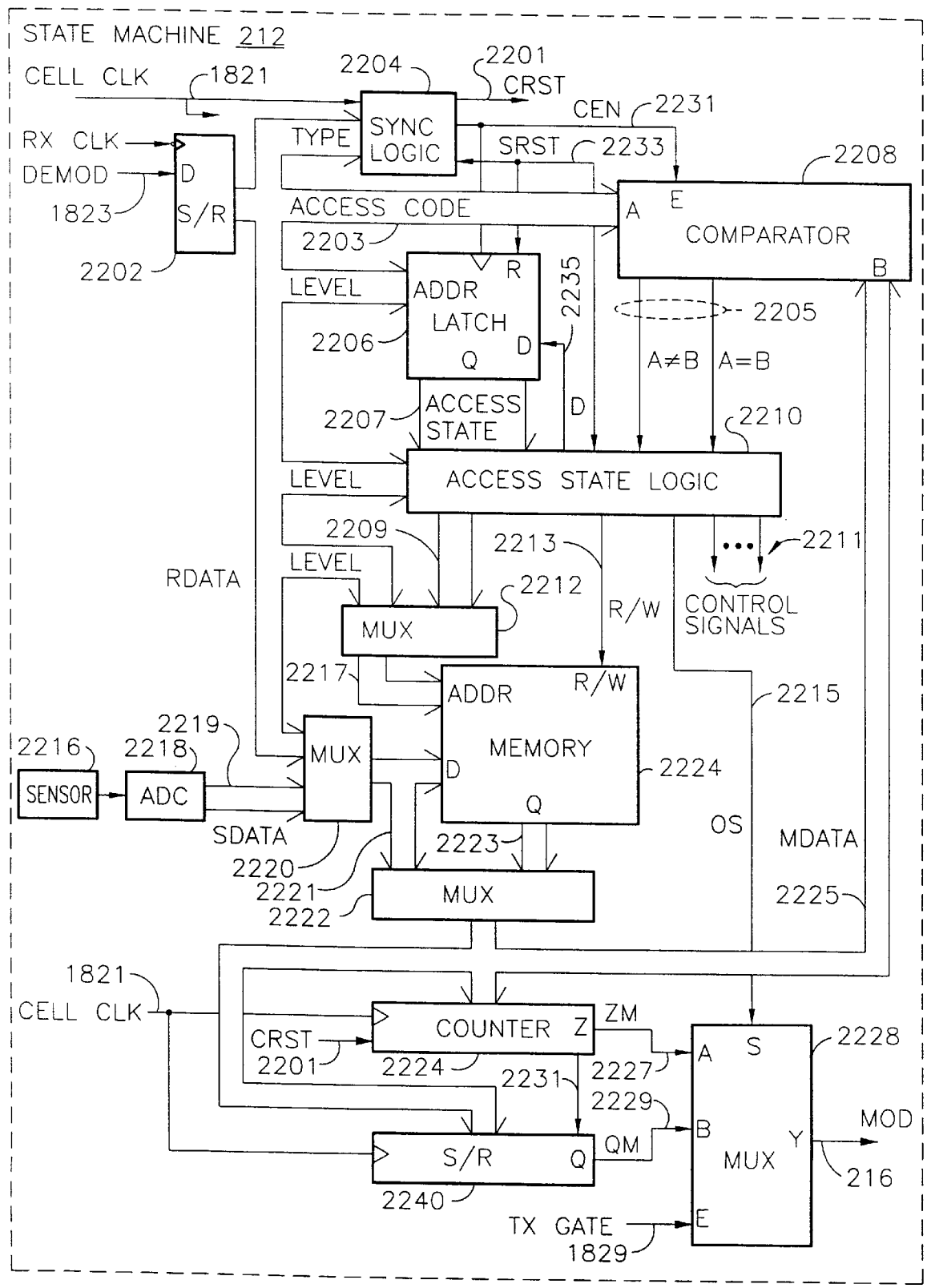
FIG. 22 is a functional block diagram of a state machine of a transceiver as in FIG. 2.

State machine 212 may include any conventional state machine circuitry for performing the functions described above. For example, state machine 212 may include circuitry as described in FIG. 22 which includes sync logic 2202, shift register 2204, latch 2206, comparator 2208, access state logic 2210, memory 2214, and counter 2224. These devices cooperate to provide interrogation commands 1004 through 1007 as described above. Additional logic may be added to access state logic 2210 to support commands 1000 through 1003 using conventional techniques. State machine 2102 may be expanded to perform command 1008 corresponding to commands 914 through 920 as discussed above. In such an expanded configuration state machine further includes multiplexer 2212, sensor 2216, analog to digital converter 2218, multiplexer 2220, multiplexer 2222, shift register 2240, and multiplexer 2228.

Shift register 2202 receives signal DEMOD on line 1823 as clocked by signal RX CLK on line 1827. The content of shift register 2202 is considered a valid message when the message type portion 1595 of the parallel data output of shift register 2202 corresponds to a predetermined message type code. For example, type "010" may be used as illustrated in FIG. 15 for signal RXD beginning at time T1518. Type "010" is used herein for all commands described above with reference to FIG. 10. Other message type codes may be used; or, additional message type codes may be used in an expanded set of commands as described above with reference to FIG. 9. Shift register 2202 provides in parallel data format on bus 2203 the message type code, an access code, and a corresponding level code. The message type code is provided to sync logic 2204. The access code (e.g., argument 1132 of message format 1130) is provided to comparator 2208. The level code (e.g., command 1131 of message format 1130) is provided to latch 2206, access state logic 2210, multiplexer 2212, and multiplexer 2220. Shift register 2202 may include a holding register to hold the output codes for processing until a subsequently received message has arrived in full. A subsequent message is deemed to have arrived in full when a valid message type code follows a START signal 1593 and preamble 1594 as illustrated in FIG. 15.

A signal discriminator includes any circuit that derives mode control signals (e.g., message type, load, preset, etc.) and timing signals (e.g., resets, and clocks) from a composite signal. For example, receiver 208 cooperates with sync logic 2204 to provide a discriminator that derives signals from received messages. For example, receiver 208 derives signal CELL CLK on line 1821 and sync logic 2204 receives a message type code on bus 2203 from shift register 2202 and receives signal CELL CLK on line 1821 and provides various reset signals. Sync logic 2204 may, in addition, receive and generate further clock signals of higher frequency than signal CELL CLK on line 1821. Sync logic 2204 establishes, inter alia, the initial conditions for latch 2206, access state logic 2210, and counter 2224. Sync logic 2204 detects a power-on condition and establishes initial conditions in response thereto. Sync logic 2204 clears latch 2206 and clears all access state bits B0–B3 in access state logic 2210 using signal SRST on line 2223. Sync logic 2204 provides signal CRST on line 2201 to clear counter 2224 as an initial condition. Sync logic 2204 also provides signal CEN to comparator 2208 to enable comparison at a time determined, for example, from time T1516 corresponding to the beginning of message type portion 1595 of an interrogation format illustrated in FIG. 15. Time T1516 can be determined from a predetermined number of active edges on signal CELL CLK according to a suitable protocol.

Latch 2206 includes an addressable access state flip-flop for each access state bit B0–B3. Signal LEVEL is used as an address to select a flip-flop to be set. A selected flip-flop is set by the cooperation of signal CEN on line 2231 and signal D on line 2235. The leading edge of signal CEN provides a clock and signal D establishes the state of the addressed flip-flop. Signal D is provided on line 2235 from access state logic 2210 in accordance with: (a) the access state provided on line 2207 by latch 2206, and (b) signal LEVEL on line 2203. By allowing access state logic to determine signal D under various conditions, the addressed flip-flop in latch 2206 may be set as discussed above with reference to commands 1004 through 1007 or may be left unaffected as for commands 1000 through 1003, as discussed above. Latch 2206 provides the output of each flip-flop as signal ACCESS STATE on line 2207 to address state logic 2210.

Access state logic 2210 receives signal ACCESS STATE on line 2207 from latch 2206 and receives signal LEVEL on line 2203 from shift register 2202. Based on these inputs, access state logic 2210 may provide a substitute memory address signal on line 2209 with suitable control signals 2211 to effect selection by multiplexer 2212 of an appropriate address on line 2217 to be used for recalling an access code from memory 2214. In an alternate implementation where signal LEVEL is used directly as a memory address to memory 2214, multiplexer 2212 may be omitted with appropriate simplifications to access state logic 2210. In such an implementation, address input 2217 of memory 2214 is supplied by shift register 2202 on bus 2203 to provide signal LEVEL as the address. Access state logic 2210 provides read-write control to memory 2214 on line 2213 as signal R/W. Access state logic 2210 also provides control signals 2211 to multiplexer 2222 for the selection of data to be provided on bus 2225 as signal MDATA.

Multiplexer 2222 provides bus 2225 to comparator 2208, counter 2224, and shift register 2240. Signal MDATA conveys a stored access code to compactor 2208, or memory contents or sensor data to counter 2222 and shift register 2240.

When enabled by signal CEN on line 2231, comparator 2208 provides results of comparison on signals 2205 to access state logic 2210. For example, when an access code on bus 2203 exactly matches a stored access code provided from memory 2214 on bus 2225, an A=B output of comparator 2208 is asserted and provided to access state logic 2210. When signal CEN enables comparison and the access code on line 2203 is not exactly equal to the access code on bus 2225, an A≠B output is asserted by comparator 2208 and provided to access state logic 2210. In a preferred configuration, access state logic 2210 responds to an A≠B signal by driving signal SRST on line 2233, thereby resetting latch 2206 to its initial condition, and notifying sync logic 2204 to provide any faker reset or initial conditions as may be suitable. In effect, regardless of the sequence in which multiple access codes with various levels are presented for comparison, if any one such access code is not exactly equal to the corresponding access code recalled from memory 2214, state machine 212 reverts to its initial condition and awaits a subsequent START signal. Consequently, an addressed transceiver will enter a reset state (and may enter a power-off state) to avoid transmitting when not properly addressed at a subsequent level. Control signals 2211 provided by access state logic 2210 control all aspects of the operation of state machine 212 in a conventional manner. One such control signal, signal OS on line 2215, directs multiplexer 2228 to provide signal MOD in accordance with output selection signal OS, as discussed below.

Memory 2214 may include any conventional data storage technology, or multiple such technologies, in any combination. Memory 2214 may be organized to provide memory contents on line 2223 in parallel format, as shown, or in serial format in an alternate architecture. In such an alternate architecture, state machine 212 may include a serial comparator in place of the parallel comparator 2208. Memory 2214 provides on line 2223 a 10-bit access code in parallel with a 10-bit reply slot number. The reply slot number may be transferred through multiplexer 2222 and loaded into counter 2224. Memory 2214 provides storage for any number of (access code, reply slot) pairs. In a preferred implementation, 4 such pairs provide a unique transceiver identification and 4 additional pairs provide an alternate identification or support for alternate interrogation protocols. For example, commands 1000 through 1003 may have different respective argument values, one for each command. The GID used in command 1004 may be identical to the GID used in command 1000. These four GID "standard" values may be stored in many (e.g., all) transceivers for use in a particular installation of system 100. Knowledge of one or more of these four "standard" GID values by monitor 124 (or host 122) facilities interrogation in any sequence of commands 1004–1007 when prerequisites are not used or are modified accordingly.

Counter 2224, when clocked by signal CELL CLK on line 1821, provides signal ZM on line 2227 when the reply slot number is decremented to zero.

Multiplexer 2228 provides signal MOD on line 216 in response to the AND combination of signal TX GATE on line 1829 and signal ZM on line 2227 to enable transmission of a reply acknowledgment in the reply slot associated with the access code provided simultaneously on 231 memory output line 2223.

To support commands of the type described in FIG. 9, for example, commands 914 through 920, for example command 1008 of FIG. 10, state machine 212 may load any or all contents of memory 2214 into shift register 2240 by appropriate operation of multiplexer 2222 by access state logic 2210 via control signals 2211. When loaded as described above, shift register 2240 responds to signal CELL CLK on line 1821 as enabled by counter 2224 output on line 2231 to provide signal QM on line 2229.

Access state logic 2210 may provide signal OS on line 2215 to multiplexer 2228 to provide three reply message formats. First, when signal OS selects multiplexer input A on line 2227, the proper timing for a reply in a prescribed reply slot (e.g., reply slots 1125 or 1135) is provided by signal MOD on line 216. When signal OS on line 2215 is asserted to enable multiplexer input B, signal QM on line 2229 in AND combination with signal TX GATE on line 1829 determines the state of modulation signal MOD on line 216. Signal MOD on line 216 consequently conveys the contents of shift register 2240 ad seriatim. Counter 2224 may be operated in conjunction with shift register 2240 using conventional logic for one of two functions: (a) providing a fixed number of bits from shift register 2240 ad seriatim on line 216 as signal MOD in a second reply message format (e.g., reply bits 1114); or (b) providing one bit from shift register 2240 in each occurrence of reply slots portion 1597 until the entire contents of shift register 2240 has been provided in a manner corresponding to conventional time domain multiplexing in a third reply message format (e.g., reply slots 1125 or 1135).

Sensor 2216 represents any electronic transducer including sensors of the type described above with reference to sensors 160 and 162. Sensor 2216 provides an analog signal to analog to digital converter (ADC) 2218. ADC 2218 provides sensor data signal SDATA on lines 2219 to multiplexer 2220. Multiplexer 2220, operated by control signals 2211, permits the selection of either received data signal RDATA on bus 2203 from shift register 2202 or sensor data signal SDATA on line 2219 to be either: (a) stored in memory 2214 via bus 2221; or (b) provided through multiplexer 2222 to either counter 2224 or shift register 2240. When provided to counter 2224, sensor data, for example a 10-bit value, may operate as a reply slot number as described above for the provision of a reply signal in one reply slot. When provided to shift register 2240, selected data may be used to provide signal MOD on line 216 in any of the reply message formats described above.

Received data signal RDATA, when used to form modulation signal MOD on line 216, provides the capability for a transceiver to echo data as received for accomplishing testing a single transceiver. Tests may include (a) testing data communication reliability in a laboratory environment; and (b) testing transceiver reliability in the presence of external factors including, for example, variation in facility environment, variation in the strength and frequency of interfering sources, and variation in the number and proximity of similar transceivers in a laboratory or installation environment.

In response to a suitable command, access state logic 2210 may invoke a write operation by asserting signal R/W on line 2213 to memory 2214. Data to be written into memory may be provided by shift register 2202 as signal RDATA on bus 2203 through multiplexer 2220, or may be provided by sensor 2216 through multiplexer 2220. Data written into memory may include original (or revised) access code and slot number for one or more values of signal LEVEL. Write memory operations may be used to facilitate code hopping as discussed above.

Portions of state machine 212 may be omitted to reduce power consumption, to reduce the cost of manufacture of transceiver 201, or when one or more functions are not desired for an installation of system 100. For example, sensor 2216, ADC 2218, and multiplexer 2220 may be omitted when transceivers are not used for sensing the environment surrounding a transceiver. Further, multiplexer 2222 may be omitted when test functions described above are not desired. Shift register 2240 and multiplexer 2228 may be omitted when message format 1130 or 1120 is sufficient for a reply and message format 1110 is not desired. Memory 2214 may be read only in which case signal R/W on line 2213 may be omitted with concomitant simplifications to access stage logic 2210.

Figure 23:
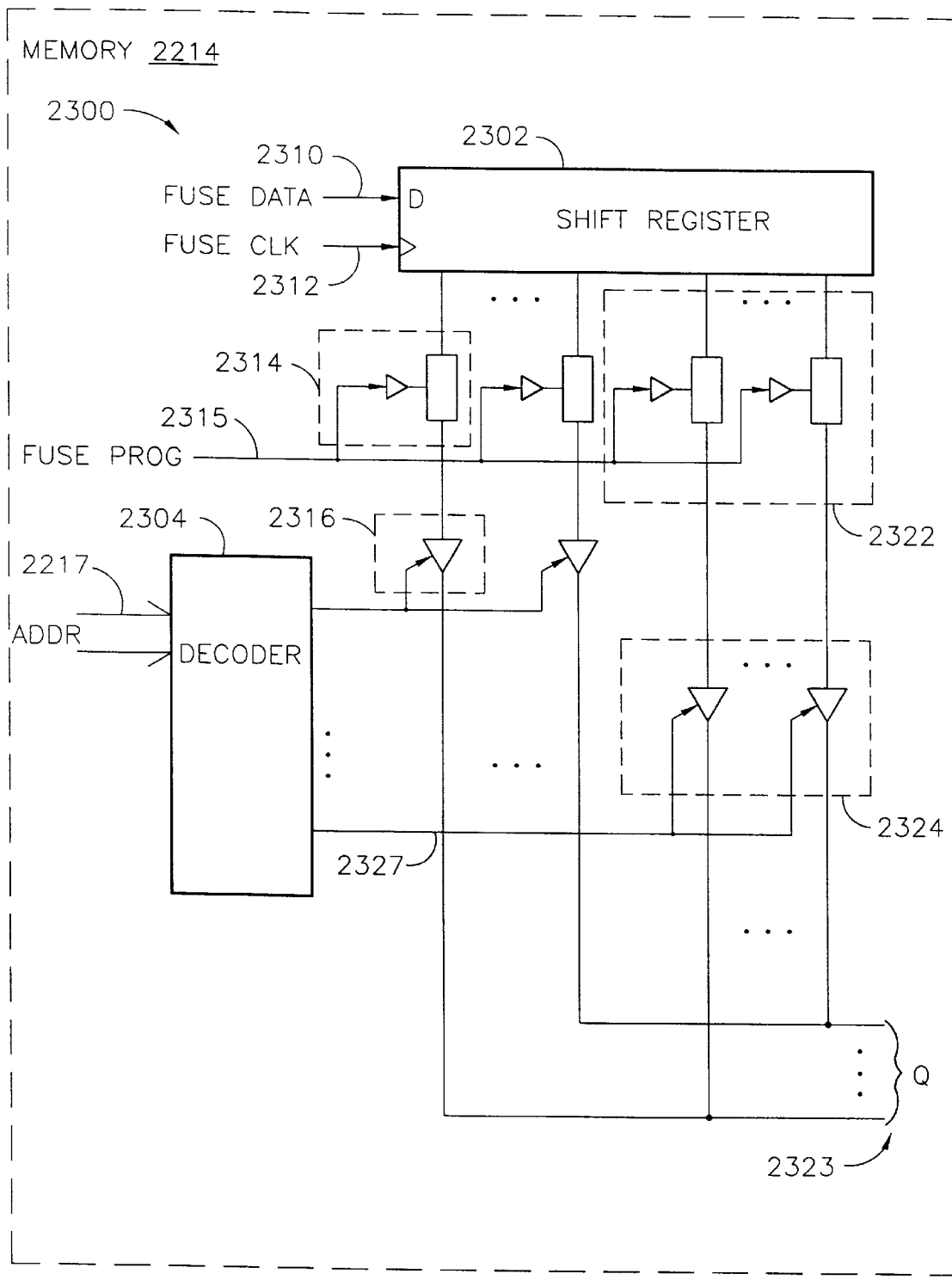
FIG. 23 is a functional block diagram of a memory of the state machine of FIG. 22.

Memory 2214 may include read-write memory organized as conventional random access memory (RAM) or as shift register memory. Further, the read-only portions of memory 2214 may include any combination of ROM, PROM, EPROM, E$^2$PROM, and fuse programmable memory. Particular advantages are obtained in transceiver 201 by use of a circuit for fuse programmable memory. For example circuit 2300 of FIG. 23 includes shift register 2302, decoder 2304, and an array of programmable fuses exemplified by programmable fuse circuit 2314 and tri-state driver 2316 for each memory bit. Circuit 2300 accepts on line 2310 serial signal FUSE DATA conveying binary data to be stored in memory. Shift register 2302 is clocked by signal FUSE CLK on 2312 until all data to be stored in memory has been received. Upon assertion of signal FUSE PROG on line 2315, each fuse element in respective fuse circuit 2314 is simultaneously programmed in accordance with the parallel output of shift register 2302. The fuse element in fuse circuit 2314 may be any conventional fuse element including a diode, a zener diode, a polysilicon fuse, or a metal element. After programming, any group of programmed fuses 2322 may be asserted on bus 2223 when signal ADDR on line 2217 drives decoder 2304 to provide a suitable tri-state buffer enable signal for example, as on line 2327. The enable signal on line 2327 enables tri-state buffers 2324 to provide memory output data on bus 2223 as signal Q. Fuse circuits 2314 may be grouped in any suitable manner to form any number of data output bytes or words in response to corresponding addresses defined for signal ADDR.

According to various aspects of the present invention, power sufficient for transmitting in one reply slot is obtained primarily from the carrier received during a START portion of the message format. When a transceiver provides no more than one reply per START signal, the REPLY signal may decay during transmitting. Rapid decay assures transmitting will not continue into a succeeding reply slot; facilitates application of maximum power during transmitting prior to the onset of decay; and permits exhaustion of power during transmitting to inevitably result in a full reset of the access state (e.g., when signal VOK is no longer asserted).

In an implementation including battery power for transceiver circuits, the beneficial operating features discussed in the preceding paragraph may be obtained by transferring (for a limited duration) power from the battery to a capacitor which provides limited power as discussed above.

Figure 24:
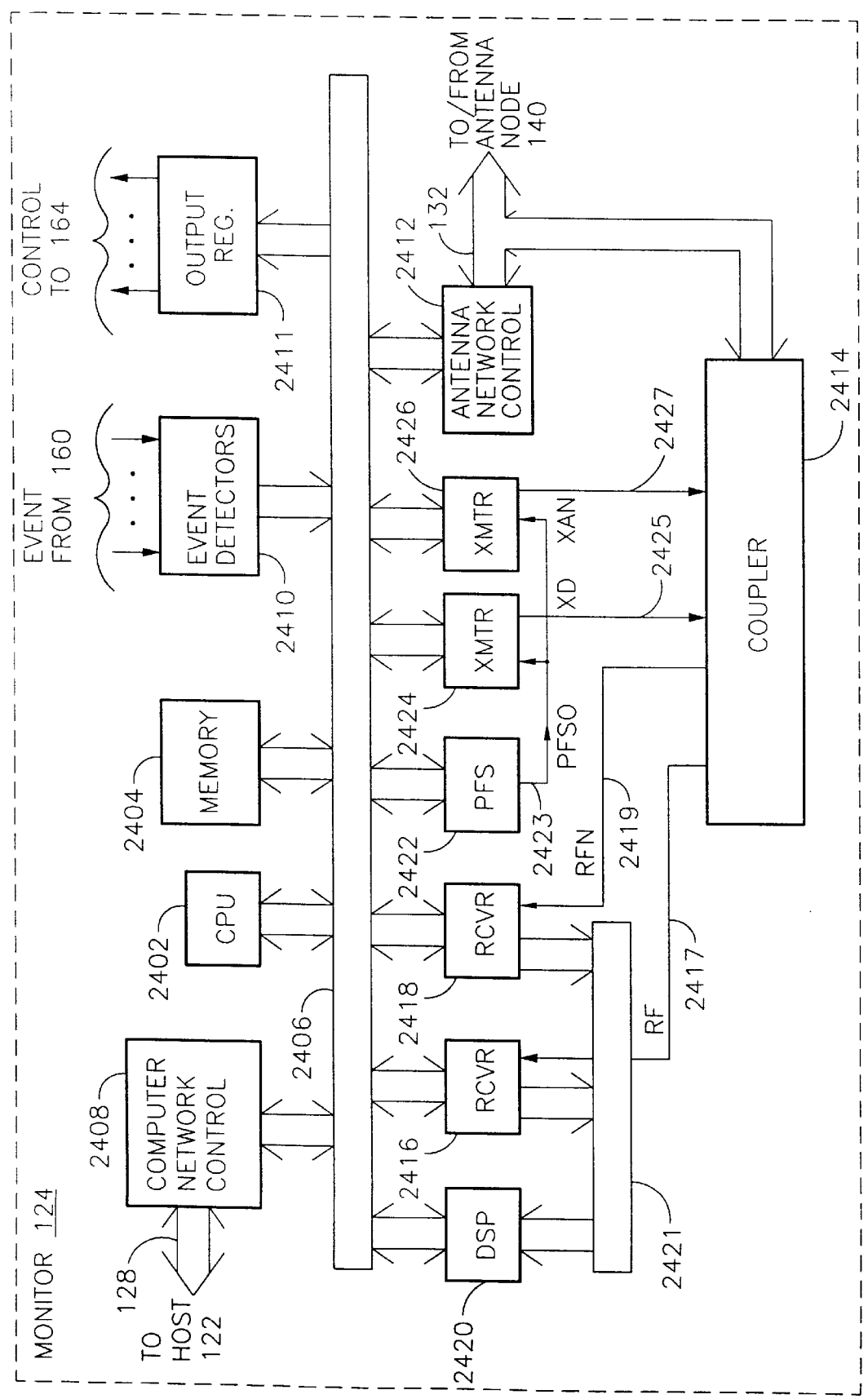
FIG. 24 is a functional block diagram of a monitor of the system of FIG. 1.

Monitor 124 may include any computer controlled transmitter/receiver for conducting a suitable interrogation protocol and communication as discussed above. In addition, a monitor of the present invention may cooperate with various sensors 160, provide various controls 164, and cooperate with various antennas organized as an antenna system 120. For example, monitor 124 as shown in the functional block diagram of FIG. 24 includes central processing unit (CPU) 2402, memory 2404, and conventional data communication bus 2406. Data bus 2406 couples CPU 2402 and memory 2404 for the conventional execution of stored programs in memory 2404 by CPU 2402. Bus 2406, in addition, provides data communication between CPU 2402 and functional blocks including: computer network control 2408, event detectors 2410, output register 2411, antenna network control 2412, receivers 2416 and 2418, digital signal processor (DSP) 2420, transmitters 2424 and 2426, and programmable frequency source (PFS) 2422. Transmitters 2424 and 2426 provide transmitted signals to coupler 2414; and, coupler 2414 provides received radio frequency signals to receivers 2416 and 2418. By providing two functionally equivalent receivers and two functionally equivalent transmitters together with a coupler, monitor 124 may simultaneously transmit on two frequencies and receive on two other independent bands simultaneously. To that end, PFS 2422 provides signal Programmable Frequency Source Output (PFSO) on line 2423 to each transmitter 2424 and 2426. Signal PFSO may be provided to each transmitter on separate lines at different frequencies. Receivers 2416 and 2418 each receiving respectively signal RF on line 2417 and signal RFN on line 2419, may provide samples of received signals in digital format on bus 2421 to DSP 2420. CPU 2402 may control DSP 2420 to prescribe: (a) operation with one or both receivers 2416 and 2418; (b) a time to begin processing samples from bus 2421; (c) a duration for sampling; (d) configuration parameters for selecting a method for digital signal processing; (e) a method and format in which DSP 2420 provides results; and (f) the destination for the results, i.e., whether to CPU 2402, to memory 2404 for further processing by CPU 2402, or to computer network control 2408 for transfer to host computer 122.

DSP 2420 may perform digital signal processing including amplitude averaging, calculation of power, digital filtering, peak detection, time domain edge enhancement, phase analysis, frequency analysis, transformation (e.g., fast Fourier transformations, correlation, superposition, curve-fitting, and power spectral density calculation.

Memory 2404 provides storage for programs and data used primarily by CPU 2402 and DSP 2420. Memory 2404 may include data structures, arrays, stacks, and combinations thereof for storage of signal properties as discussed above. Memory 2404 (or host 122) may also include indicia of group identification and sub-group identification (to any level) for use in interrogation scenarios. These indicia may exclude (or not include) access codes reserved for use in other independent implementations of system 100. For example access code ranges may be specified algorithmically or as one or more lists wherein not all access code values or combinations of values are made available for use during interrogation.

Computer network control 2408 may include any conventional interface for coupling data bus 2406 to host computer 122. For example, computer network control 2408 may include a conventional ethernet interface. Bus 128 provided by computer network control 2408 may conform to any computer network standards, for example, any conventional telecommunications network standard or a standard used in communication via the Internet and the World Wide Web. Computer network control 2408 may include one or more additional processors for maintaining, for example, a TCP/IP stack, or performing any suitable protocol. Computer network control 2408 (and/or CPU 2402) may communicate with host computer 122 using a command language as described in Table 7. Each command includes an ASCII character to identify the command followed by argument values. Operating frequencies may be identified in various command/answer sessions by integers called bins. For example, an operating range from 1.9 MHz to 8.038 MHz may be divided into 1024 bins wherein the frequency corresponding to a given bin integer is computed from the expression: F(bin)=bin*6 KHz+1900 KHz.

TABLE 7

| Command/Answer | Description |
| --- | --- |
| N <Antenna Node><Antenna Address> <Antenna Mode><Gain><Frequency> | Direct the set up and selection of antennas for a monitor to use in a specified mode (e.g., transmit, receive, test). Set antenna node RF channel operating parameters. Specify a frequency for antenna node tuner to use to tune the selected antenna(s). |

TABLE 7-continued

| Command/Answer | Description |
| --- | --- |
| No response. | An acknowledge answer may be used. |
| G <Squelch delay><Squelch width><Receive delay><DSP Start-up Delay><DSP Sample Count><DSP Mode><Ch. A Mode><Ch. A Signal Source><Ch. A Gain><Ch. A Filtering><Ch. A Clock><Ch. A Output> {etc. for Ch. B} | Specify Monitor receiver operating parameters and analog switch settings. Squelch delay facilitates beginning squelch at a zero crossing of energy on the antenna(s) to be squelched. Squelch width corresponds to duration D434. Receive delay may direct beginning receiving on or after the T416 (e.g., at times A or B as discussed above). DSP sample count conveys the number of samples to be taken (e.g. 32 $\mu$sec window for FFT calculation). DSP mode may be as defined by an integrated circuit DSP (e.g., T1320 marketed by Texas Instruments). Ch. A/B mode may direct transmit, receive, or both (loop back) Ch. A/B Signal Source may select same source for two receive channels. Ch. A/B clock source may direct frequency and phase (e.g., 0°, +90°) for signal SC. Ch. A/B output may direct which of several detectors is/are used. |
| No answer. | An Acknowledge answer may be used. |
| C {Ch. A antenna arguments} {Ch. B antenna arguments} <Start frequency><End frequency><Frequency stepping> | Directs the set up and selection of antennas for each (e.g., A and B) receiver in the Monitor with arguments similar to N command. Requests amplitude results (e.g., received amplitude or received power) from each receiver in a specified range of frequencies (i.e., bins) by specifying the bin number range to be reported (e.g., from bin 123 to bin 885). May specify an increment between bins (e.g., report every fifth bin). |
| {<Ch. A Detector Output at Bin p>} . . . {<Ch. B Detector Output at Bin q>} . . . | Reports up to 1024 amplitude values for each channel (e.g., p = 0 to 1023; and q = 0 to 1023). May substitute DSP output when FFT results are desired. |
| O {<Header><Level><Access Code>} . . . | Interrogate a group, subgroup, or particular transceiver. The list Header may define a sequence and number of arguments (e.g., level and access code) in the O command. One or more N command arguments may precede the list. |
| {<Ch. A at Reply Slot p>} . . . {<Ch. B at Reply Slot q>} . . . | An integer for each of two receive channels (e.g., A and B) is provided for each of 1024 reply slots (e.g., p 0 to 1023; q = 0 to 1023). Result depends on G and N command values for antenna, receiver, and DSP operating modes. The integer may represent any of the following: (a) whether amplitude (or power) exceeded a threshold value; (b) a magnitude of a detected amplitude (or power); (c) a magnitude of a frequency component (e.g., as provided by an FFT calculation). In an expanded version, the answer may include a list of integers for each integer in (b) for time domain sampling and (c) for frequency domain results. |

Figure 25:
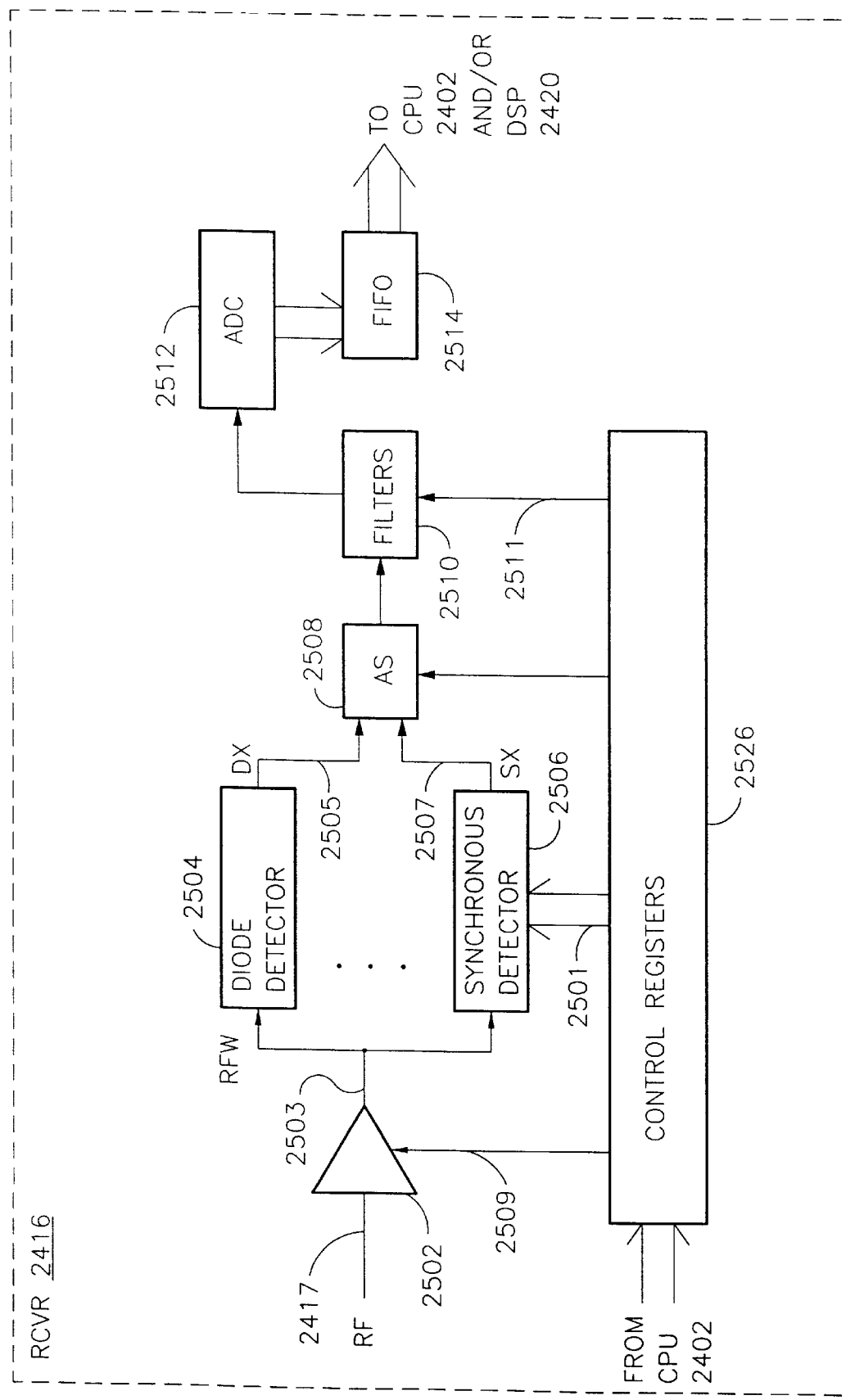
FIG. 25 is a functional block diagram of a receiver of the monitor of FIG. 24.

Receivers 2416 and 2418 may be any conventional receivers. Particular advantages are obtained in system 100 by use of receiver circuitry 2416 of FIG. 25 which includes preamplifier 2502, diode detector 2504, synchronous detector 2506, analog switch 2508, filters 2510, ADC 2512, first-in-first-out (FIFO) register 2514, and control registers 2526. Preamplifier 2502 receives signal RF on line 2417 and provides amplification and automatic gain control (AGC). The gain and frequency response characteristics of preamplifier 2502 are prescribed in a conventional manner by signals 2509 from control registers 2526 as specified by CPU 2402. Preamplifier 2502 provides signal RFW on line 2503 to one or more detectors.

Diode detector 2504 receives signal RFW on line 2503 and provides demodulated signal DX on line 2505. Any conventional diode detector may be used. Diode detector 2504 represents a wide-band detector preferred for detecting transceivers in a stack, especially transceivers having a transmitter of the type described with reference to FIG. 20. Particular advantages in system 100 are obtained by using diode detector 2504 of FIG. 26.

Synchronous detector 2506 receives signal RFW on line 2503 and provides demodulated signal SX on line 2507. Any synchronous detector circuitry may be used to provide the demodulation function including, for example, a conventional tracking filter circuit. Synchronous detector 2506 represents a narrow-band detector.

Analog switch 2508 under direction of control registers 2526 selects one or more detector output signals, for example, signal DX on line 2505 and/or signal SX on line 2507 and provides a demodulated signal (e.g., a superposition) to filters 2510.

Filters 2510 may implement any filtering transfer functions (e.g., low-pass, band-pass, high-pass, and notch) as directed by signals on line 2511 from control registers 2526 as directed by CPU 2402. The output of filters 2510 is converted to digital samples by ADC 2512. Such samples are stored in FIFO 2514 and provided to CPU 2402 and/or DSP 2420. ADC 2512 may include any conventional analog to digital converter circuit. When receiving a 5 MHz response or reply signal, samples 417 may be acquired at 40 MHz to provide sufficient resolution for signal analysis, as discussed above. In an alternate implementation of receiver 2416, signal RFW is coupled to ADC 2512 and detection and filtering are accomplished by CPU 2402, DSP 2420, or by host computer 122 using, for example, conventional digital technologies.

Figure 26:
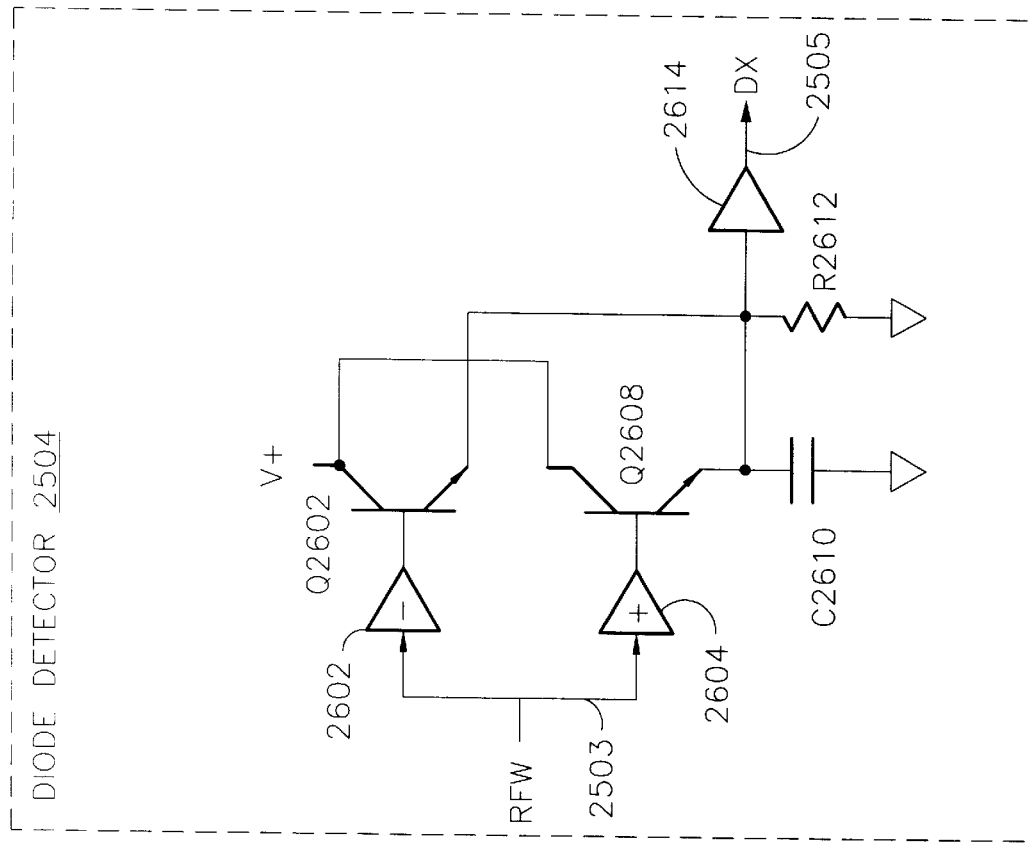
FIG. 26 is a functional block diagram of a diode detector of the receiver of FIG. 25.

Diode detector 2504 of FIG. 26 includes inverting amplifier 2602, non-inverting amplifier 2604, transistors Q2606 and Q2608, capacitor C2610, resistor R2612, and output buffer 2614. Amplifiers 2602 and 2604 receive signal RFW on line 2503 and provide base drive signals to transistors Q2606 and Q2608. Transistors Q2606 and Q2608 rectify the radio frequency content of signal RFW. Capacitor C2610 and resistor R2612 cooperate as a filter to receive rectified signals from transistors Q2606 and Q2608 and provide the filtered wave form to output buffer 2614. Output buffer 2614 provides signal DX on line 2505 in a conventional manner.

Figure 27:
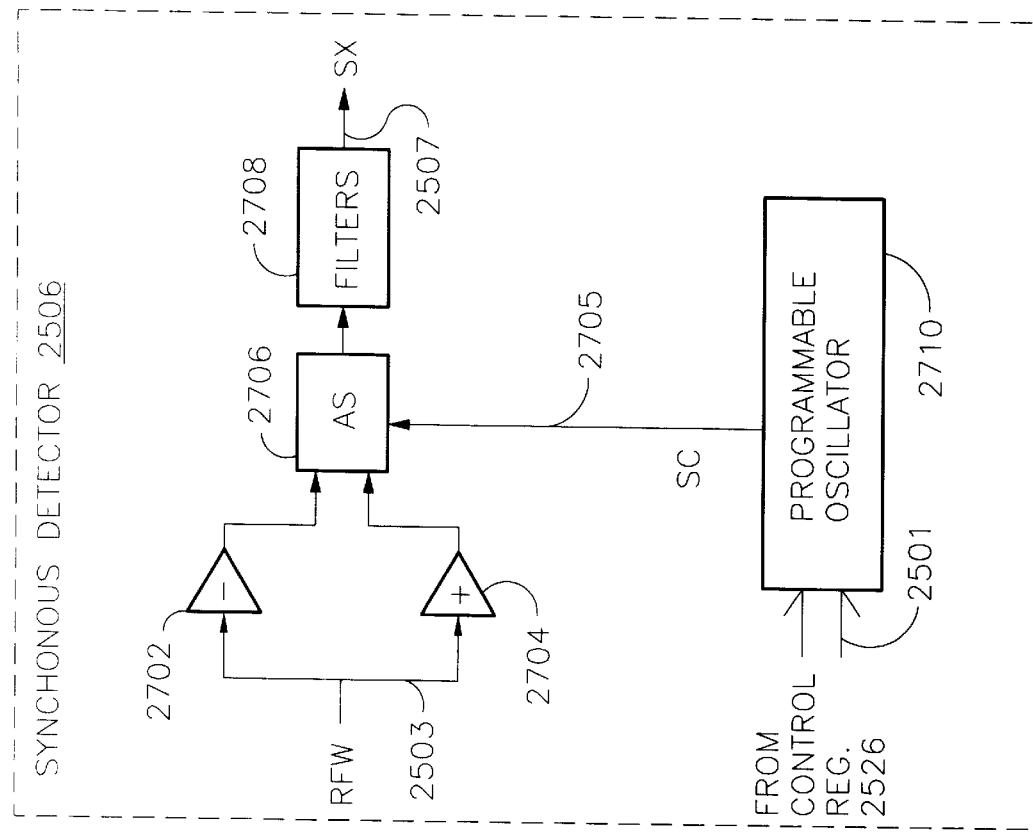
FIG. 27 is a functional block diagram of a synchronous detector of the receiver of FIG. 25.

Particular advantages are obtained in system 100 by using a synchronous detector of the type described in FIG. 27. Synchronous detector 2506 of FIG. 27 includes inverting amplifier 2702, non-inverting amplifier 2704, analog switch 2706, filter 2708, and programmable oscillator 2710. Amplifiers 2702 and 2704 receive signal RFW on line 2503 and provide buffered signals to analog switch 2706.

Analog switch 2706 selects the output of amplifier 2702 for the output of amplifier 2704 under the direction of signal SC on line 2705 from programmable oscillator 2710. Programmable oscillator 2710 operates at a frequency, phase, and duty cycle prescribed by CPU 2402 through control registers 2526 received on line 2501 by programmable oscillator 2710. Phase may be relative to zero crossings detected in a conventional manner from signal RFW. Programmable oscillator 2710 may include a conventional synchronizer circuit for receiving signal RFW and providing signal SC in a phase relationship to signal RFW as directed by signals of control registers 2526. The output of analog switch 2706 may include harmonics of the switching frequency of signal SC. Filter 2708 receives the output of analog switch 2706 and attenuates unwanted frequency components. Filter 2708 may include any conventional filter circuit, for example, a low-pass, notch, band-pass, comb, etc. Filter 2708 provides signal SX on line 2507.

Receivers 2416 and 2418 may be operated, each with a synchronous (narrow-band) detector. The received signals may be received on one or more suitable antennas or delayed to provide a 90° phase difference between otherwise identical signals prior to detection. When one synchronous detector is operated at the same frequency as the other yet with a 90° phase shift in clocking signal SC, the detected amplitudes correspond to conventional I and Q signals for phase detection and signal analysis based on phase, as discussed above.

Figure 28:
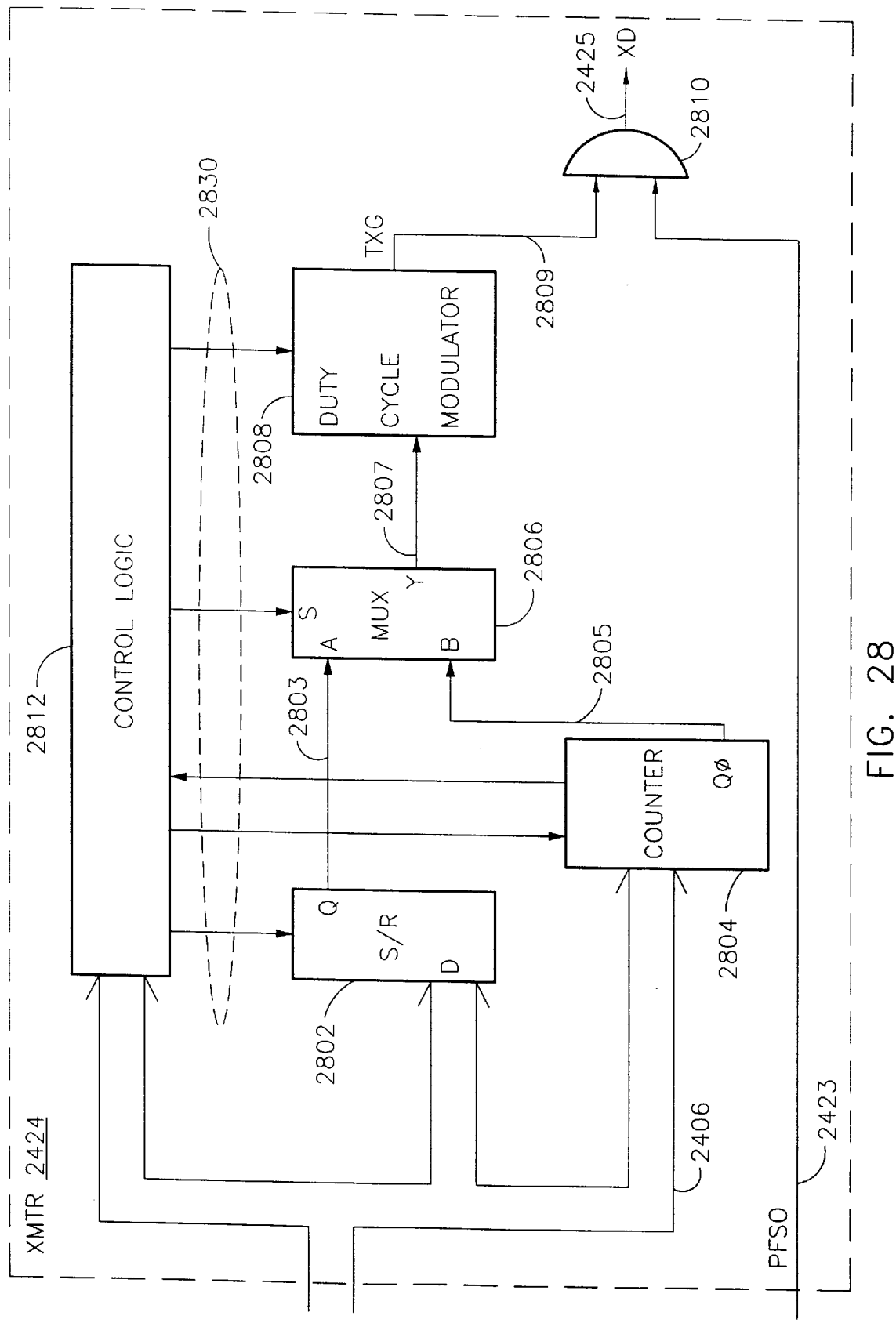
FIG. 28 is a functional block diagram of a transmitter of the monitor of FIG. 24.

Transmitters 2424 and 2426 may include any conventional transmitter circuitry. Particular advantages are obtained in system 100 by using transmitter circuitry 2424 of FIG. 28 which includes shift register 2802, counter 2804, multiplexer 2806, duty cycle modulator 2808, control logic 2812, and output gate 2810. Data bus 2406 from CPU 2402 provides transmitter 2424 with information to be transmitted as well as configuration parameters for control logic 2812. Information to be transmitted is loaded into shift register 2802 in accordance with suitable control signals 2830 provided by control logic 2812. The contents of shift register 2802 may conform to message formats described above with reference to FIG. 11 and FIG. 15. In both cases the reply slots portion of message formats 1120 and 1130 may be provided by operation of counter 2804, loaded by suitable control signals 2830. For example counter 2804 may be loaded with the value 1,000 to provide 1,000 reply slots. Multiplexer 2806 receives serial data shifted out of shift register 2802 on line 2803 and receives counter output Q0 on line 2805. Control logic 2812 provides a selection signal via control signals 2830 to control multiplexer 2806 so as to provide the content of shift register 2802 followed by the number of reply slots directed by the initial count of counter 2804. Operation of multiplexer 2806, therefore, provides on line 2807 a signal in a message format to be transmitted.

Duty cycle modular 2808 may respond to control codes of control signals 2830 from control logic 2812 and the signal on line 2807 to provide modulated signal TXG on line 2809. Off/on keying and duty cycle modulation are provided in a manner consistent with the contents of Table 8.

TABLE 8

| Control Code | Resulting Modulation |
|---|---|
| 00 | No carrier. |
| 01 | 40% modulation for transmitting a "0" data bit. |
| 10 | 60% modulation for transmitting a "1" data bit. |
| 11 | Uninterrupted, unmodulated carrier. |

Transmitted signal XD on line 2425 is provided by the AND combination of signal TXG on line 2809 (defining a transmit gate) and signal PFSO on line 2423. Signal PFSO defines an unmodulated carrier frequency as programmed by CPU 2402 on line 2423.

Antenna system 120 may be controlled in accordance with a physical distribution of antennas so as to support multiple antennas at each of one or more nodes connected by an antenna bus. Each antenna node may provide for coupling one or more antennas to the transmitter and/or receiver portions of monitor 124 in any convenient manner. Antennas may be coupled for balanced or unbalanced use in receiving or transmitting. When multiple antennas are used for transmitting, antennas may be driven in different phases. When multiple antennas are used for receiving, received signals may be delayed for synchronization or provided in a desired phase relationship. Because different antennas of antenna system 120 may have different radiation (or reception) patterns operation of a transmitter with one or more antennas and/or a receiver with one or more antennas provides advantages for communication with transceivers regardless of transceiver orientation and proximity to other transceivers as discussed above. Antenna system 120 provides a reconfigurable multi-antenna system with a tuning capability for each antenna. In addition to tuning each antenna, antenna system 120 has the ability to squelch any antenna used for transmitting and couple the squelched antenna to a receiver for immediate reuse as a receiving antenna. Antenna system 120 provides multiple transceiver channels in each antenna node with the capability of routing signals from one channel into another for signal processing.

Figure 29:
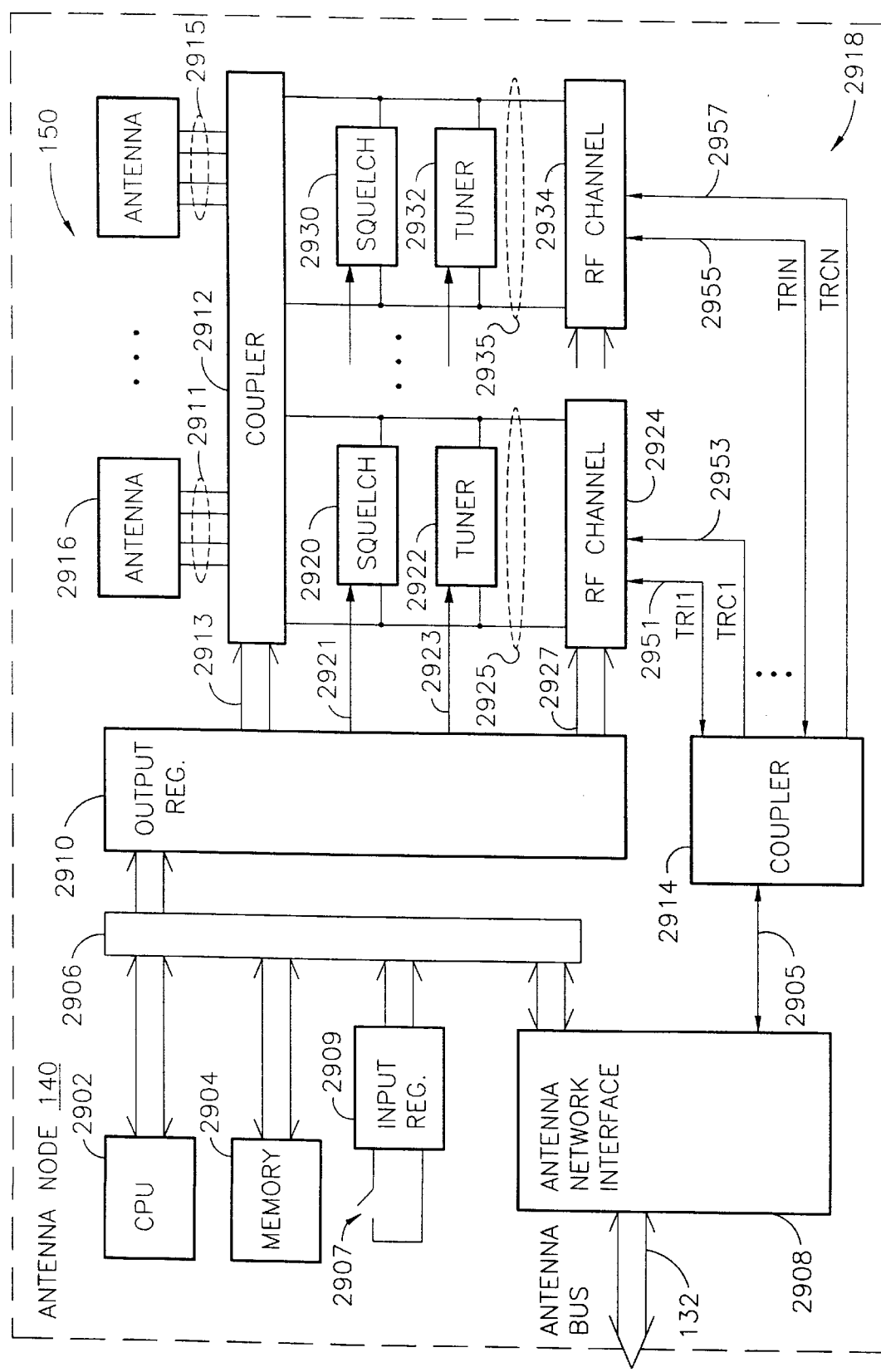
FIG. 29 is a functional block diagram of an antenna node of the system of FIG. 1.

The functions described above for antenna system 120 may be provided by one or more antenna nodes cooperating on an antenna bus. Particular advantages for system 100 are obtained by using the antenna node circuit described in a functional block diagram of FIG. 29. Antenna node 140 as described in FIG. 129 includes CPU 2902 and memory 2904 coupled together by data bus 2906 for program execution. Antenna node 140 further includes antenna network interface 2908, input register 2909, output register 2910, coupler 2912, coupler 2914, a plurality of antennas 150 (including antenna 2916), and a plurality of transceiver channels 2918.

CPU 2902 receives commands and information and provides status using data communication on antenna bus 132, coupled by antenna network control 2412 to CPU 2402. CPU 2402 of monitor 124 provides commands interpreted by CPU 2902 for functions described in Table 9.

closed, directs CPU 2902 to provide one or more test and/or measurement functions. Such functions include identifying a test mode to CPU 2402 of monitor 124 via an appropriate data communication message via antenna network interface 2908. Because antenna node 140 may be packaged and located at a location remote from host computer 122 and/or monitor 124, the convenient location of a manual switch 2907 for test and/or measurement functions simplifies installation and maintenance of system 100 including the installation and maintenance of antenna system 120.

Output register 2910 receives data from data bus 2906, stores such data, and maintains output signals in accordance with stored data Signals provided by output register 2910

TABLE 9

| Command/Answer | Description |
| --- | --- |
| A <Antenna Node Address> | Read status of input register(s) (e.g., manual switches), status of output register(s) (e.g., current matrix switch settings, squelch settings, tuner settings, RF channel settings, feedback settings, any memory address (e.g., antenna node software version, tuner calibration date, number of installed antennas, etc.). |
| <Antenna Node Address><Answer Data Length><Answer Data><Checksum> | Several different commands may be used to obtain status in part. |
| B <Antenna Node Address><Settings Data Length><Settings Data><Checksum> | Set output register(s) contents to specify antenna configuration, antenna(s) coupling to transceiver channel(s), squelch settings for each channel, tuner settings for each channel, feedback settings for each channel. |
| No answer. | An Acknowledge answer may be used.. |
| C <Antenna Node Address><Configuration Data Length><Configuration Data><Checksum> | Set configuration data in memory including antenna node address, antenna addresses, function(s) to be executed on manual switch closure, table of tuning settings (e.g., relay closures vs. frequency), table of antenna settings (e.g., relay closures vs. frequency or configuration identifier), any memory address (e.g., tuner calibration date, number of installed antennas, etc.). |
| No answer. | Several different commands may be used to specify configuration in part. An Acknowledge answer may be used. |

Memory 2904 provides storage for programs executed by CPU 2902, storage for configuration information for other functional blocks of antennas node 140, and tuning parameters used in transceiver channels 2918. This information may be organized in memory 2904 in any conventional data storage format.

Antenna network interface 2908 provides data transfer and control among antenna bus 132 data bus 2906, and coupler 2914. Antenna network interface 2908 may provide serial to parallel and/or parallel to serial data format conversion for transferring signals between serial antenna bus 132 and parallel data bus 2906. Antenna network interface 2908 may buffer received signals from transceive channels 2918 to receivers 2416 and 2418 of monitor 124. Further, antenna network interface may receive modulated carrier signals from transmitters 2424 and 2426 in monitor 124 and provide buffered signals for transceive channels 2918. Received signals and modulated carrier signals pass between antenna network interface 2908 and coupler 2914 on line 2905.

Input register 2909 monitors the state of switch 2907 and communicates a switch closure event via data bus 2906 to CPU 2902. Switch 2907 may provide any manual data entry function. Switch 2907 is representative of any number of switches, for example, toggle switches or a data entry keyboard. In a preferred configuration, switch 2907 when direct operation of coupler 2912 and transceive channels 2918. Output register signals on line 2913 control coupler 2012 9 (e.g., configuration and matrix switch operations). Squelch command signals on line 2921 direct antenna squelching functions of squelch circuit 2920. Tuning signals on line 2923 direct tuning functions of tuner 2922. Finally, digital signals on line 2927 control operation of transceiver channels 2924 (e.g., specifying preamplifier gain, automatic gain control, and filter transfer functions). Output register signals on lines 2913, 2921, 2923, and 2927 are binary digital signals and may be used in common across multiple transceive channels 2918, or additional digital signals may be provided by output register 2910 for each transceive channel.

Coupler 2912 may include any conventional circuit for coupling an antenna to an RF channel. For example, coupler 2912 provides a matrix switch for the coupling of any antenna of antennas 150 (for example, antenna 2916) to one or more transceive channels 2918. In like manner, any transceive channel, for example 2924, may be coupled to one or more antennas 150 through coupler 2912. Coupler 2912 provides a bi-directional coupling for both received and transmitted signals and supports multiple received and transmitted signals simultaneously. Coupler 2912 may also provide appropriate switching to select antenna elements of an individual antenna 2916 of antennas 150. For example, one or more of lines 2911 and 2915 may be coupled to one or more lines 2925 and 2935 to implement: (a) phased array transmission or reception; (b) use of antennas (or elements) in sequence; (c) scanning while interrogating or transferring data; or (d) providing operative power on antenna(s) different from the antenna(s) used for interrogation or data transfer. Coupler 2912 couples antenna elements (e.g., of antenna 2916) for use with one or more transceive channels 2918 in accordance with signals on line 2913 received from output register 2910. Antenna element selection as discussed above may be performed for any one or more antennas of antennas 150.

Coupler 2914 may include any conventional RF switching circuitry for coupling and buffering modulated carrier signals and received signals between antenna network interface 2908 and one or more transceive channels 2918. For example, when antenna bus 132 provides one modulated carrier signal for transmission, antenna network interface 2908 may provide the modulated carrier on signal line 2905 to coupler 2914. Coupler 2914 may couple the modulated carrier signal via one or more signals TRI1 2951 through TRIN 2955 to one or more transceive channels 2918. In addition, coupler 2914 may buffer any received signal (e.g., TRI1 through TRIN) to provide any one or more feedback signals TRC1 2953 through TRCN 2957 signals TRC1 through TRCN from coupler 2914 permit a first transceive channel 2924 to provide its output signal TRI1, for example, in accordance with: (a) antenna signals 2925 received from coupler 2912, and (b) signals received through any one or more other transceive channels 2918, for example, RF front channel 2934. Coupler 2914, therefore, provides for the combination of received signals from one or more RF channels to be provided on signal line 2905 to antenna network interface 2908. Coupler 2914 enables a single RF channel (e.g., 2924) to combine a channel signal (e.g., 2925) with a signal from one or more other RF channels (e.g., TBC1 . . . TRCN) and provide the resulting received signal (e.g., TRI1) on line 2905 to antenna network interface 2908.

Transceive channels 2918 include one or more parallel circuits for performing, inter alia, antenna tuning and squelch functions. Each transceive channel is a functional equivalent of other transceive channels to provide similar (yet configurable) functions on each of several channels. Each transceive channel includes an RF channel circuit, a tuner, and a squelch circuit.

Figure 30:
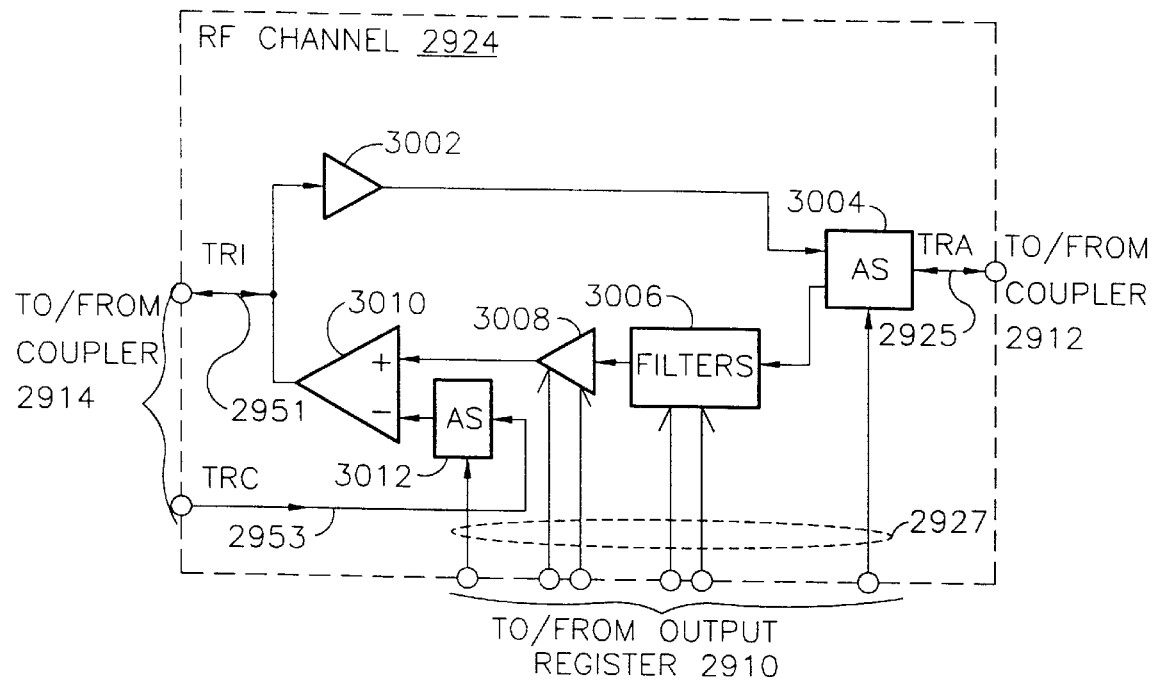
FIG. 30 is a functional block diagram of an RF channel of the antenna node of FIG. 29.

RF channel circuit 2924 may provide transmit signal buffering and received signal filtering and amplification in any conventional manner. Particular advantages in system 100 are obtained using RF channel circuit 2924 of FIG. 30. RF channel 2924 of FIG. 30 includes amplifier 3002, analog switch 3004, filters 3006, programmable preamplifier 3008, differential amplifier 3010, and analog switch 3012. For a modulated carrier signal to be transmitted on an antenna 150, RF channel circuit 2924 receives signal TRI on line 2929, provides buffering and amplification via amplifier 3002, and passes the buffered signal through analog switch 3004 as signal TRA on line 2925 to coupler 2912. For a signal received from coupler 2912, signal TRA on line 2925 passes through analog switch 3004 to filters 3006. Filters 3006 provide any conventional filtering function (e.g., low-pass, band-pass, notch, and high-pass analog or digital filtering). When received signal TRA includes OOK modulation, filters 3006 may include time domain signal processing functions, for example, Schmidt triggering and/or edge enhancement functions. Programmable preamplifier 3008 responds to control signals 2927 from output register 2910 to provide a transfer function with programmable gain at various frequencies, (e.g., automatic gain control).

Differential amplifier 3010 receives the output signal from preamplifier 3008 and may receive a signal TRC1 on line 2953 via analog switch 3012. Analog switch 3012 is controlled from output register 2910 via signals 2927. When analog switch 3012 allows passage of signal TRC1 to differential amplifier 3010, differential amplifier 3010 may perform an analog subtraction to provide a difference signal TRI1 on line 2951. The analog subtraction may provide additional common mode rejection; or, may provide an enhanced signal for receiving a reply from a transceiver 201 when, for example, more than one antenna 150 is used for the reception of the reply signal. Differential amplifier 3010 may include programmable phase shift circuits for enhancing the common mode rejection or signal enhancement capability under the direction of signals from output register 2910. Phase correction may be desirable when antennas of different configurations or different orientations supply signals to differential amplifier 3010.

Tuner 2922 matches the impedance of an antenna (e.g., antenna 2916) to an RF channel circuit 2924. The effects of coupler 2912 and antenna element selection performed by coupler 2912 are accounted for by operation of tuner 2922. Tuner 2922 may include any conventional tuning circuit. Tuner 2922 preferably includes impedance matching elements that are selectively introduced between an RF channel circuit and an antenna in responsive to signals from output register 2910. Memory 2904 may include data and methods for determining suitable control signals for tuner 2922.

Memory 2904 (or memory 2404, or memory in host computer 122) includes an array of values for output register 2910, each value including a bit to control closure of each of several switches in tuner 2922. The array is indexed by an integer corresponding to a desired operating frequency (e.g., a bin number as discussed above). Values for such an array may be determined according to an antenna test method. An antenna test method according to various aspects of the present invention includes the steps of: (a) direct a transceiver channel (e.g., including tuner 2922) to be used for both transmitting (e.g., from transmitter 2424) a test signal and for receiving (e.g., using receiver 2416), the test signal having a suitable amplitude and test frequency throughout the test method; (b) direct use of a narrow band detector (e.g., synchronous detector 2506 of FIG. 27); (c) select and direct a switch closure combination and observe a detector output; (d) compare the detector output to a maximum observed detector output; (e) if the detector output exceeds the maximum detector output, update the maximum observed detector output to match the detector output and note the switch closure combination corresponding to the detector output; (f) repeat steps (c) through (e) until all switch combinations have been selected; (g) record the switch closure combination corresponding to the maximum detector output in an array for the tested antenna (or combination of antennas) indexed by the test frequency. After testing each installed antenna (separately or in combination (s) with other installed antennas) at one or more test frequencies, results of several tests may be stored in an integrated array that includes for each frequency a recommended antenna (or combination of antennas) and a recommended tuner switch closure combination. The integrated array may be stored in volatile or nonvolatile memory in host computer 122, memory 2404, or memory 2904.

Figure 31:
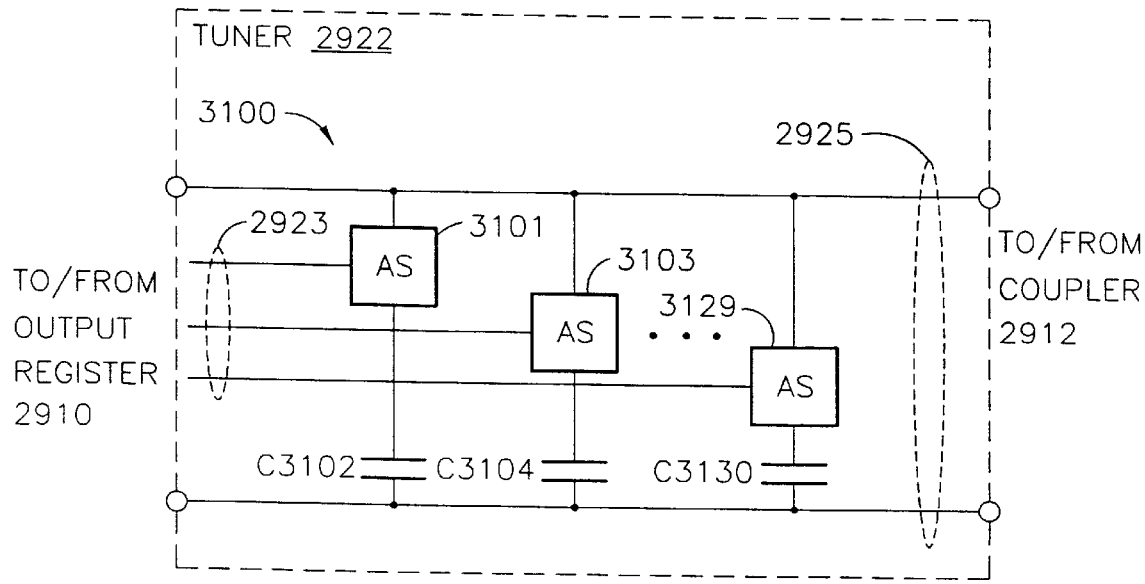
FIG. 31 is a functional block diagram of a tuner of the antenna node of FIG. 29.

Particular advantages are obtained in system 100 by using tuner circuit 2922 of FIG. 31. Tuner circuit 2922 of FIG. 31 includes one or more shunt circuits 3100 spanning signal lines 2925 that pass through tuner 2922 between RF channel circuit 2924 and coupler 2912. Each shunt circuit includes, respectively, an analog switch and a capacitor. For example, analog switch 3101 is controlled by an output signal from output register 2910. When closed, analog switch 3101 connects capacitor C3102 across lines 2925 to increase the capacitive load. In like manner, analog switch 3103 may connect capacitor C3104; and, analog switch 3129 may connect capacitor C3130. Capacitors C3102, C3104, and C3130 may have values in a binary sequence, for example, as conventionally used in a digital to analog converter circuit.

Memory 2904 may include a method for operation of squelch circuit 2920 to perform a suitable squelch function as discussed above. Antenna network interface 2908 may provide a mechanism for analyzing the phase of a signal to be transmitted and provide such phase information on data bus 2906 to CPU 2902. Phase information may be indicated by a suitable interrupt corresponding to a zero crossing. Squelch command signals on lines 2921 provided by output register 2910 may be clocked through output register 2910 in accordance with phase information as discussed above, when signal processing latency of CPU 2902 (e.g., interrupt latency) does not provide a squelch command signal in reliable close proximity to a zero crossing of a modulated carrier signal to be transmitted. CPU 2902 may provide a command signal to output register 2910 that accounts for variations in RF channels 2918 and variations in modulated carrier signals so as to operate squelch circuit 2920 in an efficient manner. The squelch function is considered efficient when energy on antenna elements is quickly dissipated in close proximity to a zero crossing of the phase of a signal to be transmitted. The squelch function should account for energy stored in all related circuitry including distributed capacitances of, for example, coupler 2912, tuner 2922, and RF channel 2924.

Figure 32:
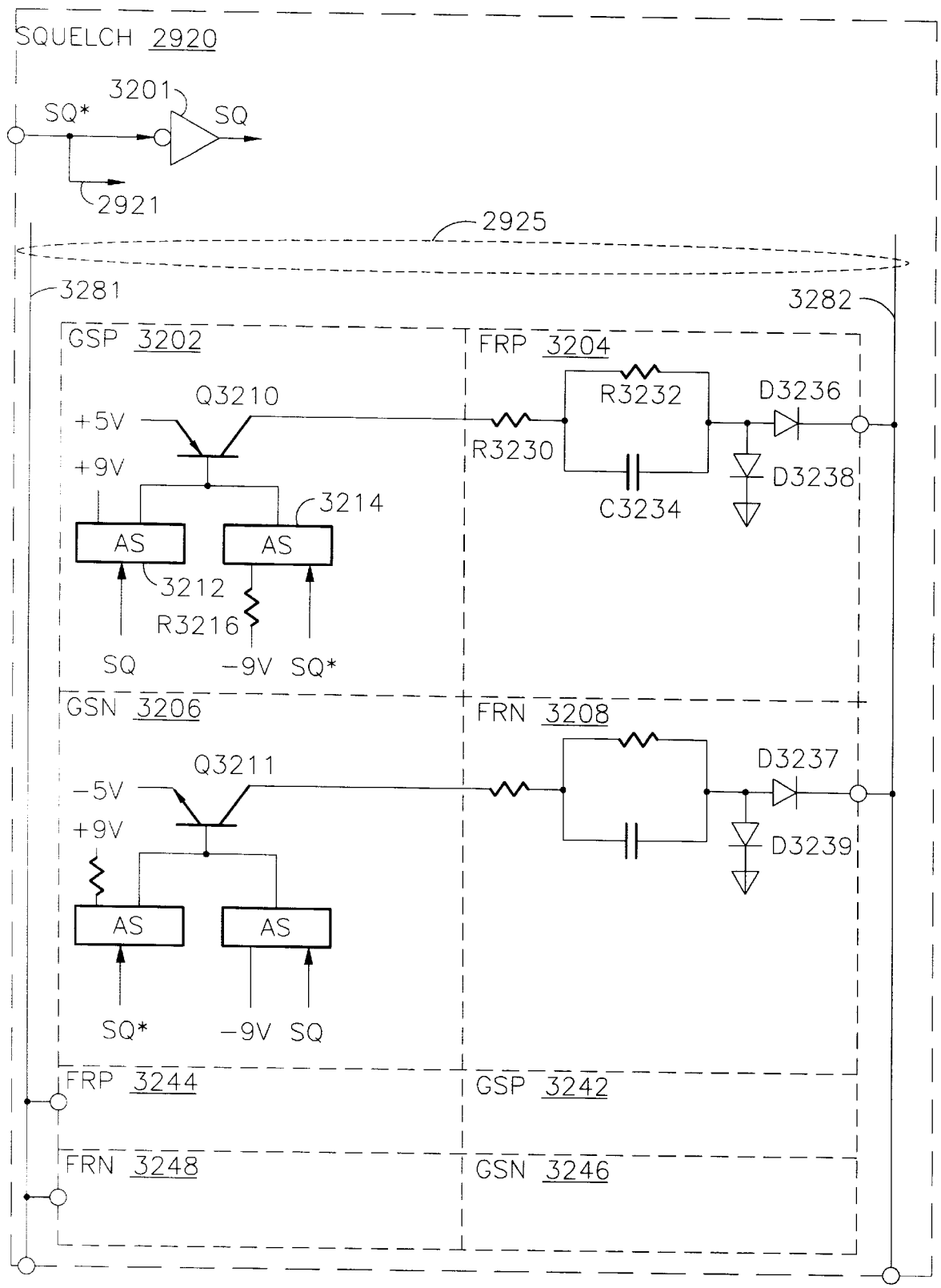
FIG. 32 is a functional block diagram of a squelch circuit of the antenna node of FIG. 29.

Squelch circuit 2920 may include any conventional squelch circuitry. Particular advantages are obtained in system 100 by using squelch circuit 2920 of FIG. 32 which includes inverter 3201, gated source positive (GSP) 3202, filtered rectifier positive (FRP) 3204, gated source negative (GSN) 3206, filtered rectifier negative (FRN) 3208, FRP 3244, GSP 3244, FRN 3248, and GSN 3246.

GSP 3202 includes switch transistor Q3210 having a base connected to analog switch 3212 and to analog switch 3214. The collector of transistor Q3210 is coupled to FRP 3204. In operation, signal SQ* drives analog switch 3214 to couple a −9 volt supply through resistor R3216 to sink current from the base of transistor Q3210 turning transistor Q3210 on, and providing current from a +5V source at the emitter of transistor Q3210 through the collector to FRP 3204. In an opposite phase, signal SQ drives analog switch 3212 to couple a +9V supply to the base of transistor Q3210, quickly tuning transistor Q3210 off. GSN 3206 is of analogous structure for operation with an opposite polarity for transistor Q3211.

FRP 3204 includes a series filter consisting of resistor R3230 and the parallel combination of resistor R3232 and capacitor C3234. The output of the series filter feeds a node between a pair of diodes D3236 and D3238. Diode D3238 is forward biased by the current provided through resistor R3230 and resistor R3232. Diode 3236 clamps leg 3282 of signals 2925 to a voltage that is one diode drop above ground; the diode drop being provided by diode D3238. FRN 3208 is of identical structure as FRP 3204 except that diodes D3237 and D3239 are in reverse polarity orientation. In operation squelch circuit 2920 of FIG. 32 clamps legs 3281 and 3282 alternatively to plus and minus current sources for quickly extinguishing any potential difference between legs 3281 and 3282. In operation, an antenna may be squelched using circuit 2920 of FIG. 32 in a manner sufficient for use with a receiver in less than one-half cycle of a transmitted carrier signal (e.g., in about 35 μsec).

Figure 33:
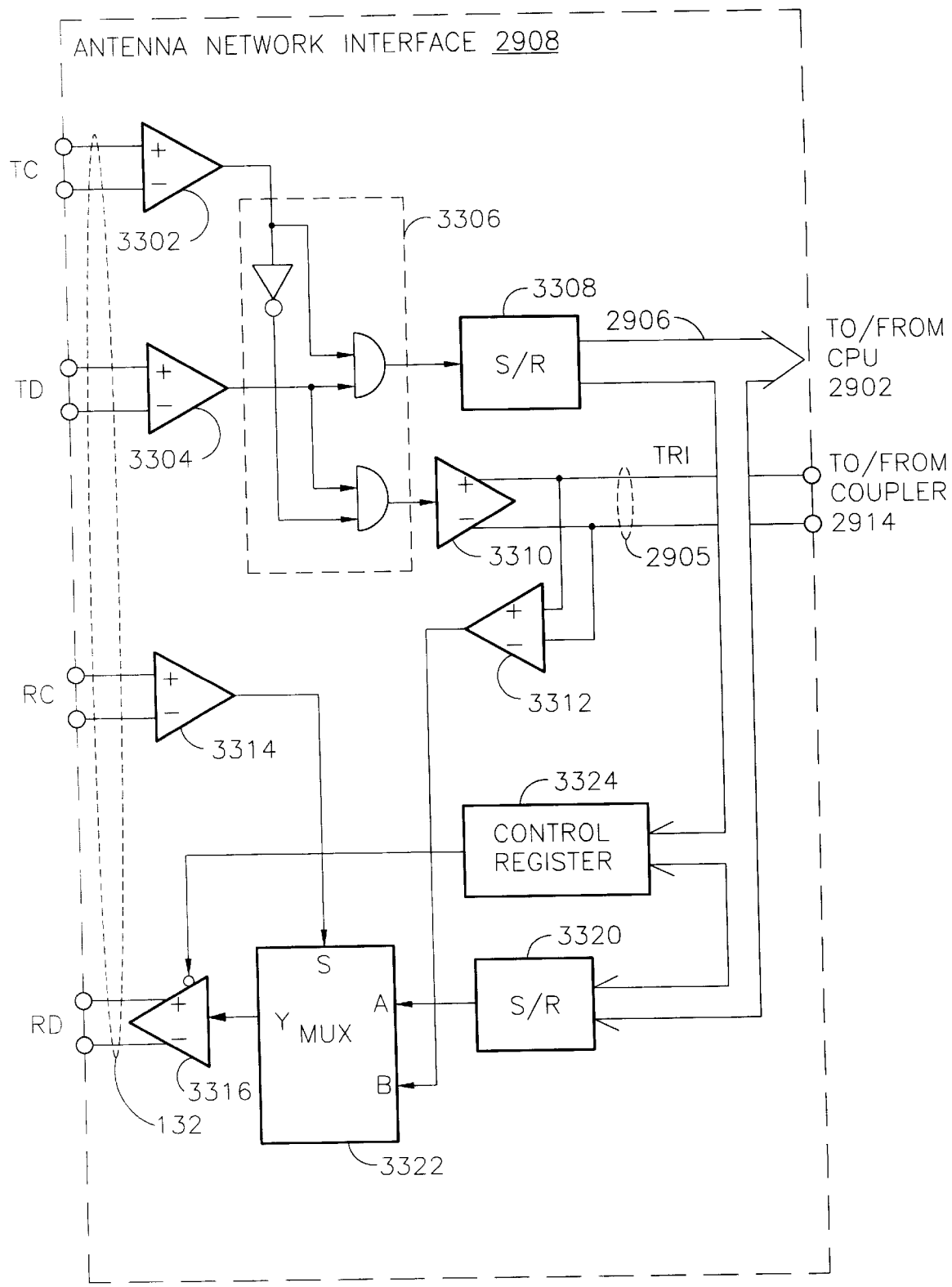
FIG. 33 is a functional block diagram of an antenna network interface of the antenna node of FIG. 29.

Antenna bus 132 may be any serial or parallel bus for the control of antenna system 120 by monitor 124. Antenna system 120 may be organized as a bus, a daisy-chain, a star, or a hierarchical combination of subnetworks. Particular advantages are obtained in system 100 by using an antenna bus 132 comprising four differential signals physically arranged as a network controlled by monitor 124. For example, antenna network interface 2908 of FIG. 33 includes interface buffers 3302, 3304, 3314 and 3316, signal selector 3306, shift register 3308, transmit buffer 3310, receive buffer 3312, shift register 3320, output multiplexer 3322, and control register 3324. Antenna bus 132 includes any suitable number of the signals described in Table 10.

TABLE 10

| Signal Name | Signal Description |
| --- | --- |
| TC | Transmit control. Signal TC controls signal selector 3306 that couples signal TD to either shift register 3308 (as a command to CPU 2902) or to transmit buffer 3310 (for providing signal TRI on line 2905 to coupler 2914). |
| TD | Transmit data. Signal TD provides a serial command which may include an ASCII command character followed by one or more bytes of argument values to be used with the command; or, a modulated signal to be routed by coupler 2914 for transmission. |
| RC | Receive control. Signal RC controls output multiplexer 3322 for the selection of either signal TRI from coupler 2914 through receive buffer; or, data from CPU 2902 converted from parallel to serial format by shift register 3320. The signal resulting from selection drives interface buffer 3316 to provide signal RD. |
| RD | Receive Data. Signal RD is provided only when CPU 2902 determines a proper address from a received command (e.g., matching a predetermined address). Signal RD may provide a serial response (via shift register 3320) from CPU 2902 to a command (received via shift register 3308). Signal RD may, alternatively, respond to transceive channel output from coupler 2914 (via receive buffer 3312) to provide a received signal to monitor 124. |

When signals TC and RC are asserted, data communication in serial on lines TD and RD provide information flow between CPU 2902 and CPU 2402 of monitor 124. When signals TC and RC are not asserted, signals TD and RD provide transmit and receive signals, respectively, from one or more transceive channels to one or more transmitters or receivers in monitor 124. Antenna bus 132 uses differential line drivers for all signals so that antenna nodes may be physically distributed a considerable distance apart for the convenience of locating antennas 150 and 152. Monitor 124 (via antenna network control 2412) supplies signals TC, TD, and RC to all antenna node interfaces 2908 of respective antenna nodes 140, 142 simultaneously. Data communication via signals TC, TD, and RC may include any conventional protocol to coordinate nonconflicting use of each shared signal line (e.g., lines for signals RD). For example, signal TD may include a command followed by an address. Each CPU 2902 may compare the received address from shift register 3308 with a predetermined address so as to enable line driver 3316 via control register 3324 at a time dictated by the protocol and the result of address comparison so as to obtain data communication to monitor 124 without interference from other antenna network interfaces in other antenna nodes.

Control of antenna node 140 by monitor 124 may be obtained using any conventional command set and command syntax, for example, the commands discussed above with reference to Table 9.

Figure 35:
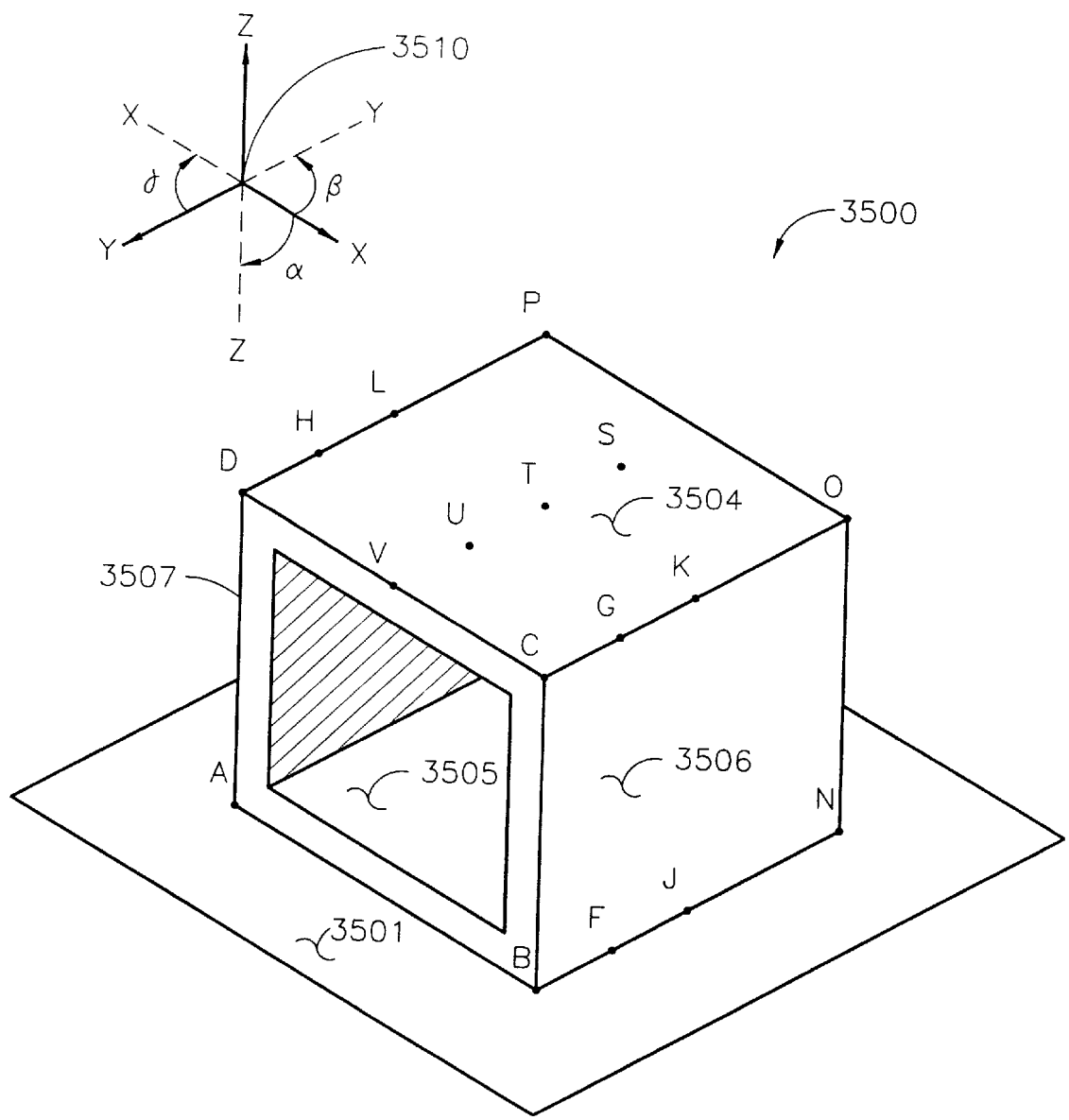
FIG. 35 is a plan view of a passage through which objects of FIG. 1 may pass for purposes of identification and control in an exemplary installation of the system of FIG. 1.

Antennas 150 may include one or more antennas having various geometries for the detection of reply signals from one or more transceivers of system 100. Planar antennas in a variety of configurations may be used. For example, antennas defined in FIGS. 34 and 35 provide particular advantages in system 100. These planar antennas may be supported by one or more antenna nodes 140, 142 in any convenient combination as desired. Passage 3500 includes walls 3506 and 3507, top 3504, and base 3505 arranged over ground plane 3501. Although not drawn to scale, passage 3500 preferably has a square aspect ratio for the opening through which objects may pass. Passage 3500 has been found to provide suitable performance when constructed as a passageway for personnel (including portions of a building, e.g., floor, wall, or ceiling of a hallway) and when constructed as a passageway for carriers of objects (having an opening approximately three feet square, i.e., about one meter square). Smaller passages may be used for tabletop instrumentation.

A reference coordinate system having an origin 3510 serves to define the plane of each planar antenna. Angle alpha ($\alpha$) is measured in the XY plane from the X axis. Angle beta ($\beta$) is measured in the XZ plane from the X axis. Angle gamma ($\gamma$) is measured in the YZ plane from the Y axis.

As a practical matter, an antenna having more than one turn, may not exist in one plane. However, the planar antennas described in FIG. 34 may be manufactured to approximate the antenna pattern that would be produced by a theoretical planar antenna. Alternatively, antennas at similar planar angles may be formed (or loops arranged) along an axis perpendicular to the plane (e.g., helical).

Antenna 3401 is constructed in the plane defined by points A, B, C, D, i.e., in a plane parallel to the XZ plane at the opening of the passage furthest on the Y axis from origin 3510. Antenna 3402 is parallel to antenna 3401 yet closer to origin 3510. Movement of a transceiver along an axis through the passage parallel to the y axis may be determined by examination of the time when the peak reply signal strength is received from each of antennas 3401 and 3402. Antenna 3403 is again parallel to the XZ plane and in addition exists at the mid-point of the passage (e.g., each point J, K, L, exists at the mid-point of a segment NB, OC, PD parallel to the Y axis). Antenna 3404 may be arranged at an angle $\alpha=45°$ when passage 3500 is essentially cubic in geometry. Similarly, antenna 3405 may be perpendicular to antenna 3404 when passage 3500 is essentially cubic. Antenna 3406 is oriented in a plane having angles $\alpha=135°$ and $\gamma=135°$ and is of the type described in related patent application Ser. No. 09/233,755, cited above. Antenna 3407 has an orientation complimentary to antenna 3406. Antenna 3408 lies in a plane parallel to the ground plane 3501. Antenna 3409 and antenna 3410 are parallel to the YZ plane and may be constructed in sides 3506 and 3507, respectively.

Transceive channel circuitry, particularly squelch circuit 2920 should be located as specified in the Table for optimum performance (minimal generation of out-of-band noise). Points T, U, and V bisect segments LK, HG, and DC respectively. Point S bisects segment PK.

A passage including antennas 3402, 3403, 3406, 3407, 3408, and 3409 is preferred for an object identification system wherein objects 102 through 112 pass through the passage for identification and data transfer. Other combinations of the antenna orientations discussed above may be used for economy, reliability, or to enhance particular system performance.

Figure 36:
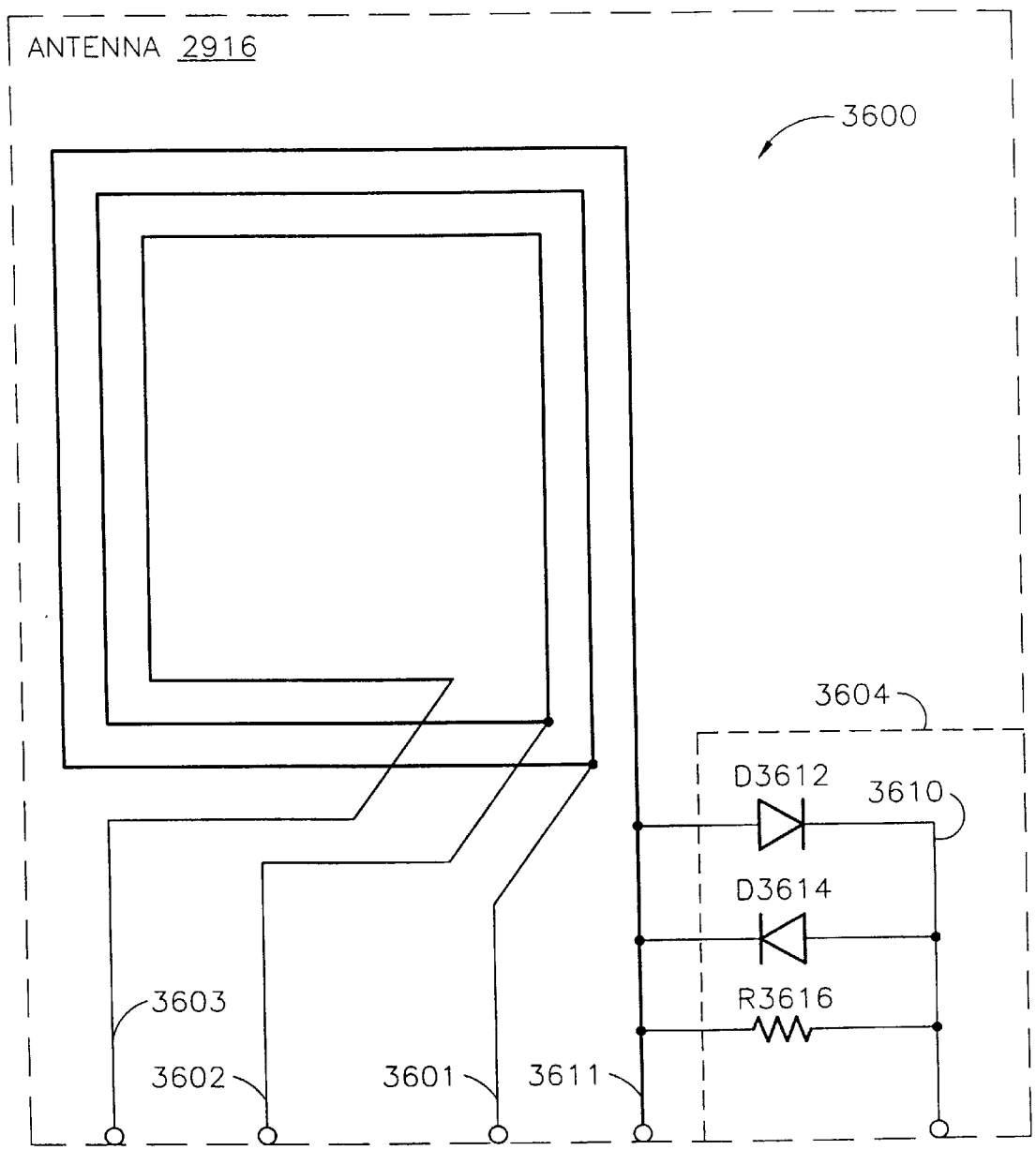
FIG. 36 is a schematic diagram of an antenna of the system of FIG. 1.

Any antenna of antennas 150 may be constructed of multiple loops as a planar antenna Particular advantages are obtained in system 100 by using an antenna of the type described in FIG. 36. Antenna 3600 includes three loops and terminals 3601, 3602, 3603 referenced to a common terminal 3611. Loops may be formed of any conductor including a shielded conductor for limiting E-field radiation while sending or receiving magnetic field radiation. In addition, antenna 2916 includes Q modifying circuit 3604. Q modifying circuit 3604 includes diode D3612, diode D3614, and resistor R3616, all connected in parallel terminal 3610 to terminal 3611. In operation, a transmit signal, for example, signal TRA on line 2925 through coupler 2912, may be imposed across two terminals: a first selected from the set consisting of terminals 3601, 3602, and 3603; and a second selected from the set consisting of 3610 and 3611. When terminal 3610 is used, a transmit signal of suitable magnitude may forward bias diodes D3612 and D3614 to shunt resistor R3616. A relatively high Q antenna circuit results. On the other hand, a signal received by antenna 2916 having a signal magnitude insufficient to forward bias diodes D3612 and D3614 will pass through resistor R3616. A relatively low Q antenna circuit results. A lower Q antenna is typically characterized by a wider band sensitivity than a higher Q antenna. When transmitting energy intended to power one or more transceivers, a higher Q antenna is preferred.

Figure 37:
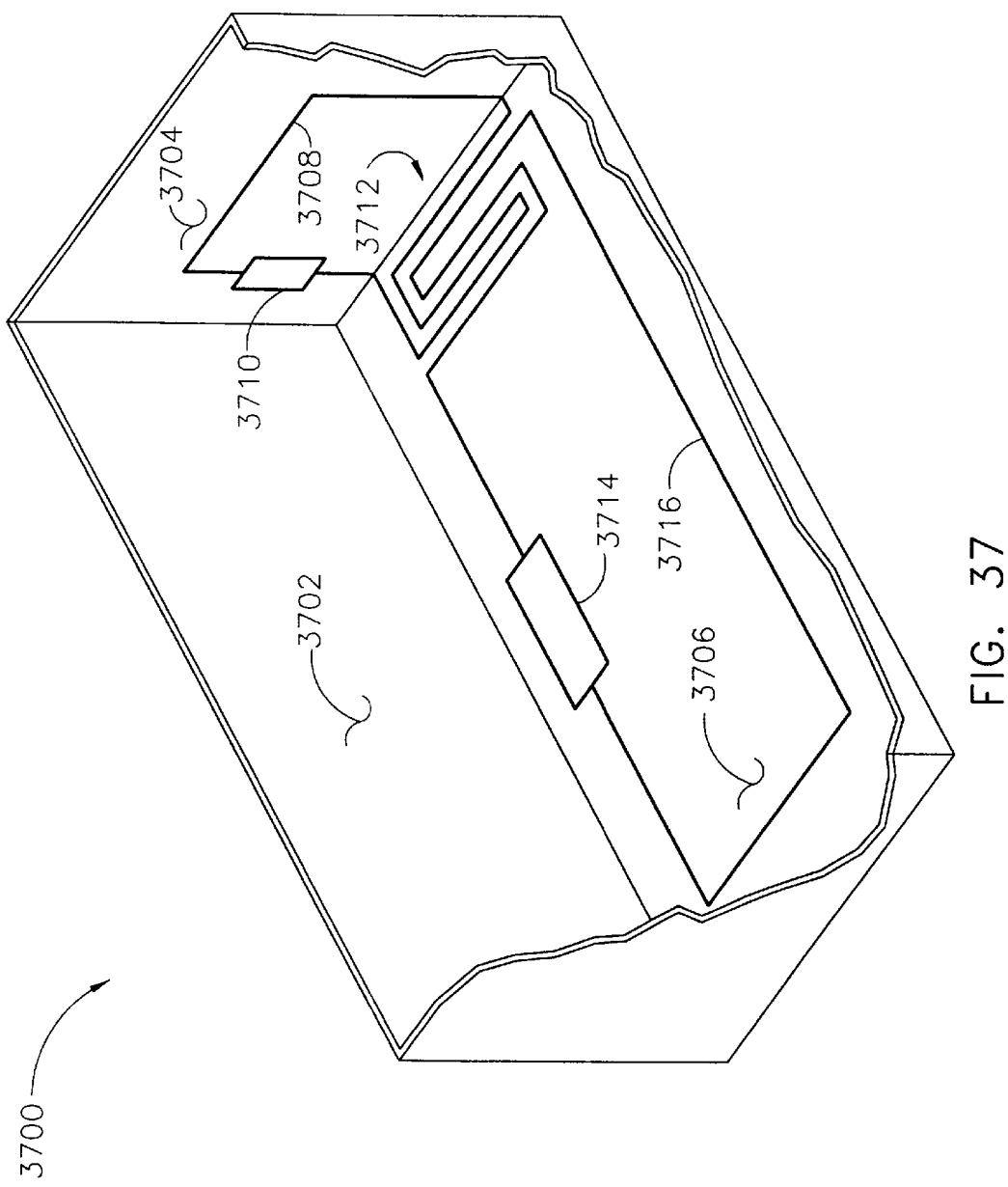
FIG. 37 is a plan view of a carrier which may be used to enhance communication for several objects of the system of FIG. 1.

When objects 102 through 112 are to be interrogated while passing through a passage of the type described or discussed above with reference to FIG. 35, interrogation and data communication reliability may be enhanced by arranging objects 102 through 112 in one or more transportation carriers. A transportation carrier, according to various aspects of the present invention, includes one or more resonant antenna circuits for focusing transmitted and received energy. Carrier 3700 of FIG. 37 is exemplary of any structure in which objects of the type described above may be located for convenient interrogation and data communication. A carrier having any geometry may be used for extending or shaping the antenna sensitivity pattern of the antenna of an object, for example, antenna 202 of object 104 or FIG. 2. For example, transportation carrier 3700 includes side walls 3702 and 3704, and base 3706. In addition, carrier 3700 includes antenna circuit 3708 comprising a loop conductor and series capacitor C3710. Antenna circuit 3708, by virtue of the value of capacitor C3710, has a resonant frequency selected to enhance energy transferred to an object and/or communication between monitor 124 and an object. In a preferred configuration, antenna circuit 3708 is arranged with a relatively low Q and at a resonant frequency substantially different from frequencies which may be used for interrogation and data communication. When monitor 124 provides a scan signal or subscan signal of the type discussed with reference to FIG. 4, the ring signal associated with antenna circuit 3708 may be easily identified as discussed above so that interrogation at the resonant frequency of antenna 3708 may be avoided.

Carrier 3700 may include a second antenna circuit 3716 constructed in a manner similar to antenna circuit 3708 with a series capacitance C3714. Antenna circuits 3708 and 3716 may be coupled in any convenient manner (e.g., interdigitated loops, overlapping portions) arranging a portion of each loop in close proximity for magnetic field or electric field coupling.

Memory, as discussed above, may include any apparatus for data storage (e.g., semiconductor circuits, circuits of discrete components, and magnetic and/or optical media.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A structure for retaining a provided plurality of radio frequency identification devices in a common location, the structure comprising:
   a. a support that maintains the plurality at the common location; and
   b. a circuit electrically isolated from the plurality, the circuit comprising a first antenna that re-radiates radio frequency energy for improving an operation of at least one of the radio frequency identification devices.

2. The structure of claim 1 wherein the support is part of a container that contains the plurality of radio frequency identification devices.

3. The structure of claim 2 wherein the container supports the plurality of radio frequency identification devices for transporting the plurality as a group within range for communication.

4. The structure as in any one of claims 1–3 wherein the circuit further comprises a capacitance that tunes the antenna.

5. The structure of claim 1 wherein the circuit has a resonant frequency.

6. The structure of claim 5 wherein:
   a. the radio frequency identification devices operate with respect to a frequency band; and
   b. the resonant frequency is not within the band.

7. The structure as in any one of claims 1–3 and 5–6 wherein the circuit further comprises a second antenna coupled to the first antenna for providing a combined antenna pattern.

8. The structure of claim 1 wherein:
   a. a radio frequency identification device of the plurality has a second antenna; and
   b. the first antenna cooperates with the second antenna to extend the communication range of the radio frequency identification device.

9. The structure of claim 1 wherein the first antenna comprises a loop conductor.

10. The structure as in any one of claims 1–3, 5–6 and 8–9 wherein:
    a. the structure comprises a plurality of planar surfaces; and
    b. the circuit comprises an antenna portion mechanically coupled to each of the planar surfaces.

* * * * *